(12) United States Patent
Fienup et al.

(10) Patent No.: US 8,167,395 B2
(45) Date of Patent: May 1, 2012

(54) APPARATUS AND METHODS FOR SERVICING 3D PRINTERS

(75) Inventors: William J. Fienup, St. Louis, MO (US); Andrew Berlin, Gloucester, MA (US); Andres T. Hernandez, Glendale, CA (US); Joshua P. Kinsley, Arlington, MA (US); Walter H. Zengerle, III, Dedham, MA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 12/907,354

(22) Filed: Oct. 19, 2010

(65) Prior Publication Data

US 2011/0032301 A1    Feb. 10, 2011

Related U.S. Application Data

(62) Division of application No. 11/000,100, filed on Nov. 30, 2004, now Pat. No. 7,824,001.

(60) Provisional application No. 60/612,068, filed on Sep. 21, 2004.

(51) Int. Cl.
*B41J 29/38* (2006.01)
(52) U.S. Cl. ............................... 347/9; 347/14; 700/119
(58) Field of Classification Search .................. 700/119; 347/5, 9, 12, 14, 19
See application file for complete search history.

(56) References Cited

U.S. PATENT DOCUMENTS

| | | |
|---|---|---|
| 3,741,155 A | 6/1973 | Hunder |
| 4,250,513 A | 2/1981 | Harlow et al. |
| 4,618,276 A | 10/1986 | Blomquist et al. |
| 5,014,074 A | 5/1991 | Dody et al. |
| 5,204,055 A | 4/1993 | Sachs et al. |
| 5,252,264 A | 10/1993 | Forderhase et al. |
| 5,283,173 A | 2/1994 | Fields et al. |
| 5,387,380 A | 2/1995 | Cima et al. |
| 5,451,990 A | 9/1995 | Sorenson et al. |
| 5,547,438 A | 8/1996 | Nozaki et al. |
| 5,552,593 A | 9/1996 | Biss |
| 5,561,449 A | 10/1996 | Raskin et al. |
| 5,600,350 A | 2/1997 | Cobbs et al. |
| 5,616,294 A | 4/1997 | Deckard |
| 5,640,183 A | 6/1997 | Hackleman |
| 5,663,751 A | 9/1997 | Holbrook |
| 5,788,916 A | 8/1998 | Caldarise |
| 5,796,414 A | 8/1998 | Sievert et al. |
| 5,837,960 A | 11/1998 | Lewis et al. |
| 5,847,722 A | 12/1998 | Hackleman |
| 5,876,550 A | 3/1999 | Feygin et al. |
| 5,923,347 A | 7/1999 | Wade |

(Continued)

FOREIGN PATENT DOCUMENTS

DE    3713794 A1    11/1988

(Continued)

OTHER PUBLICATIONS

Evil Mad Scientist Laboratories, "Solid Freeform Fabrication: DIY, on the cheap, and made of pure sugar," (http://www.evilmadscientist.com/article.php/candyfab, dated May 11, 2007, 17 pages.

(Continued)

*Primary Examiner* — Lam S Nguyen

(57) ABSTRACT

The invention relates to apparatus and methods for producing three-dimensional objects and auxiliary systems used in conjunction with the aforementioned apparatus and methods. The apparatus and methods involve 3D printing and servicing of the equipment used in the associated 3D printer.

8 Claims, 34 Drawing Sheets

U.S. PATENT DOCUMENTS

| | | |
|---|---|---|
| 5,943,122 A | 8/1999 | Holmes |
| 6,007,318 A | 12/1999 | Russell et al. |
| 6,098,538 A | 8/2000 | Hamu |
| 6,109,722 A | 8/2000 | Underwood et al. |
| 6,154,230 A | 11/2000 | Holstun et al. |
| 6,158,849 A | 12/2000 | Veciana et al. |
| 6,164,753 A | 12/2000 | Maza et al. |
| 6,193,353 B1 | 2/2001 | Vives et al. |
| 6,196,652 B1 | 3/2001 | Subirada et al. |
| 6,234,602 B1 | 5/2001 | Soto et al. |
| 6,241,334 B1 | 6/2001 | Haselby |
| 6,257,143 B1 | 7/2001 | Iwasaki et al. |
| 6,270,204 B1 | 8/2001 | Barrett et al. |
| 6,281,908 B1 | 8/2001 | Gibson et al. |
| 6,283,574 B1 | 9/2001 | Sugimoto et al. |
| 6,325,480 B1 | 12/2001 | Moghadam et al. |
| 6,325,505 B1 | 12/2001 | Walker |
| 6,331,038 B1 | 12/2001 | Boleda et al. |
| 6,345,876 B1 | 2/2002 | Tanaka et al. |
| 6,367,903 B1 | 4/2002 | Gast et al. |
| 6,390,588 B1 | 5/2002 | Ikeda |
| 6,390,593 B1 | 5/2002 | DeRoos et al. |
| 6,401,001 B1 | 6/2002 | Jang et al. |
| 6,409,297 B1 | 6/2002 | Morgan et al. |
| 6,416,850 B1 | 7/2002 | Bredt et al. |
| 6,457,806 B2 | 10/2002 | Hickman |
| 6,467,867 B1 | 10/2002 | Worthington et al. |
| 6,497,472 B2 | 12/2002 | Sharma et al. |
| 6,535,293 B1 | 3/2003 | Mitsuhashi |
| 6,547,360 B2 | 4/2003 | Takahashi et al. |
| 6,554,390 B2 | 4/2003 | Arquilevich et al. |
| 6,556,315 B1 | 4/2003 | Kommrusch et al. |
| 6,582,052 B2 | 6/2003 | Sarmast et al. |
| 6,604,812 B2 | 8/2003 | Askeland et al. |
| 6,612,824 B2 | 9/2003 | Tochimoto et al. |
| 6,626,101 B2 | 9/2003 | Kajiwara et al. |
| 6,658,314 B1 | 12/2003 | Gothait |
| 6,665,432 B1 | 12/2003 | Evans et al. |
| 6,694,064 B1 | 2/2004 | Benkelman |
| 6,755,499 B2 | 6/2004 | Castano et al. |
| 6,771,837 B1 | 8/2004 | Berbecel et al. |
| 6,829,456 B2 | 12/2004 | Regimbal et al. |
| 6,832,824 B1 | 12/2004 | Baker et al. |
| 6,834,930 B2 | 12/2004 | Steinfield et al. |
| 6,838,035 B1 | 1/2005 | Ederer et al. |
| 6,841,166 B1 | 1/2005 | Zhang et al. |
| 6,860,585 B2 | 3/2005 | Serra et al. |
| 6,898,477 B2 | 5/2005 | Loughran |
| 6,932,935 B1 | 8/2005 | Oberhofer et al. |
| 6,989,115 B2 | 1/2006 | Russell et al. |
| 7,387,359 B2 | 6/2008 | Hernandez et al. |
| 7,824,001 B2 | 11/2010 | Fienup et al. |
| 2001/0000434 A1 | 4/2001 | Medin |
| 2001/0045678 A1 | 11/2001 | Kubo et al. |
| 2002/0012202 A1 | 1/2002 | Hagen |
| 2002/0047229 A1 | 4/2002 | Yanagisawa et al. |
| 2002/0075349 A1 | 6/2002 | Sawicki |
| 2002/0089561 A1 | 7/2002 | Weitzel et al. |
| 2002/0122102 A1 | 9/2002 | Jeanmaire et al. |
| 2002/0126171 A1 | 9/2002 | Subirada et al. |
| 2002/0167101 A1 | 11/2002 | Tochimoto et al. |
| 2002/0171705 A1 | 11/2002 | Rhoads et al. |
| 2003/0058301 A1 | 3/2003 | Sekiya |
| 2003/0081047 A1 | 5/2003 | Yearout |
| 2003/0197750 A1 | 10/2003 | Iwatsuki et al. |
| 2004/0026803 A1 | 2/2004 | Yatsuda et al. |
| 2004/0084814 A1 | 5/2004 | Boyd et al. |
| 2004/0153193 A1 | 8/2004 | Farnworth |
| 2004/0164436 A1 | 8/2004 | Khoshnevis |
| 2004/0182510 A1 | 9/2004 | Pfeifer et al. |
| 2004/0207123 A1 | 10/2004 | Patel et al. |
| 2004/0224173 A1 | 11/2004 | Boyd et al. |
| 2004/0232583 A1 | 11/2004 | Monsheimer et al. |
| 2004/0239009 A1 | 12/2004 | Collins et al. |
| 2004/0251574 A1 | 12/2004 | Collins et al. |
| 2005/0017394 A1 | 1/2005 | Hochsmann et al. |
| 2005/0072113 A1 | 4/2005 | Collins et al. |
| 2005/0189442 A1 | 9/2005 | Hussaini et al. |
| 2006/0192322 A1 | 8/2006 | Abe et al. |

FOREIGN PATENT DOCUMENTS

| | | |
|---|---|---|
| DE | 299 07 262 | 8/1999 |
| EA | 1 074 389 | 2/2001 |
| EA | 1 164 020 | 12/2001 |
| EP | 0 289 116 | 11/1988 |
| EP | 0 431 924 | 6/1991 |
| EP | 0 622 239 A2 | 11/1994 |
| EP | 0 978 390 A2 | 11/1994 |
| EP | 0 694 396 A2 | 1/1996 |
| EP | 0 949 993 A2 | 10/1999 |
| EP | 0 953 448 | 11/1999 |
| EP | 1 034 936 A2 | 9/2000 |
| EP | 1 308 279 A2 | 5/2003 |
| EP | 1 310 369 | 5/2003 |
| EP | 1 558 440 A2 | 8/2005 |
| JP | 5-318607 A | 12/1993 |
| JP | 2001-199055 A | 7/2001 |
| WO | WO-90/03893 A1 | 4/1990 |
| WO | WO-92/08592 A1 | 5/1992 |
| WO | WO-93/08928 A1 | 5/1993 |
| WO | WO-94/19112 A2 | 9/1994 |
| WO | WO-94/26446 A1 | 11/1994 |
| WO | WO-95/34468 A1 | 12/1995 |
| WO | WO-0068016 | 11/2000 |
| WO | WO-0175466 | 10/2001 |
| WO | WO-02/28568 | 4/2002 |
| WO | WO-03-016067 A2 | 2/2003 |
| WO | WO-03-016067 A3 | 2/2003 |
| WO | WO-2004024447 A2 | 3/2004 |
| WO | WO-2004/076102 A1 | 9/2004 |

OTHER PUBLICATIONS

Rynerson, Michael L., Evaluation of the Advanced Ceramics Marker for New Applications of Three Dimensional Printing, May 1995, 169 pages, MIT-Theses 1995-366.

Z™ 406 3D Color Printer User Manual, Apr. 2002, 49 pages.

The University of Texas, "Solid Freeform Fabrication Proceedings," Harries L. Marcus, et al., pp. 94-101 (Sep. 1993).

The University of Texas, "Solid Freeform Fabrication Proceedings" Harris L. Marcus, et al., pp. 51-58, (Sep. 1993).

DTM Corporation, "The Sinterstation™ 2000 System Selective Laser Sintering User's Guide," (DTM Corporation, Nov. 1993).

Wu, Benjamin M., et al., "Solid Free-Form Fabrication of Drug Delivery Devices," journal of Controlled Released 40 (1996) pp. 77-87.

Dubbel "Taschenbucnh Fur Den Maschinenbau," W. Beitz and K.H. Kuttner.

Evil Mad Scientist Laboratories, "Solid Freeform Fabrication: DIY, on the cheap, and made of pure sugar," (http://ww.evilmadscientist.com/article.php/candyfab, dated May 11, 2007, 17 pages.

Sanders Prototype, Inc., Modelmaker II System, the high precision 3D modeling system (http://www.sanders-prototype.com/mmii/mmii.htm) (consisting of 8 pages).

Sanders Prototype, Inc., Sanders Prototype "MM-6PRO" System (http://www.sanders-prototype.com/mm6pro.htm) (consisting of 4 pages).

Technology International Incorporated of Virginia, SBIR 95-1 Solicitation Project Summary (http:/sbir/gsfc.gov/95abstracts/08.07/951020.html) (consisting of 1 page).

Sanders Prototype, Inc., Model-Maker Desktop 3D Modeling System (htt://www.sanders-prototype.com/datash.htm) (consisting of 4 pages).

Sanders Prototype, Inc., SPI Model Maker.TM.3D Modeling System Technical Description (http://www.sanders-prototype.com/techdesc.htm.) (consisting of 3 pages).

Sanders Prototype, Inc., Sanders Prototype Incorporated Application Notes, (http:www.sanders-pototype.com/appnotes.htm) (consisting of 2 pages).

Communication of Official Action for European Patent Application No. 10165222.0-2304 dated Aug. 9, 2010.

The Patent Office of the People's Republic of China Notification of the Second Office Action for Appliaction No. 200580038271.5 dated Feb. 12, 2010.

Spectrum™ Z510 Brochure, 3 pages.

Solid free-form fabrication of drug delivery devices, Journal of Controlled Release 40 (1996) 77-87.

DTM Corporation A BFGoodrich Company, Sinterstation 20000 User's Guide, Nov. 1993.

Evaluation of the Advanced Ceramics Market for New Applications of Three Dimensional Printing, M.S. Thesis, MIT 1995.

Barrere, Gerrit; "Use FFTs to time Align Asynchronous Waveforms," *Planet EE Network*, 7 pgs, Feb. 4, 2002.

Communication Relating to the Results of the Partial International Search for PCT/US2005/033112, dated Jun. 27, 2006 (3 pgs.).

Communication Relating to the Results of the Partial International Search for PCT/US2005/032645, dated Jun. 7, 2006 (5 pgs.).

International Search Report and Written Opinion for PCT/US2005/033112, dated Aug. 28, 2006 (20 pgs.).

International Search Report for PCT/US2005/032645,dated Sep. 6, 2006, (10 pgs.).

Official Notice of Reasons for Rejection dated Feb. 18, 2011, Japanese Patent Application No. 2007-532487, 6 pages.

Examination Report in European Patent Application No. 05795259.0, dated Jun. 10, 2011, 8 pages.

Japanese Office Action, Application No. 2007-532411 dated Sep. 16, 2011.

Sanders Prototype, Inc., Modelmaker II System, The high precision 3D modeling system, dated Dec. 2, 1996, (http://www.sanders-prototype.com/mmii/mmii.htm) (consisting of 8 pages).

Sanders Prototype, Inc., Sanders Prototype "MM-6PRO" System dated Dec. 2, 1996, (http://www.sanders-prototype.com/mm6pro.htm) (consisting of 4 pages).

Technology International Incorporated of Virginia, SBIR 95-1 Solicitation Project Summary, dated Dec. 2, 1996, (http:/sbir/gsfc.gov/95abstracts/08.07/951020.html) (consisting of 1 page).

Sanders Prototype, Inc., Model-Maker Desktop 3D Modeling System, dated Dec. 2, 1996, (htt://www.sanders-prototype.com/datash.htm) (consisting of 4 pages).

Sanders Prototype, Inc., SPI Model Maker.TM.3D Modeling System Technical Description, dated Dec. 2, 1996, (http://www.sanders-prototype.com/techdesc.htm.) (consisting of 3 pages).

Sanders Prototype, Inc., Sanders Prototype Incorporated Application Notes, Dec. 2, 1996, (http:www.sanders-prototype.com/appnotes.htm) (consisting of 2 pages).

Communication Relating to Official Action for European Patent Application No. 05797563.3 dated Nov. 11, 2008.

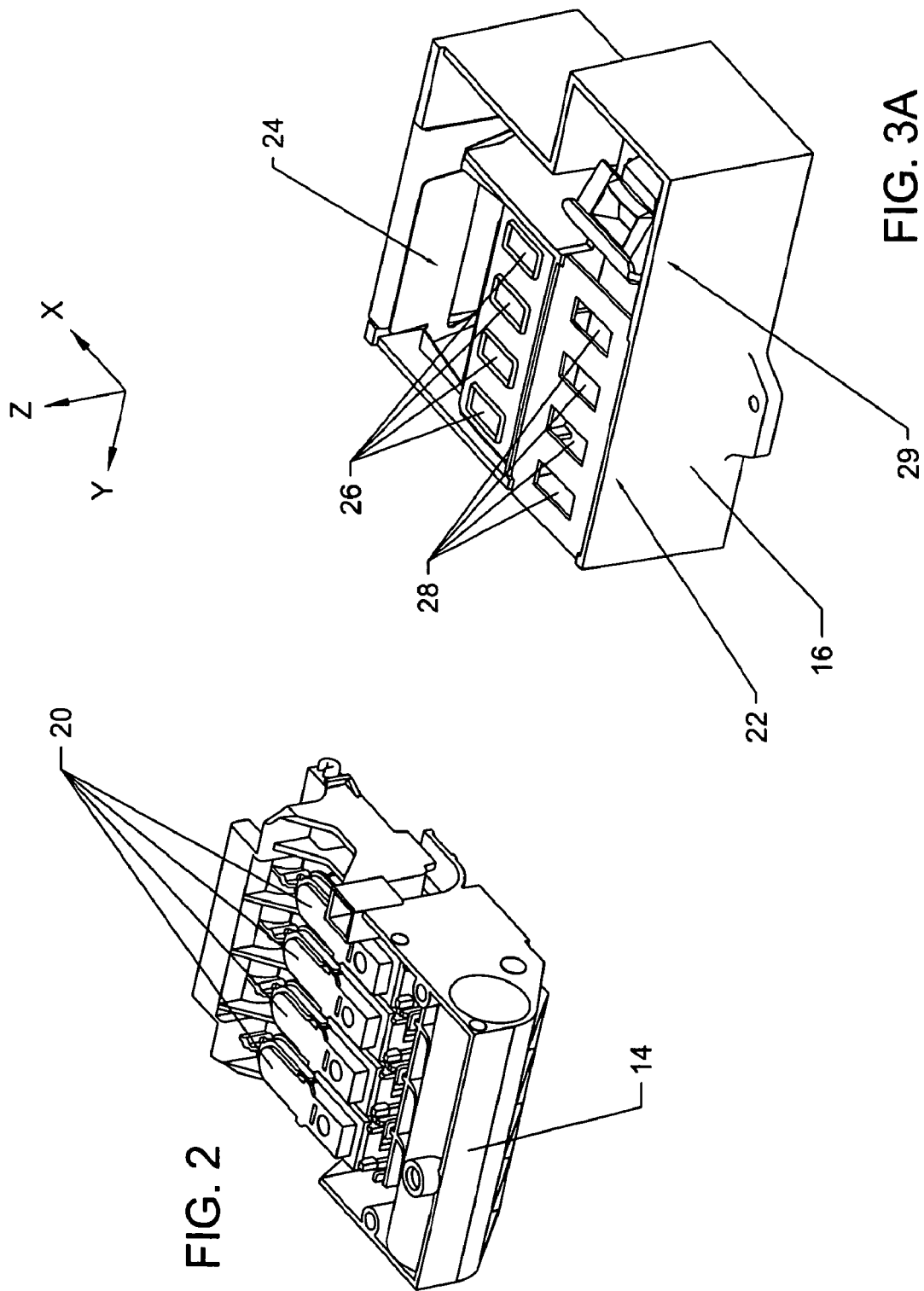

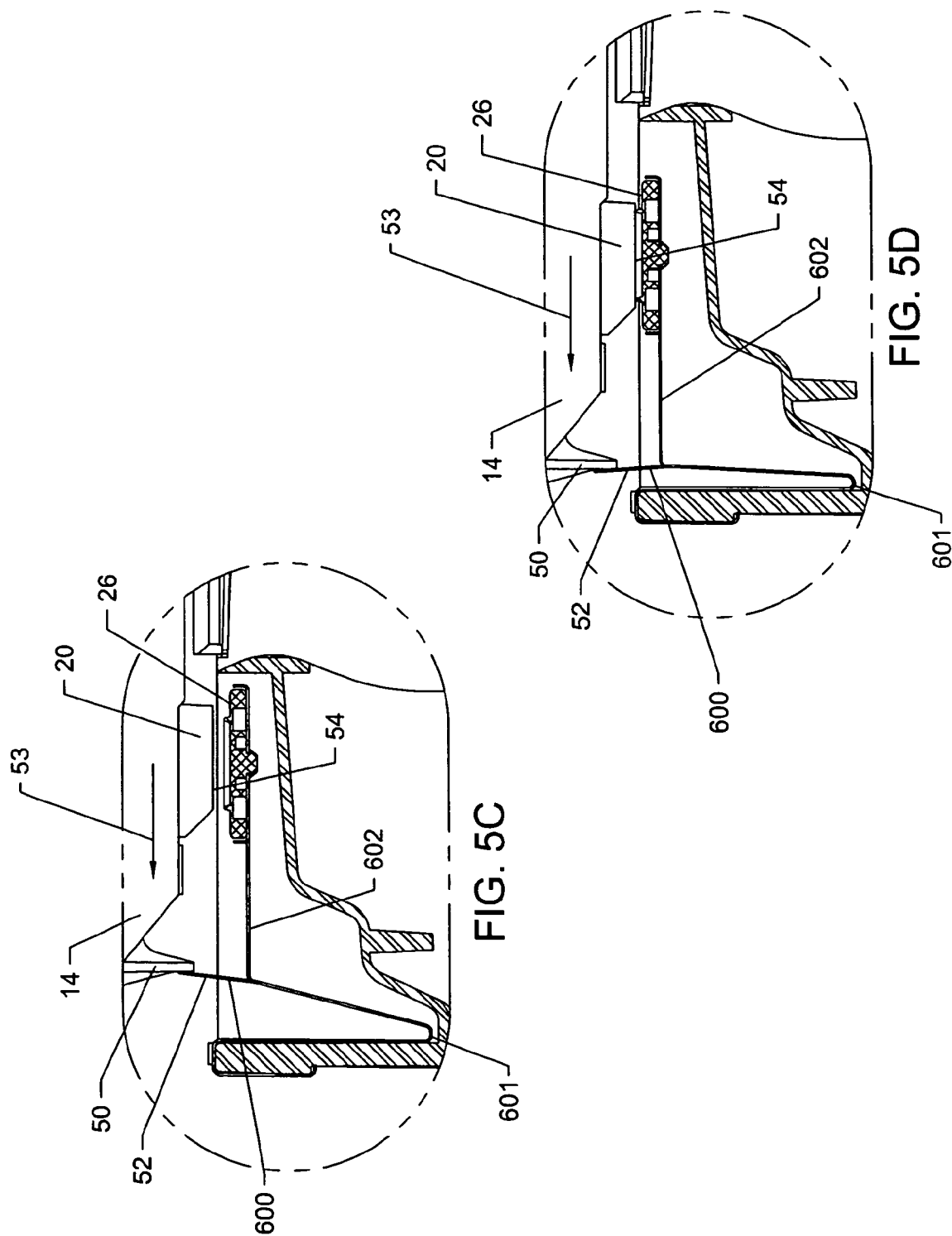

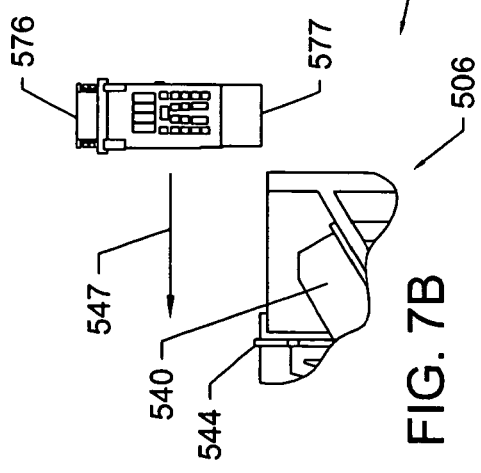
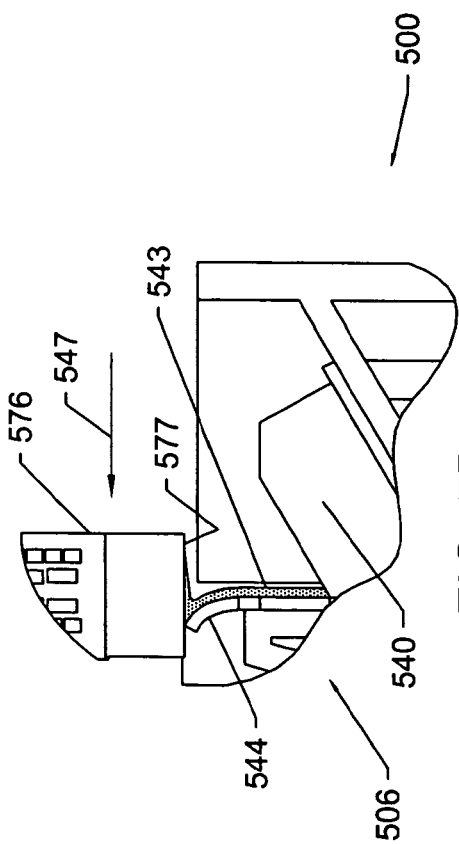
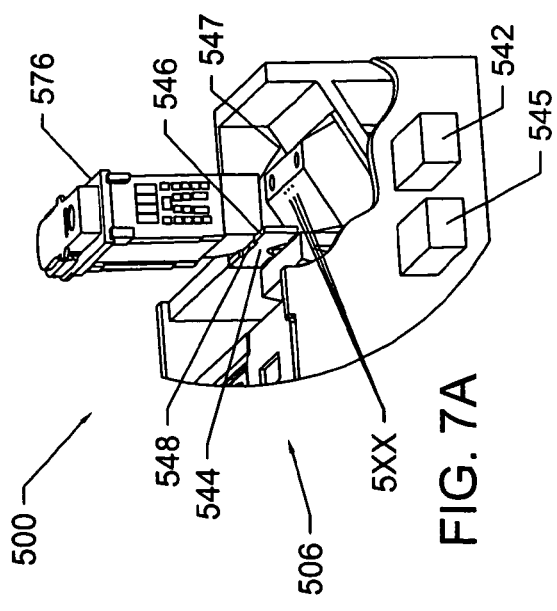
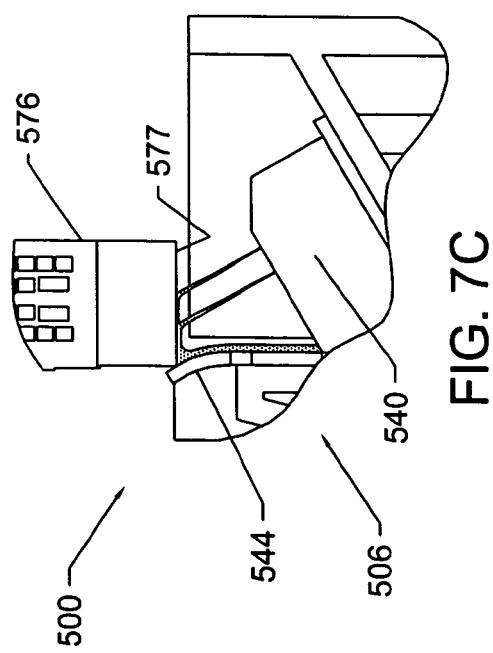

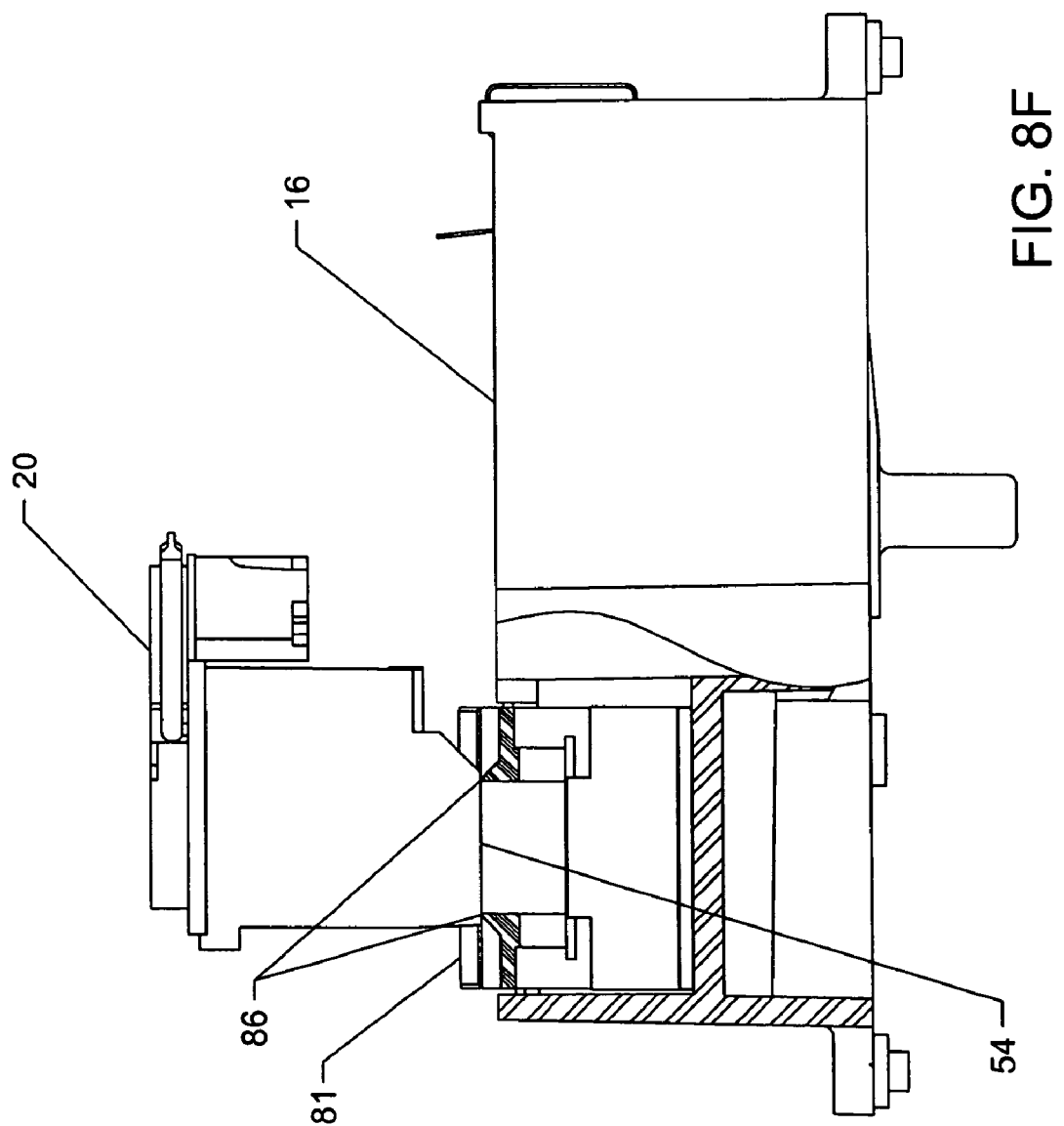

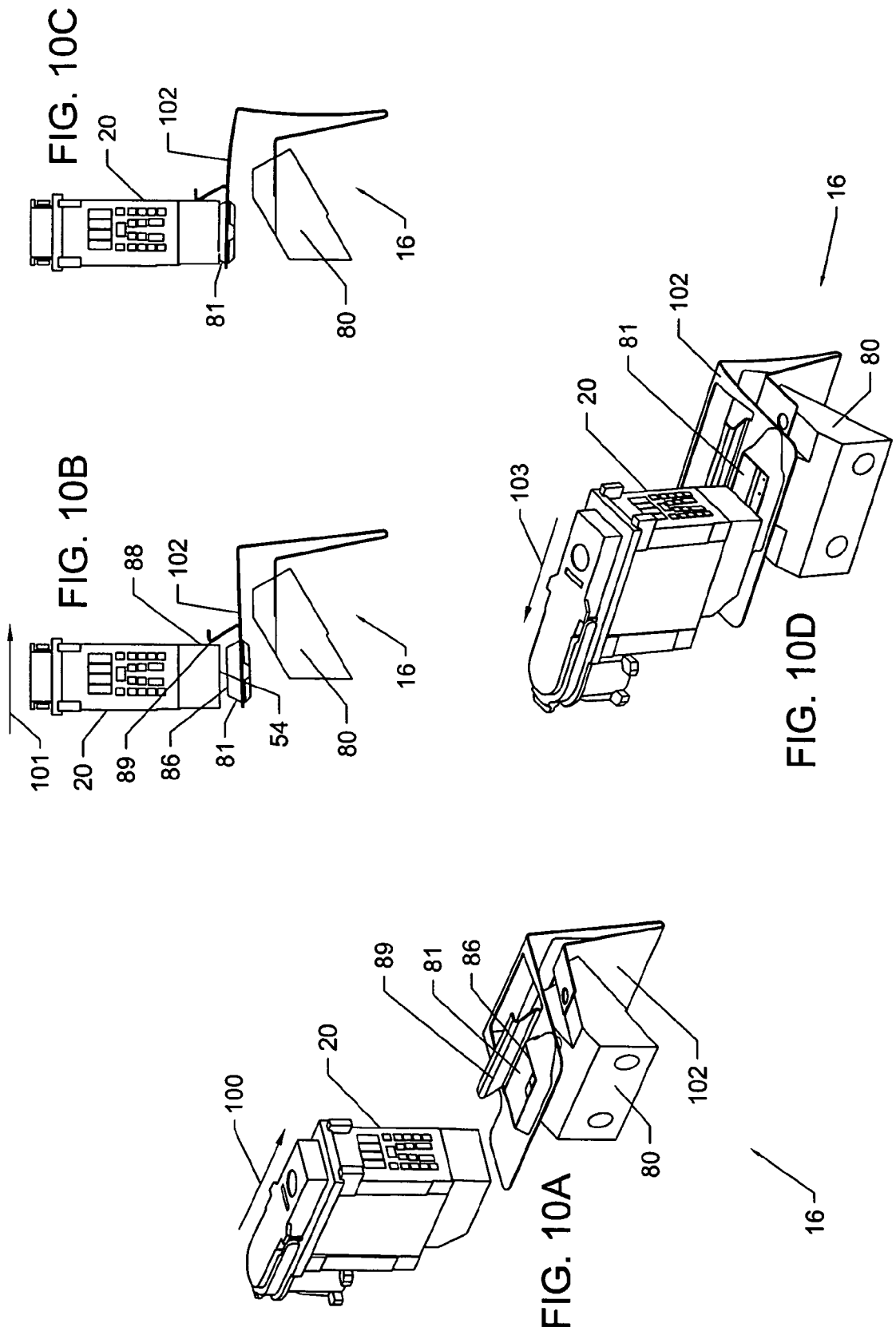

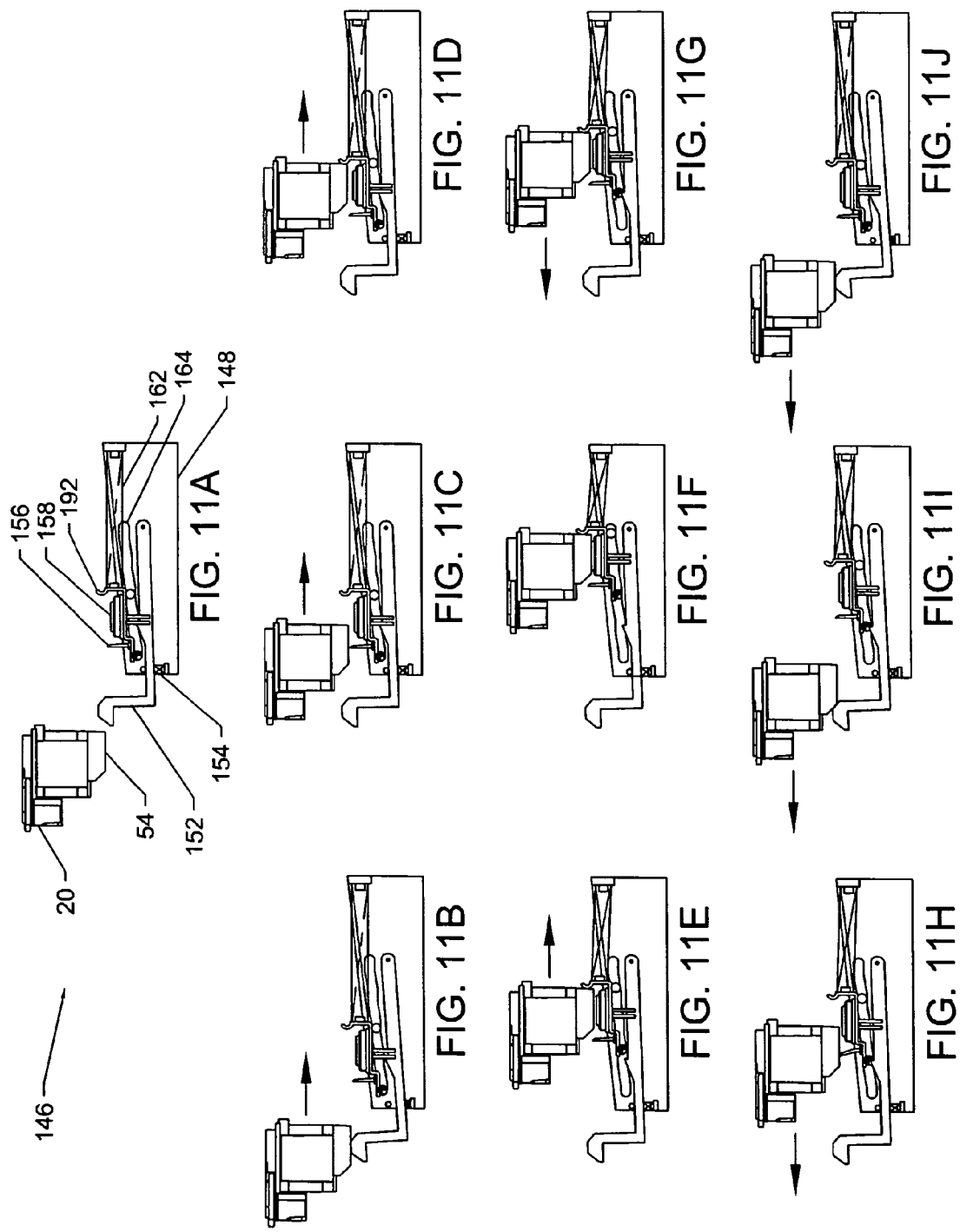

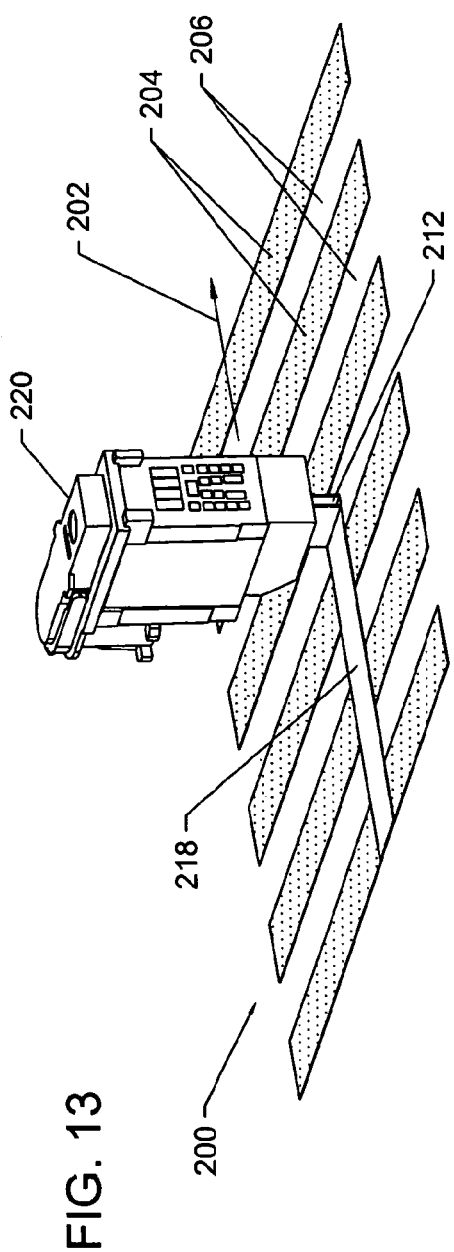
FIG. 13
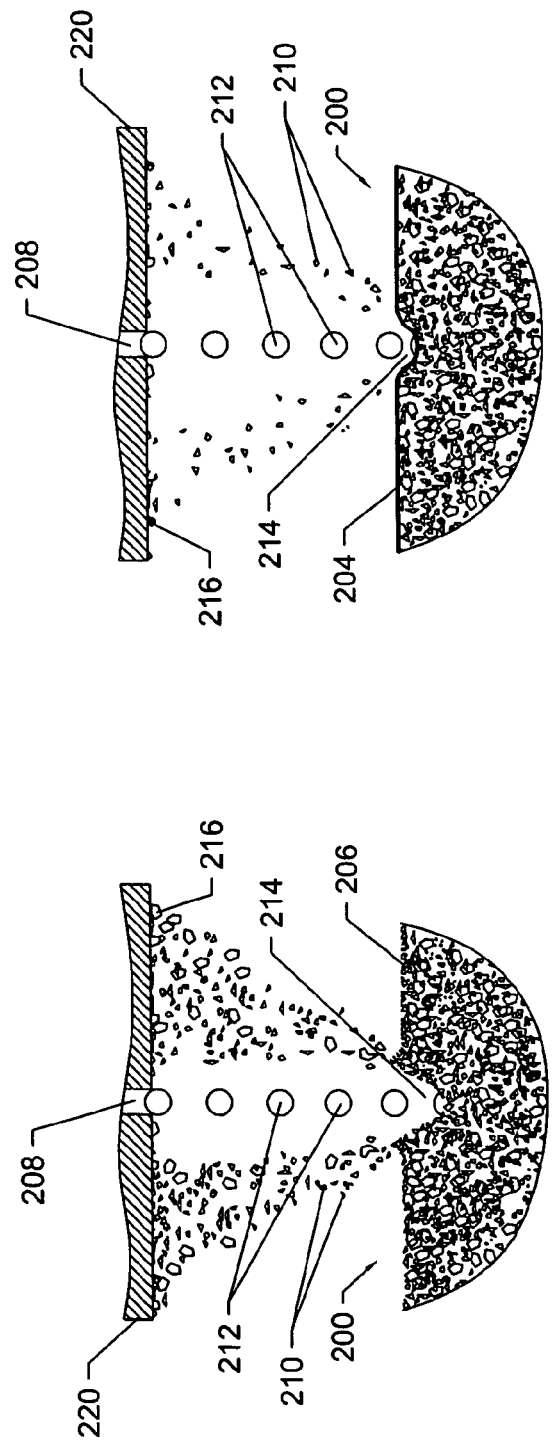
FIG. 14A
FIG. 14B

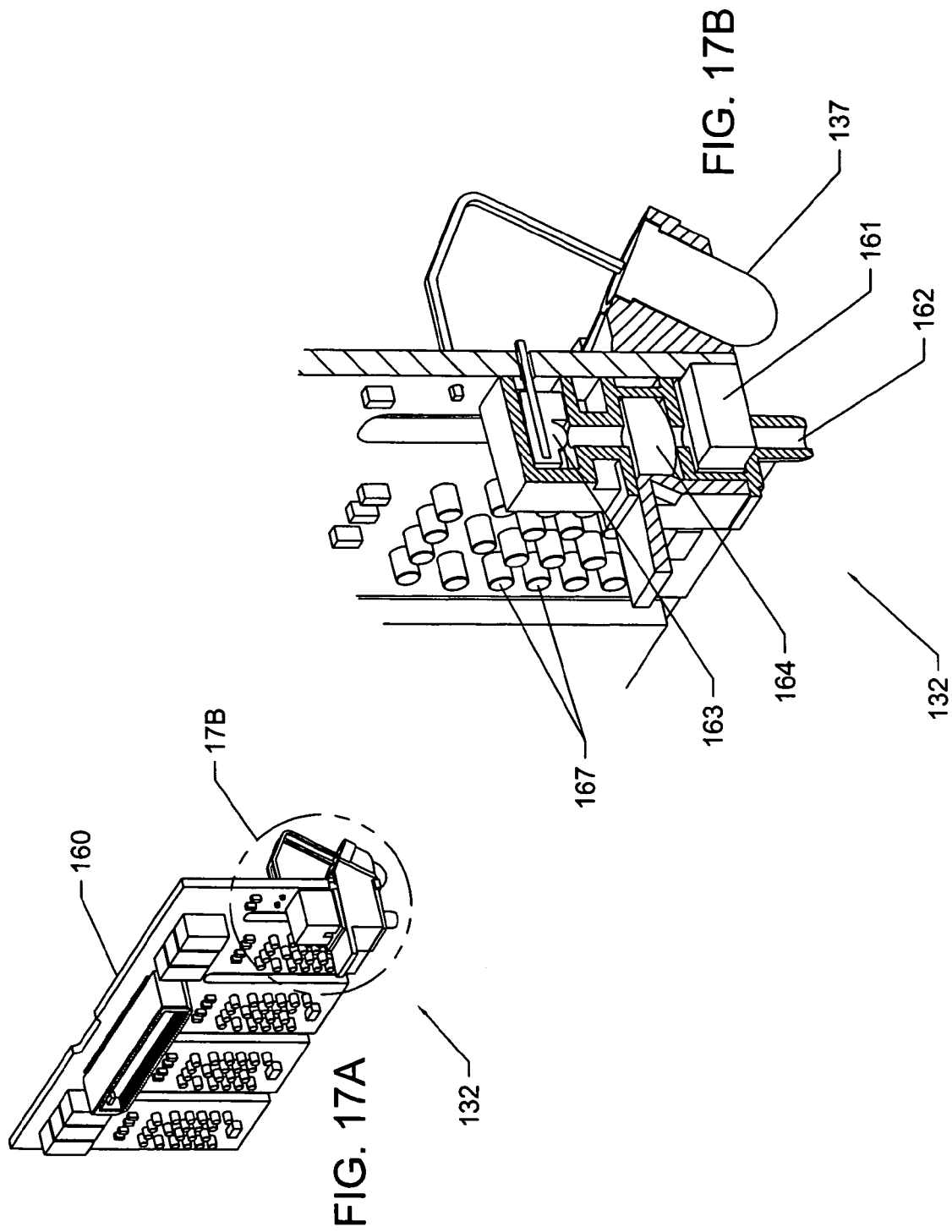

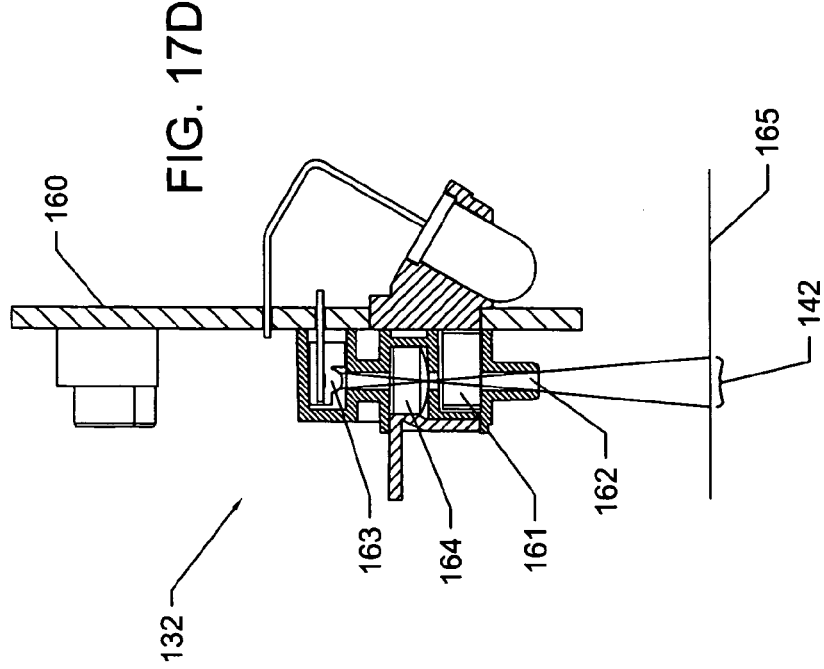
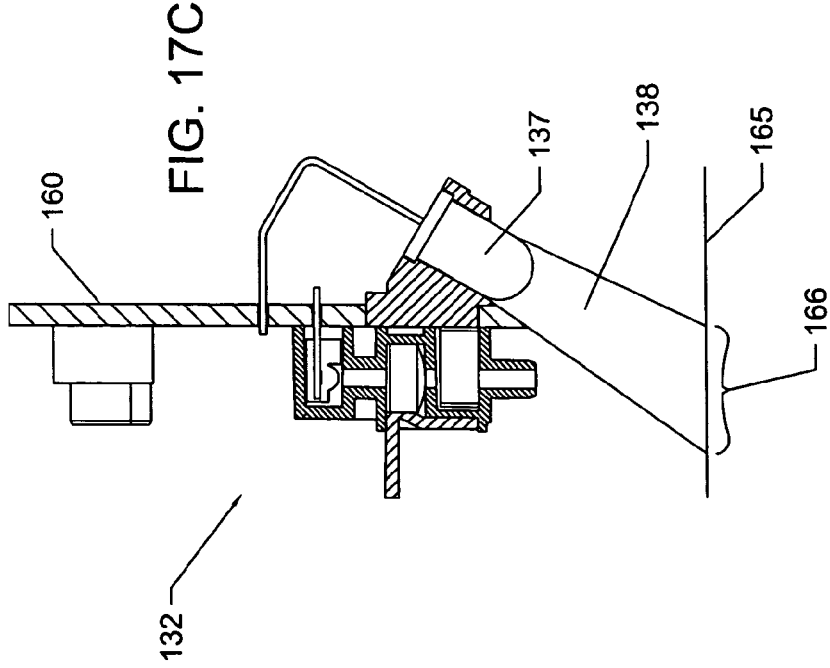

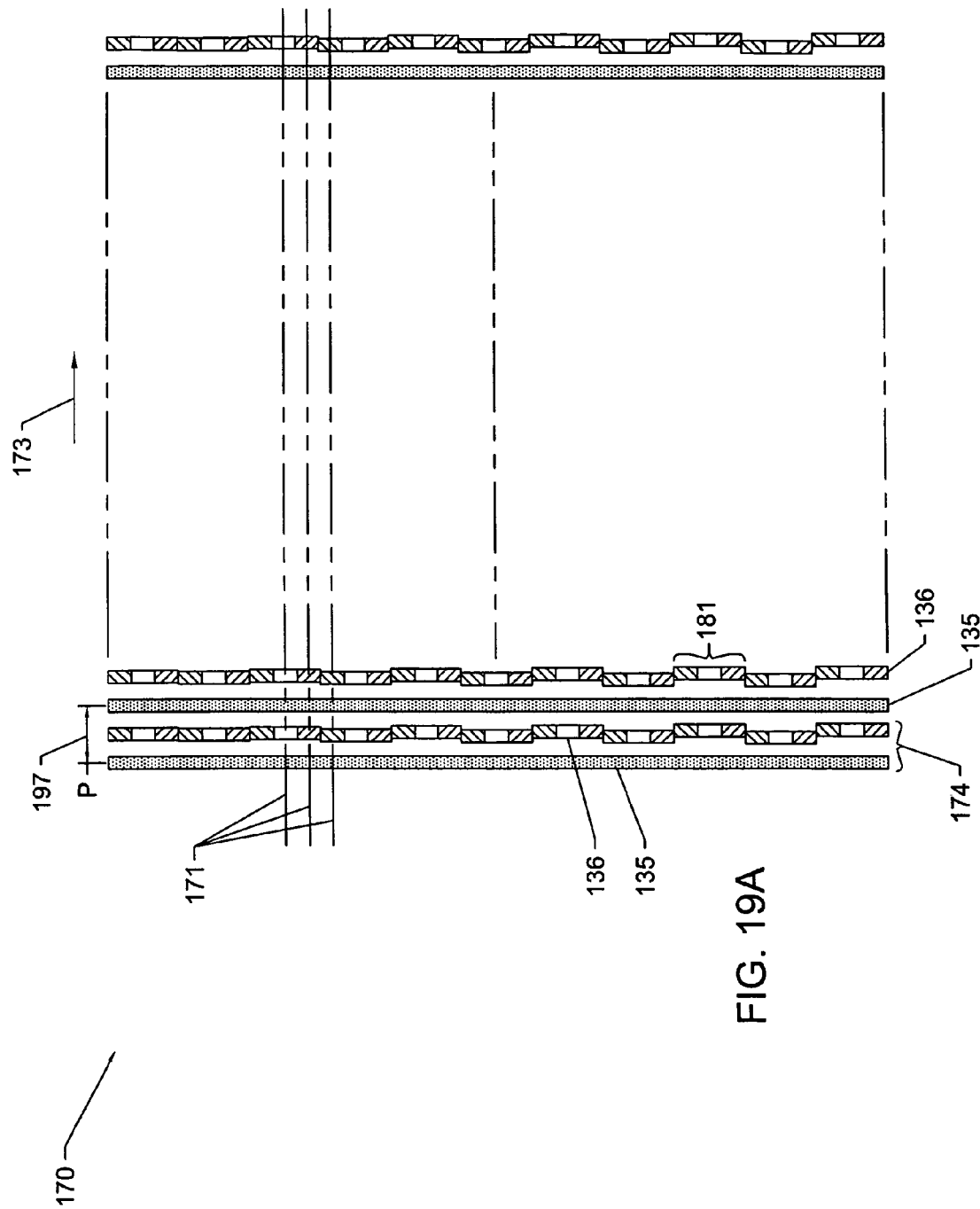

APPARATUS AND METHODS FOR SERVICING 3D PRINTERS

CROSS-REFERENCE TO RELATED APPLICATIONS

This application is a divisional application of U.S. patent application Ser. No. 11/000,100, filed Nov. 30, 2004, which claims priority to U.S. Provisional Patent Application Ser. No. 60/612,068, filed on Sep. 21, 2004; the disclosures of both of these priority applications are incorporated herein by reference in their entireties. This application also incorporates herein by reference a U.S. patent application filed Nov. 30, 2004 and identified by, now issued as U.S. Pat. No. 7,387,359.

FIELD OF THE INVENTION

The present invention relates to apparatus and methods for servicing 3D printers, for example, for cleaning and aligning the printheads used in the 3D printers.

BACKGROUND

Generally, 3D printing involves the use of an inkjet type printhead to deliver a liquid or colloidal binder material to layers of a powdered build material. The printing technique involves applying a layer of a powdered build material to a surface typically using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed. See, for example, U.S. Pat. Nos. 6,375,874 and 6,416,850, the disclosures of which are incorporated herein by reference in their entireties.

3D printers produce colored parts by using colored binder materials to solidify the powder. Clear binder is used to produce white part surfaces, and three primary colors are used in varying proportions to produce a gamut of colors. The printer must apply the variously colored binder droplets at precise locations to render the part surfaces in accurate color. 3D printers use a separate printhead to apply each binder color. In general, non-uniformity in printheads and mechanical variations in printhead mounting features produce inaccuracies in the positioning of binder droplets that must be characterized and corrected.

Additionally, apparatus for carrying out 3D printing typically generates dust, which can detrimentally effect the operation of the printheads. For example, the dust can clog the jet nozzles that dispense the binder material, which can result in no binder material being dispensed or the binder material being dispensed inaccurately.

It is, therefore, an object of the present invention to piovide apparatus and methods for continuously and efficiently servicing 3D printers.

SUMMARY

Generally, the invention relates to apparatus and methods for producing three-dimensional objects, such as casting cores, toys, bottles, cans, architectural models, automotive parts, molecular models, models of body parts, cell phone housings, and footwear, more rapidly and efficiently than heretofore achievable. Additionally, the invention relates to systems and methods for maintaining and operating the aforementioned apparatus.

More specifically, the invention relates to apparatus and methods for aligning multiple printheads and apparatus and methods for cleaning the printheads. In one example, the alignment method is an automatic method of determining droplet-positioning errors that is particularly suited to 3D printing. In one example, a test pattern is printed with the printheads to be aligned, assuming that they are perfectly positioned. The resulting image is then scanned to determine the deviation of the images printed from perfect position. The information thus gained is then available to correct the identified errors. The present approach differs from the prior art in at least its use of the harmonic content of the signal obtained from scanning an alignment pattern to characterize misalignment. A scan traverses a multiplicity of nominally identical bar pairs, averaging out the irregularities inherent in an image printed in powder. Imaging optics are unnecessary since no edge detection is involved.

In one aspect, the invention relates to a method of creating a test pattern with a plurality of printheads of a three-dimensional printer. The method includes the steps of defining an area on a build surface for receiving the test pattern, selecting a reference printhead capable of printing with a high contrast, printing a reference line with the reference printhead, and printing a test line proximate to the reference line with at least one of the remaining printheads.

In various embodiments, the step of defining an area includes producing a contrast-enhancing sublayer on the build surface. The contrast-enhancing sublayer can be produced by printing the area in a solid, high contrast color using at least one of the printhead and overlaying the printed area with at least one unprinted layer of build material. In one embodiment, the area is printed with all of the available printheads at a maximum discharge level to saturate the area.

The step of selecting a printhead includes the steps of printing a target above the contrast-enhancing sublayer with each of the printheads, comparing the targets to identify which target has a highest contrast relative to an unprinted area, and selecting a printhead associated with the highest contrast target. Further, the method can include the step of depositing a layer of a build material on the build surface prior to each printing step. The printing steps can include depositing a liquid binder in a predetermined pattern on the build material. The printheads, in one embodiment, print with a liquid binder having a color selected from the group consisting of magenta, yellow, cyan, clear and black. Other colors and combinations of colors are contemplated and within the scope of the invention.

Additionally, the step of printing a test line can include printing alternating bars of color with at least two of the remaining printheads. The steps of printing a reference line and printing a test line can include printing a plurality of reference lines and printing a corresponding plurality of test lines. In one embodiment, the reference lines and the test lines can be printed in multiple passes. The step of printing a plurality of lines can include printing a plurality of horizontal lines and a plurality of vertical lines. Also, the step of printing a reference line can include printing ten horizontal reference lines and printing ten vertical reference lines proximate thereto, and the step of printing a test line can include printing ten corresponding horizontal test lines and printing ten corresponding vertical test lines. In some embodiments, two reference lines may be printed. In other embodiments, 20 reference lines may be printed.

In a particular embodiment of the method, the steps of printing a reference line and printing a test line include printing a plurality of nominally identical line pairs parallel to a fast-axis travel of the printheads, each line pair comprising one reference line and one test line, and printing a plurality of nominally identical line pairs perpendicular to the fast-axis travel of the printheads, each line pair comprising one reference line and one test line. In one embodiment, each plurality of line pairs is arranged as an equally spaced linear array. Each test line can include a series of test bars, where each of the remaining printheads prints a central test bar that is nominally located at a distance from a corresponding reference line equal to ½ of a nominal array spacing of the reference lines. In one embodiment, each remaining printhead prints a plurality of additional test bars that are incrementally displaced about the central test bar.

In another aspect, the invention relates to a test pattern for aligning a plurality of printheads in a three-dimensional printer. The test pattern includes a plurality of substantially evenly spaced solid reference lines and a plurality of test lines disposed in an alternating pattern with the plurality of reference lines, wherein each of the test lines comprises at least one bar of a non-reference color. In one embodiment, the colors are printed in an alternating pattern. In various embodiments, the plurality of lines is oriented substantially vertically, or in a particular embodiment, parallel to a fast-axis printhead travel. Further, the test pattern can include a second test pattern disposed proximate the first test pattern. The second test pattern includes a second plurality of substantially evenly spaced solid reference lines and a second plurality of test lines disposed in an alternating pattern with the second plurality of reference lines. Each of the test lines comprises at least one bar of a non-reference color, and the second plurality of lines can be oriented substantially perpendicular to the fast-axis printhead travel.

In another aspect, the invention relates to a method of determining a correction factor(s) for aligning a plurality of printheads. The printheads need to operate in concert to produce colored images. Due to printhead and mounting variations, the relative positions of the printheads need to be measured, and corrections need to be applied to the printhead drive signals to cause the various colors to be printed in the proper registration. Generally, a test pattern is printed with the printheads to be aligned, assuming that they are perfectly positioned. The resulting image is then scanned to determine the deviation of the images printed from their perfect position. The information thus gained is then available to correct the identified errors. The present approach differs from the prior art in at least its use of the harmonic content of the signal obtained from scanning the test pattern to characterize misalignment. A scan traverses a plurality of nominally identical line pairs, averaging out the irregularities inherent in an image printed in powder. Imaging optics are unnecessary, since no edge detection is involved.

Specifically, the method includes the steps of printing a test pattern on a build surface, generating a set of electrical signals representative of the test pattern, analyzing the electrical signals to determine their harmonic content at at least one frequency, and determining a correction factor(s) based on the harmonic content of the electrical signals. The test pattern can include a line pair array. In one embodiment, the method includes generating a plurality of electrical signals for analysis and determining a plurality of correction factors based on the harmonic content of the plurality of electrical signals.

In various embodiments, the method includes generating the electrical signal by illuminating the test pattern and measuring reflectance of the test pattern at predetermined locations. In one embodiment, the step of analyzing the electrical signal includes applying an analog filter (e.g., using op-amps) to the signal. In another embodiment, the step of analyzing the electrical signal includes digitizing the signal and applying a digital filter (e.g., a Fast Fourier Transform) to the signal. In one embodiment, the correction factor can be determined from a set of third harmonic values. In another embodiment, the correction factor can be determined from a set of first harmonic values. The correction factor can be near a nominal test bar displacement for which a lowest value of the selected harmonic is determined. The correction factors can be determined by locating a minimum value of an analytical curve that has been fitted to, or representative of the set of third harmonic values. One embodiment of the method includes the steps of extracting third harmonic values from the signals acquired by scanning the sensor across the array, comparing the set of third harmonic values obtained for each color, and determining the correction factors based on the minimum third harmonic values.

In another aspect, the invention relates to the servicing of a plurality of printheads in a three-dimensional printer. In general, quality of the parts produced in the 3-D printing process depends upon the reliable and accurate delivery of droplets of binder liquid from the nozzle arrays located on the faces of the printheads. To maintain high performance standards, the printheads must be serviced frequently during the 3-D printing process. The impact of droplets of binder liquid on the surface of the powder bed causes powder particles to be ejected from the surface of the bed. Some of the ejected material collects on the faces of the printheads, interfering with the delivery of binder liquid droplets. A principal purpose of the printhead servicing is to remove this accumulated debris from the printhead faces.

One aspect of printhead servicing is a service station, which includes a cleaning station, a discharge station, and a capping station. In one embodiment, the printheads are disposable within a carriage capable of moving in at least two directions relative to the service station. Another aspect of printhead servicing is a software algorithm that specifies when each printhead needs to be serviced. In one embodiment, the printheads are disposable within a carriage capable moving in at least two directions relative to the service station.

Various embodiments of the cleaning station include at least one receptacle for receiving a printhead, at least one nozzle for spraying a cleaning fluid towards a printhead face (or printing surface) of the printhead, and a wiper disposable in close proximity to the printhead face for removing excess cleaning fluid, in some cases without contacting the printhead face. The cleaning station can further include a splash guard for isolating the printhead face and preventing the cleaning fluid from migrating beyond the printhead face. The splash guard includes an open position and a sealed position, where the splash guard is biased open and is actuated from the open position to the sealed position by contact with a printhead. The splash guard can include a sealing lip that circumscribes the printhead face when in the sealed position. In one embodiment, the sealing lip is generally rectangular in shape. The wiper can be formed by one side of the sealing lip and can include a notched portion configured and located to correspond to a location of a jet nozzle array on the printhead face to prevent the wiper from contacting the jet nozzle array. The wiper is capable of movement relative to a printhead.

Further, the cleaning station can include a fluid source for providing the cleaning fluid to the at least one nozzle under pressure. The cleaning fluid can be provided to the at least one nozzle via a manifold. In one embodiment, the at least one nozzle includes an array of nozzles. The at least one nozzle can be positioned to spray the cleaning fluid across the printhead face. In one embodiment, the printheads are disposed within a carriage capable of movement in two directions with respect to the service station.

Various embodiments of the discharge station include a receptacle defining an opening that generally corresponds to a printhead face of a printhead. The receptacle defines a plurality of corresponding openings in one embodiment. The receptacle can include a tray for capturing and/or directing discharged fluids. In one embodiment, the discharge from the printheads is directed into a standing pool of waste liquid.

Various embodiments of the capping station include a printhead cap carrier and at least one printhead cap diposed on the carrier for sealing a printhead face of a printhead. The cap is moved between an off position and a capped position by the printhead contacting the carrier. The capping station can include a plurality of caps disposed on the carrier. In one embodiment, the carrier is biased to maintain the at least one cap in an off position. The discharge station and the capping station can be a combined station. In such an embodiment, the discharge from the printheads can be constrained in a cavity defined by a printhead face, a printhead cap, and the standing pool of waste liquid.

In another aspect, the invention relates to an apparatus for cleaning a printhead. The apparatus includes at least one nozzle for spraying a cleaning fluid towards a printhead face of the printhead and a wiper disposable in close proximity to the printhead face for removing excess cleaning fluid from the printhead face.

In one embodiment, the apparatus includes a splash guard for isolating a printhead face and preventing cleaning fluid from migrating beyond the printhead face. The splash guard can include an open position and a sealed position, where the splash guard is actuated from the open position to the sealed position by contact with a printhead. In addition, the splash guard can include a sealing lip that circumscribes the printhead face when in the sealed position. The sealing lip is generally rectangular in shape. In one embodiment, the wiper is formed by one side of the sealing lip. The wiper can include a notched portion configured and located to correspond to a location of a jet nozzle array on the printhead face to prevent the wiper from contacting the jet nozzle array. The wiper is capable of movement relative to a printhead. Additionally, the apparatus can include a fluid source for providing cleaning fluid to the at least one nozzle under pressure. The at least one nozzle can an array of nozzles and can be positioned to spray the cleaning fluid across a printhead face.

In another aspect, the invention relates to a method of cleaning a printhead. The method includes the steps of positioning a printhead face of the printhead relative to at least one nozzle, operating the at least one nozzle to spray cleaning fluid towards the printhead face, and causing relative movement between a wiper and the printhead to pass the wiper in close proximity to the printhead face to remove excess cleaning fluid. The wiper can include a notch configured and located on the wiper to correspond to a jet nozzle array on the printhead face to prevent the wiper from contacting the jet nozzle array.

In various embodiments, the step of positioning the printhead face includes sealing the printhead face to prevent the cleaning fluid from migrating beyond the printhead face. The operating step can include spraying the cleaning fluid across the printhead face. In addition, the printhead can be operated to discharge any cleaning fluid ingested by the printhead during cleaning. In one embodiment, the at least one nozzle comprises an array of nozzles.

In another aspect, the invention relates to an apparatus for cleaning a printhead used in a three-dimensional printer. The apparatus includes a sealing cap defining a cavity and capable of engagement with a printhead face of the printhead, a cleaning fluid source in communication with the cap for cleaning the printhead face, and a vacuum source in communication with the cap for removing used cleaning fluid and debris. In operation, the vacuum source creates a negative pressure within the cavity, the negative pressure preventing the cleaning fluid from entering a jet nozzle, drawing the cleaning fluid into the cavity from the cleaning fluid source, and/or drawing at least one of a binder fluid and debris from the jet nozzle. The apparatus may further include a wiper disposed proximate the cap, the wiper positioned to engage the printhead face as the printhead disengages from the cap.

In another aspect, the invention relates to a method of cleaning a printhead used in a three-dimensional printer. The method includes the steps of engaging a printhead face of the printhead with a sealing cap defining a cavity, drawing a vacuum in the cavity, and introducing a cleaning fluid into the cavity and into contact with the printhead face. The method may further include the step of removing the cleaning fluid from the cavity. In one embodiment, the method includes the steps of disengaging the cap from the printhead face and wiping the printhead face with a wiper. The step of drawing a vacuum creates a negative pressure within the cavity, the negative pressure drawing the cleaning fluid into the cavity, preventing the cleaning fluid from entering a jet nozzle and/or drawing at least one of a binder fluid and debris from the jet nozzle.

In still other embodiments, the invention can include alternative methods and apparatus for cleaning the printheads apparatus. Methods of cleaning the printhead can include wiping the printhead with a roller including a cleaning fluid, drawing a vibrating member across the printhead, drawing a cleaning fluid across the printhead by capillary action through a wick, and/or combinations thereof. In addition, the methods can include optionally the step of applying a vacuum to the printhead to remove debris. The apparatus for cleaning a printhead used in a 3D printer can include a wick disposed adjacent the printhead for drawing a cleaning fluid across the printhead.

In another aspect, the invention relates to an apparatus for cleaning a printhead used in a 3D printer. The pressure in the interior of a printhead is typically lower than atmospheric pressure. This negative pressure is balanced by the surface tension of the meniscuses that form over the outlets of the printhead nozzles. It is desirable to flush the accumulated powder off the face of the printhead with a clean wash solution without allowing the solution to be drawn into the printhead when the meniscuses are destroyed. This goal is achieved in this apparatus by maintaining an environment outside the printhead in which the pressure is lower than the pressure inside the head. In addition, this induced pressure differential causes binder to flow out of the heads through the nozzles, flushing out any powder that may have lodged in the nozzle passageways. The apparatus includes a base, a cam track disposed within the base, a cap carrier slidably engaged with the cam track, and a sealing cap defining a cavity and disposed on the carrier. The cap being transportable into engagement with the face of the printhead by the carrier. In various embodiments, the apparatus includes a cleaning fluid source in communication with the cap for cleaning the printhead face and a vacuum source in communication with the cap for removing used wash fluid and debris.

In further embodiments, the apparatus can also include a spring coupled to the carrier and the base to bias the carrier into a receiving position for receiving the printhead. In one embodiment, the carrier includes a stop disposed on a distal end of the carrier for engaging the printhead as the printhead enters the apparatus. The printhead slides the carrier rearward along the cam track after engaging the stop and until the printhead face and cap sealably engage. In a further embodiment, the apparatus includes a latch pawl coupled to the base for engaging with the carrier to prevent forward movement of the carrier and a wiper disposed on a proximal end of the carrier. The wiper is positioned to engage the printhead face as the printhead exits the apparatus.

In still another aspect, the invention relates to a method of cleaning a printhead used in a 3D printer. The method includes the step of receiving the printhead within an apparatus that includes a base, a cam track disposed within the base, a cap carrier slidably engaged with the cam track, and a sealing cap defining a cavity and disposed on the carrier. Additional steps include engaging the face of the printhead with the cap, drawing a vacuum on the cavity, and introducing a cleaning fluid into the cavity and into contact with the printhead face. In one embodiment, the method includes the step of removing the cleaning fluid from the cavity. The method can further include disengaging the cap from the printing surface and wiping the printing surface with a wiper as the printhead is withdrawn from the apparatus.

In another aspect, the invention relates to an apparatus for cleaning or reconditioning a printhead. The apparatus includes a nozzle array for spraying a washing solution towards a face of a printhead and a wicking member disposed in proximity to the printhead face for removing excess washing solution from the printhead face.

In various embodiments, the nozzle array includes one or more individual nozzles. The wicking member and the printhead are capable of relative movement. A fluid source can also be included in the apparatus for providing washing solution to the nozzle array under pressure. In another embodiment, the wicking member includes at least one of a permeable material and an impermeable material.

The nozzle array can be positioned to spray the washing solution at an angle with respect to the printhead face. In another embodiment, the wicking member is disposed in close proximity to the printhead face, without contacting print nozzles located on the printhead face. The spacing between the wicking member and the print nozzles can be automatically maintained. In one embodiment, the spacing is maintained by causing a portion of the wicking member to bear on the printhead face in a location removed from the print nozzles. The apparatus can also include a basin for collecting washing solution and debris.

In another aspect, the invention relates to a method of cleaning or reconditioning a printhead. The method includes the steps of positioning a face of the printhead relative to at least one nozzle and operating the at least one nozzle to spray washing solution towards the printhead face. Excess washing solution is then removed from the printhead face by passing a wicking member in close proximity to the printhead face, without contacting the printhead face.

In one embodiment, the step of operating the at least one nozzle includes spraying the washing solution at an angle to the printhead face. In another embodiment, the method can include the step of operating the printhead to expel washing solution ingested by the printhead during cleaning. The method can include automatically maintaining a space between the wicking member and print nozzles located on the printhead face by, for example, causing a portion of the wicking member to bear on the printhead face in a location removed from the print nozzles.

In another aspect, the invention relates to a method of determining when a printhead needs to be serviced. Servicing is needed to maintain adequate printhead performance. Servicing is a time-consuming activity, however, and some aspects of the servicing process are damaging to the printhead. It is therefore desirable to service a printhead on a schedule that balances the positive and negative impacts of the process.

One approach to identifying a printhead in need of service is to infer the state of the printhead indirectly from the information available about the ongoing printing process. It is common, for example, to perform printhead servicing at intervals based on the time elapsed since last service, the number of droplets dispensed since last service, and the number of layers printed since last service. Printhead service is performed when one or another of these indicative factors reaches a predetermined trigger value. Alternatively, service-triggering variables may be defined that are weighted functions of two or more indicative factors. In one implementation, the trigger values for one or more of the indicative factors are adjusted to match the characteristics of the powder and binder liquid materials in use. The specific factors and corresponding trigger values may be selected to suit a particular application, environment, and/or printhead.

It is particularly desirable to identify characteristics of the images being printed that can be related quantitatively to the need for printhead service. One such factor is based on the observation that the impact of droplets printed on the powder bed ejects less debris when the underlying previous layer was printed. The binder printed on the previous layer tends to bind the powder in the fresh layer, resulting in less debris being ejected, and correspondingly less debris accumulating on the printhead face. Accordingly, in one implementation, printhead servicing is performed when the number of droplets printed over previously unprinted powder reaches a predetermined trigger value. Alternatively, a service interval based on the number of droplets dispensed since the last service may be modified to take into account the proportion of the droplets that were printed over previously unprinted powder. In another implementation, the underlying layer is considered to be unprinted if the pixel immediately underneath or any of its near neighbors are unprinted.

In another aspect, the invention relates to a method of determining a condition of a printhead in use in a three-dimensional printer. The method includes the steps of acquiring a data value for at least one operational parameter of the printhead and comparing the data value to a threshold value, the relationship of the data value to the threshold value indicative of the condition of the printhead. In one embodiment, the method includes the step of initiating a service routine on the printhead if the data value exceeds the threshold value. The operational parameter can be selected from the group consisting of time elapsed, number of droplets dispensed by the printhead, number of layers printed, droplets dispensed over previously printed powder, droplets dispensed over previously unprinted powder, and combinations thereof. Additionally, the data value can be compensated during acquisition to account for an operational environmental factor of the three-dimensional printer, such as, for example, temperature, humidity, binder material, and/or build material.

In another aspect, the invention relates to a method of determining a condition of a printhead in use in a three-dimensional printer. The method includes the steps of counting droplets dispensed by the printhead and determining a percentage of the droplets that were dispensed over previously unprinted pixels. The method can include the step of initiating a service routine on the printhead if the percentage exceeds a threshold value.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention. In the following description, various embodiments of the present invention are described with reference to the following drawings, in which:

FIG. 2 is a schematic perspective view of a printhead carriage in accordance with one embodiment of the invention;

FIGS. 3A and 3B are a schematic perspective view and a schematic plan view, respectively, of a service station in accordance with one embodiment of the invention;

FIGS. 5A-5D are schematic representations of one embodiment of a printhead capping operation in accordance with one embodiment of the invention;

FIGS. 7A-7D are schematic representations of a printhead cleaning station in accordance with one embodiment of the invention;

FIGS. 8A-8H are schematic representations of an alternative embodiment of a printhead cleaning station in accordance with the invention;

FIGS. 10A-10D are schematic representations of yet another alternative embodiment of a printhead cleaning station in accordance with the invention;

FIGS. 11A-11J are schematic representations of one embodiment of an apparatus and method for cleaning a printhead in accordance with the invention;

FIG. 13 is a schematic perspective view of a printing operation in accordance with one embodiment of the invention;

FIGS. 14A and 14B are schematic representations of the impact of a liquid binder droplet on a build surface;

FIGS. 17A-17D are schematic representations of an alignment sensor system and associated electronics in accordance with one embodiment of the invention;

FIGS. 19A and 19B are detailed schematic representations of a test pattern in accordance with one embodiment of the invention;

DETAILED DESCRIPTION

Embodiments of the present invention are described below. It is, however, expressly noted that the present invention is not limited to these embodiments, but rather the intention is that variations, modifications, and equivalents that are apparent to the person skilled in the art are also included.

Figure 1:
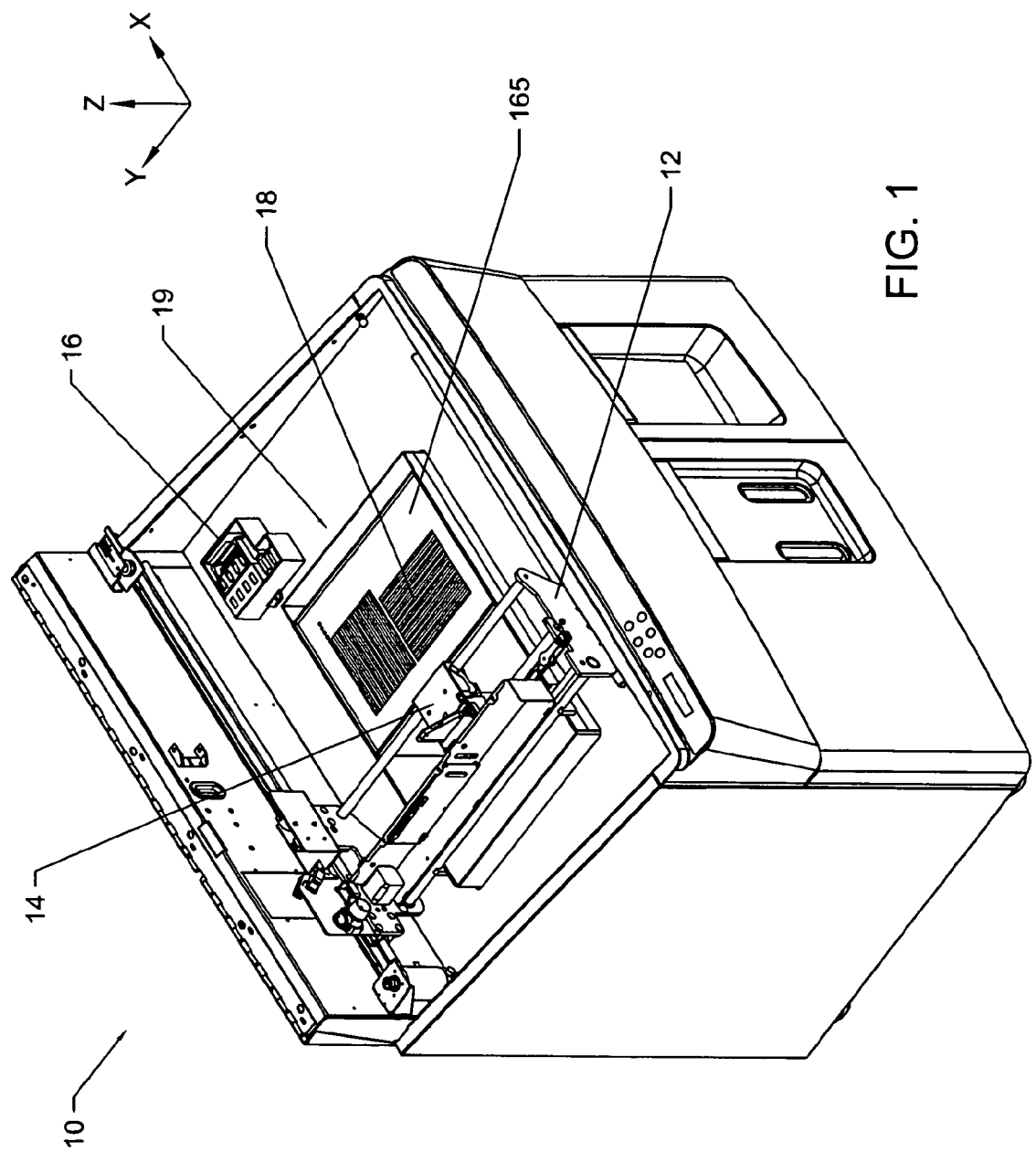
FIG. 1 is a schematic perspective view of a three dimensional printer in accordance with one embodiment of the invention.

In brief overview, FIG. 1 is a schematic representation of a 3D printer 10 for creating an object in accordance with one embodiment of the invention. The printer 10 produces three-dimensional objects by depositing alternating layers of build material and binder liquid on a build surface 165 or in a container to print multiple layers that ultimately form the three-dimensional object. In some embodiments, the build material may include a powder and the binder liquid may be incorporated into the build material. In some embodiments, the printer 10 may be used to create physical prototypes for viewing and design review. In other embodiments, the printer 10 may be used to create molds for casting operations, or prototypes that may be used to collect market feedback on a potential product.

The printer 10 shown includes a gantry 12, a carriage 14, a service station assembly 16, and a test pattern 18. Typically, the gantry 12 is actuatable along the X-axis to manufacture the object layer by layer. In some embodiments a motor may be coupled to the gantry 12. In other embodiments, the gantry 12 may be coupled to a screw, such that rotation of the screw moves the gantry 12 along the X-axis. In some embodiments, the gantry 12 may be actuatable along the vertical Z-axis. Other positioning systems may be employed, as desired.

The carriage 14 typically includes printheads 20 capable of dispensing binder materials necessary for creating an object (see FIG. 2). In some embodiments, as the gantry 12 moves along the X-axis, the carriage 14 moves back and forth along the Y-axis. The carriage 14 is coupled to the gantry 12. Thus, as the carriage 14 moves along with the gantry 12 across the printer 10, binder material may be deposited in a two dimensional pattern during travel across the surface of the printer 10 along the X-axis and the Y-axis. Then, typically, the next pass across the printer 10 will be at a different plane in the Z-axis, and material deposited in that z-plane on the Z-axis will bind with previously deposited material as part of the formation of the desired object. In one embodiment, a stepping-motor-driven piston underneath the build table provides Z-axis motion.

To further improve performance, the printer 10 also includes the service station 16. In some embodiments, the service station 16 is located at a fixed point on the printer 10. Generally, the service station 16 services the printheads 20 carried by the carriage 14. The service station 16 is generally the physical location where debris or excess materials that are on or about the printheads 20 are removed. In some embodiments, excess binder material is removed or discharged from the carriage 14. Generally, the carriage 14 is actuated into the service station 16 for maintenance, storage, or preservation from damage. Typically, the service station 16 may be located at any point on the printer 10 where it is possible for the carriage 14 to be actuated to engage the service station 16. Also included in the printer 10 is a test pattern 18. In some embodiments, the test pattern 18 is a test area passed over by the printhead 20 to refine alignment of the carriage 14 in creation of an object.

In some embodiments, the carriage 14 can be moved for diagnostic or service purposes. Moving the carriage 14 provides the user with access to the printheads 20 for maintenance purposes, such as cleaning or replacement. Printhead cleaning is described in detail with respect to FIGS. 6A-6D, 7A-7D, 8A-8H, 9A-9B, 10A-10D, 11A-11J, and 12. In some embodiments, the printheads 20 may be actuated to run a diagnostic routine of the printheads 20. In an alternative embodiment, the carriage 14 can be raised from the printer 10 for service purposes.

In one embodiment, the printer 10 includes an enclosure cover to contain any dust or other debris generated during a printing operation. The enclosed area can be heated to facilitate better reactions between the build material and the binder materials. Better reactions include, for example, faster reaction times and improved bonding. In one embodiment, the heating is accomplished by introducing warm air at a low velocity to the enclosed area. The flow of air is typically not directed at the build surface to prevent disturbing the build material after spreading. In one example, the enclosure temperature is maintained from about 90 degrees F. to about 150 degrees F., preferably from about 110 degrees F. to about 135 degrees F., and more preferably about 125 degrees F.

FIG. 2 depicts one embodiment of the carriage 14 in more detail. The carriage 14 generally includes one or more printheads 20. Typically, a printhead 20 is the apparatus through which binder liquid is ejected during the creation of an object. FIG. 2 shows four printheads 20; however, in other embodiments there may be more or fewer printheads 20. In some embodiments, the printheads 20 may be inserted into the carriage 14 such that they are offset from one another along the X-axis. In some embodiments, this offset is by substantially the same distance along the X-axis. In other embodiments, the printheads 20 may be staggered within the carriage 14 such that the distances between the printheads 20 vary.

Figure 3B:
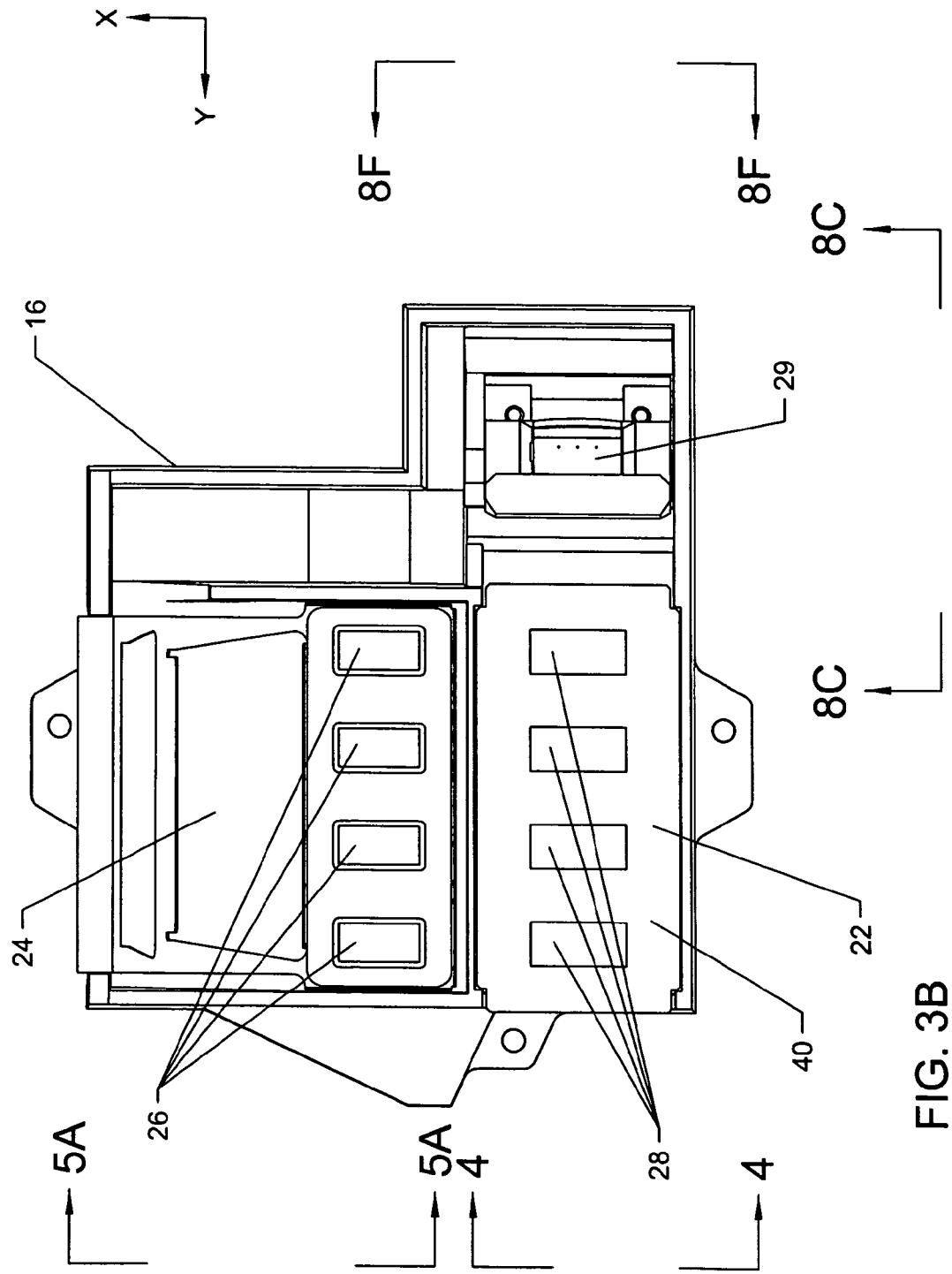

FIGS. 3A and 3B depict one embodiment of the service station 16 in greater detail. The service station 16 typically includes a discharge station 22, a printhead capping station 24, and a printhead cleaning station 29. In various embodiments, the carriage 14 may engage the discharge station 22, the printhead capping station 24, and the printhead cleaning station 29 in any order, and any number of times. In some embodiments, the carriage 14 may engage the same station, for example the discharge station 22, multiple times consecutively. In other embodiments, the carriage 14 can alternate repeatedly between any of the discharge station 22, the printhead capping station 24, and the printhead cleaning station 29 in any order, any number of times. In some embodiments, the printheads 20 of the carriage 14 engage the service station 16 in order to perform maintenance upon the printheads 20 during creation of an object.

Generally, the discharge station 22 includes discharge openings 28 through which the printheads 20 may discharge debris, such as, for example, contaminated binder. The number of the discharge openings 28 may vary. The discharge station 22 is typically an area where the printheads 20 may expel such material, thus preventing excess buildup of contaminants in the printheads 20 that could effect printing quality. Typically, debris entering the discharge station is contained so that it does not contaminate the printheads 20, the carriage 14, the service station 16, or any other component of the printer 10.

In some embodiments, the printheads 20 may be actuated to a point immediately above the discharge openings 28, where the printheads 20 discharge excess binding material or other waste through the discharge openings 28. Generally, this waste is collected in a receptacle 47 (see FIG. 4.) In some embodiments, the carriage 14 is actuated into a position immediately above the service station 16 and the printheads 20 are positioned above the discharge openings 28 at the surface of the service station 16. In some embodiments, the bottom surfaces of the printheads 20 may extend below the plane of the surface of the discharge openings 28, where the printheads 20 may discharge material in order to rid the printheads 20 of contamination or excess building materials. This material then enters the receptacle 47. In one embodiment, the discharge openings 28 are located above the receptacle 47. Generally, the receptacle 47 is a location below the discharge openings 28 where the printheads 20 discharge their material. In some embodiments, the receptacle 47 may include a reservoir for containing the discharged material.

Generally, the printhead capping station 24 is the area where the printheads 20 are capped by the printhead caps 26. In one embodiment, there is one printhead cap 26 for each printhead 20. Generally, as a result of the carrier 14 engaging the printhead capping station 24, the printhead caps 26 are actuated into a position circumscribing the printheads 20, such that the printhead caps 26 form a seal around the printhead face 54 (see FIG. 5D). The printhead caps 26 protect the printheads 20 against contamination, debris, and physical damage resulting from contact with the printheads 20, deterioration, and the elements in general. Generally, the printhead capping station 24 may cap printheads 20 at any point in time relative to the printheads 20 engaging the discharge station 22 or the printhead cleaning station 29. Generally, the printhead caps 26 enclose the printheads 20 in order to form a seal to prevent damage, such as drying out, from occurring to the printheads 20. In some embodiments, maintenance may include cleaning on or about the printheads 20. Only a single service station 16 is shown for descriptive purposes; however, multiple stations 16 may exist. Alternatively, a single service station 16 may service multiple printheads 20 by, for example, successively positioning the printheads 20 relative to the service station 16.

The printhead cleaning station 29 generally includes the area where the printheads 20 may be cleaned. In one embodiment, the printheads 20 may be cleaned with a pressurized washing solution 92 (see FIG. 8E). In some embodiments, the printheads 20 enter the printhead cleaning station 29 after the printheads 20 discharge material into the receptacle 47. In other embodiments, the printheads 20 may enter the printhead cleaning station 29 without first discharging material into the receptacle 47. In further embodiments, the printheads 20 may enter both the printhead cleaning station 29 and the discharge station 22 repeatedly and in any order. Typically, the cleaning station 29 cleans the printheads 20 by washing them in such a manner that any debris is removed from the printheads 20 and the pressurized washing solution 92 itself is contained so it does not contaminate the printheads 20, or any other part of the printer 10. For example, in one embodiment, the printheads 20 are cleaned in a sealed environment to contain any debris and cleaning materials. In another embodiment, the printheads 20 are protected during cleaning so that there is no excess debris or cleaning materials left on the printheads 20 that may later drip onto any component of the printer 10, for example, the build surface 165. In one embodiment, the printheads 20 are cleaned one at a time. In another embodiment, the printheads 20 may be cleaned simultaneously. In other embodiments, the printhead(s) 20 may be cleaned repeatedly, in any order, and at any time relative to engagement of the carrier 14 with any other components of the service station 16. In one embodiment, the printer 10 includes logic for determining when to clean the printheads 20, as discussed in greater detail hereinbelow.

FIG. 3B is a plan view of the service station 16 of FIG. 3A. From this perspective, the carriage 14 is actuated along the X-axis such that the printheads 20 are aligned with the discharge openings 28. In one embodiment, upon completion of this alignment, the printheads 20 discharge residual or waste material through the discharge openings 28. In some embodiments, the discharge may include binder material or other building material. In some embodiments, after discharge, the printheads 20 are further actuated along the X-axis to the printhead capping station 24, where the printhead caps 26 form a seal around the printheads 20. The seal formed by the printhead caps 26 around the printheads 20 generally protects the printheads 20 from the elements, contamination from debris or left over binding material, and prevents the printheads 20 from drying out.

Figure 4:
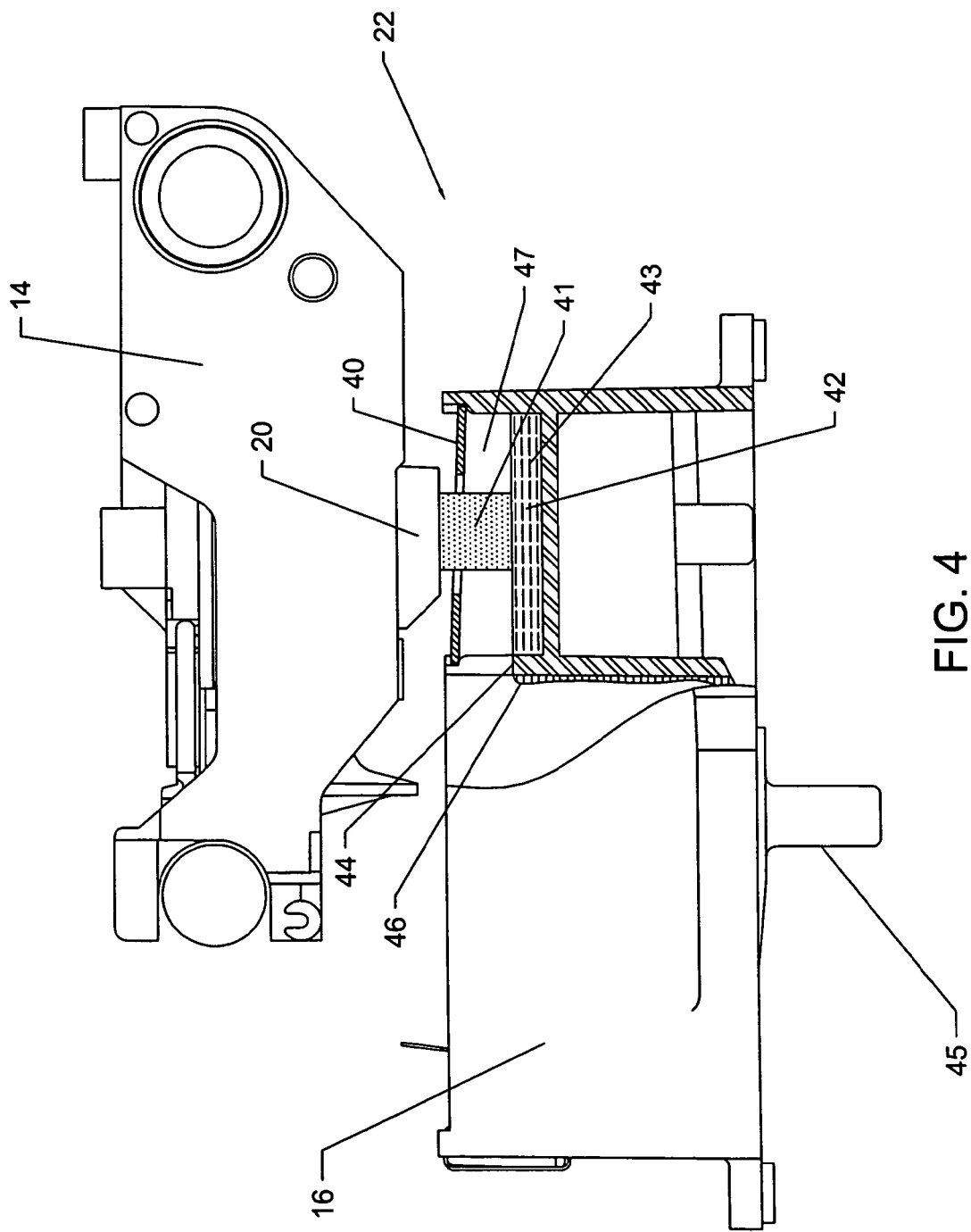
FIG. 4 is a schematic representation of the interaction between the carriage and the service station during performance of a discharge function in accordance with one embodiment of the invention.

FIG. 4 is a graphical representation of the discharge function of an embodiment of the invention, whereby binder material and debris 41 is discharged from the printhead 20. In some embodiments, the binder debris 41 may include excess building material. In some embodiments, this discharge function is performed after every pass of the carriage 14 across the build surface 165. In other embodiments, the discharge function may be performed periodically after any given number of passes of the carriage 14. In still other embodiments, this function may be performed at fixed time intervals. In this illustrative embodiment, the carriage 14 is positioned above the service station 16 such that the printhead 20 is lined up over a spatial gap in between the aperture plates 40. In some embodiments, the aperture plates 40 include the solid surface surrounding the discharge openings 28 (see FIG. 3B). After proper positioning of the carriage 14, the printhead 20 discharges the debris 41 or other waste. Generally, this debris 41 includes contaminants, such as, for example, excess binder material left in the printhead 20. In one embodiment, the debris 41 joins the waste liquid 42 in the waste liquid catch tray 43. In some embodiments, the waste liquid 42 may include discharge from past discharges of the printheads 20. Upon discharge, the droplets of binder liquid 41 impinge upon the surface of the standing pool of waste liquid 42, minimizing splash and the consequent generation of undesirable waste liquid aerosols. A spillway 44 is located at a distance above the bottom of receptacle 47 sufficient to maintain the standing pool of waste liquid 42. Generally, the waste liquid 42 then proceeds down the spillway 44 where it eventually exits the service station 16 via a drain 45. In some embodiments, any overflowing waste liquid 46 also exits the waste liquid catch tray 43 via the drain 45, thus preventing contamination to the service station 16.

Figure 5A:
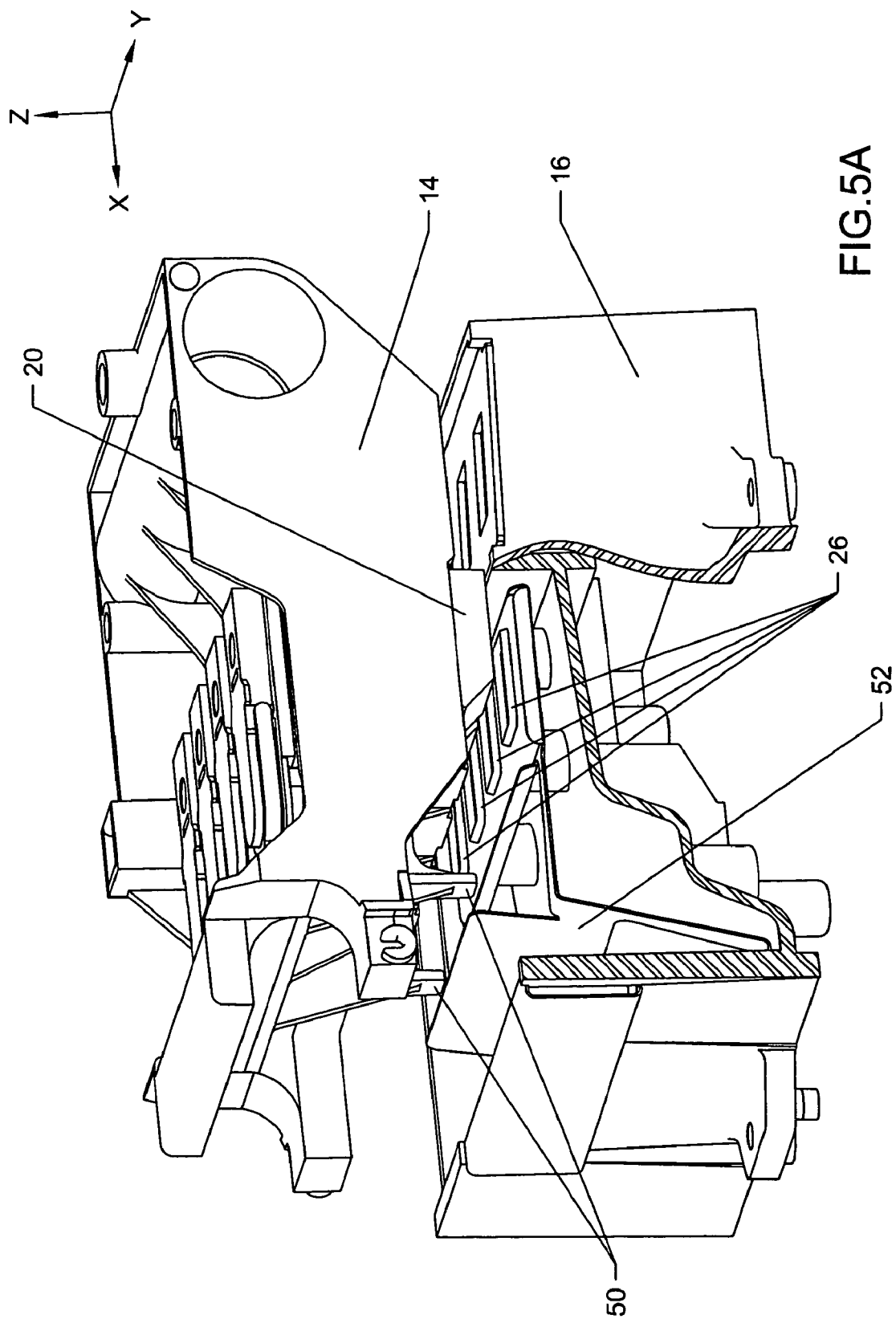
Figure 5B:
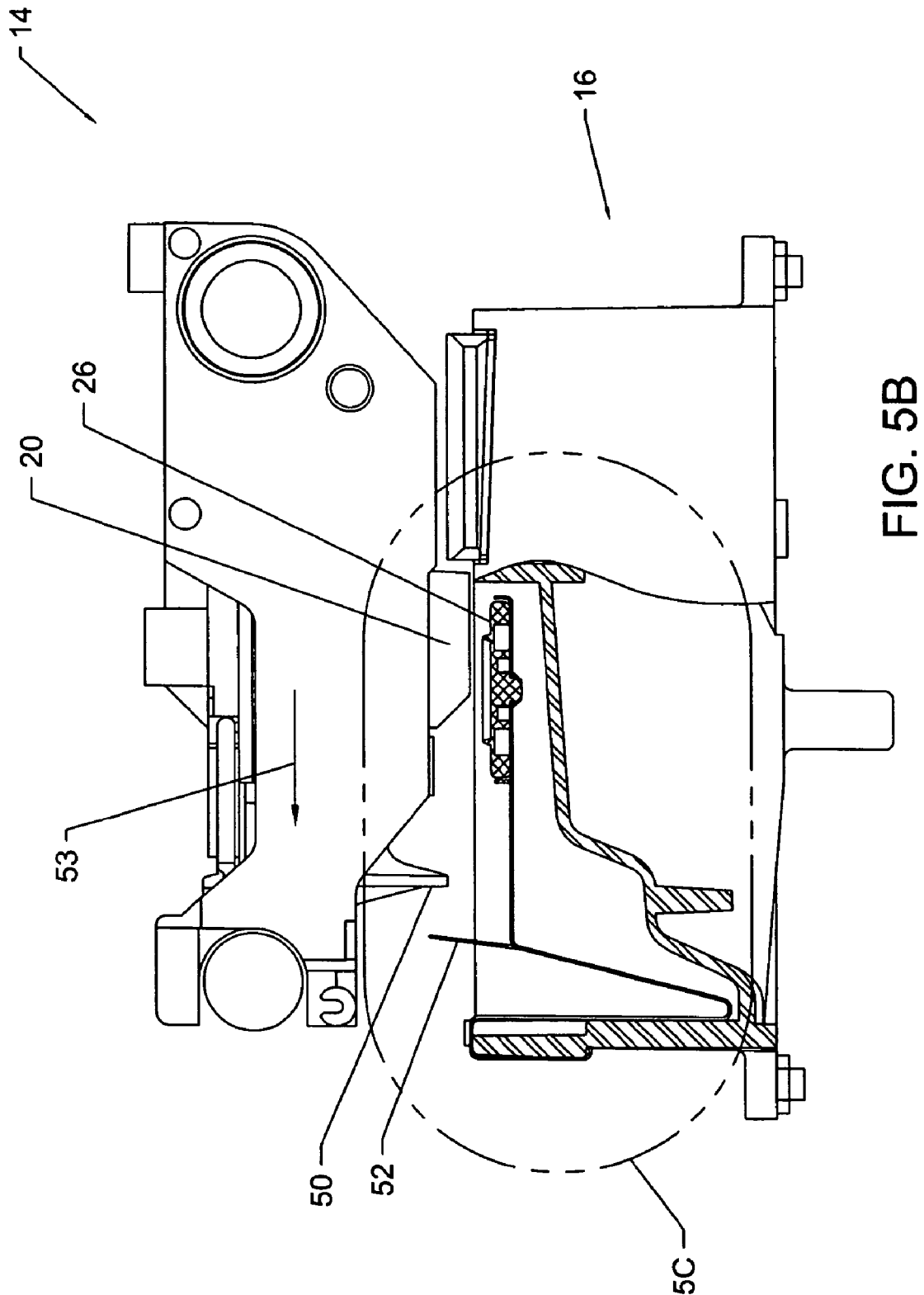

FIG. 5A illustrates one embodiment of the capping function of the invention, whereby each printhead 20 is sealed by a cap. In some embodiments, this capping function may be performed after any given number of passes across the printer 10. In still other embodiments, this function may be performed at a fixed time interval or after completion of printing. In FIG. 5B, the carriage 14 is actuated along the X-axis and positioned over the service station 16. In this illustrative embodiment, there is a spatial gap between the printhead 20 and the printhead cap 26. At this point, the printhead cap 26 has not yet capped the printhead 20. Generally, the printhead cap 26 remains stationary until the printhead cap actuator 50 engages the printhead cap carrier 52. In some embodiments, the carriage 14 has already moved beyond the aperture plate 40 and the discharge openings 28 and, thus, in some embodiments, the printhead 20 may have already expelled debris 41 into the waste liquid catch tray 43. In some embodiments, the carriage 14 may have already actuated over the printhead cleaning station 29. In some embodiments, as the carriage 14 continues actuation along the X-axis, the printhead cap actuator 50 engages the printhead cap carrier 52. Generally, the printhead cap actuator 50 may include metal, plastic, or rubber appendages of sufficient rigidity to move the printhead cap carrier 52 along the X-axis along with the carriage 14.

FIGS. 5C-5D illustrate the completion of the capping function. Typically, the printhead cap carrier 52 is a metal or other solid material fixed to the service station 16 and including a spring coefficient, such that movement of the carriage 14 and the printhead cap actuator 50 along the X-axis causes the printhead cap carrier 52 to move along the X-axis in this same direction. In some embodiments, this X-axis movement of the printhead cap carrier 52 then causes the printhead caps 26 to move along the Z-axis where they eventually cap the printheads 20. In other embodiments, the carriage 14, including the printhead cap actuators 50, and the printhead cap carrier 52 cease movement in the direction of carriage motion 53, and the printheads 20 are capped.

Generally, the printhead cap actuator 50 engages the printhead cap carrier 52, causing the printhead cap carrier 52 to move in the direction of the printhead cap actuator 50 motion. In some embodiments, the printhead cap carrier 52 includes a spring element 601, whereby the printhead cap carrier will pivot relative to the outer wall of the service station 16 when the spring 601 element is compressed. This pivot results in an uneven actuation of the printhead cap 26 towards the printhead 20. As a result, the edge of the printhead cap 26 farthest from the printhead cap actuator 50 will initiate contact with the printhead 20. In other embodiments, it is the edge of the printhead cap 26 located closest to the printhead cap actuator 50 that initially contacts the printhead 20 first. In either of the above illustrative embodiments, the printhead cap 26 continues actuation towards the printhead 20 until the printhead cap 26 levels off and circumscribes the printheads 20. In some embodiments, the printhead cap 26 forms a seal around the printheads 20. In one embodiment, one printhead 20 is capped by one printhead cap 26. In one embodiment multiple printhead caps 26 cap multiple printheads 20. Generally, there is one printhead cap 26 used each printhead 20. Generally, the printheads 20 may be capped by the printhead caps 26 any number of times and in any order relative to engagement of the carriage 14 with any other component of the printer 10.

As shown in FIGS. 5C and 5D, the printhead cap carrier 52 includes an arm 600, a spring element 601, and a plate 602. Generally, the arm 600 is engaged by the printhead cap actuator 50 and is moved in the direction of the printhead cap actuator 53 motion. This movement causes the spring element 601 to compress, resulting in a pivoting motion. This pivoting motion causes the plate 602 to move towards the printhead 20. The printhead cap 26 is typically disposed on a top surface of the plate 602. In one embodiment, the plate 602 is rigid and, thus, the printhead cap 26 approaches the printhead 20 on a skew, such that one edge of the printhead cap 26 engages the printhead 20 before any of the other edges of the printhead cap 26 engage the printhead 20. In various embodiments, any edge of the printhead cap 26 may first engage the printhead 20. Typically, after the first engagement between any edge of the printhead cap 26 and the printhead 20 the plate 602 continues its motion until the printhead cap 26 circumscribes the printhead 20. Specifically, the plate 602 may bend or flex in response to the actuation force of the carriage 14 until the plate 602 adopts a substantially horizontal orientation.

FIG. 5C includes a cutaway cross-sectional view of the service station 16 and the carriage 14. In this illustrative embodiment, the carriage 14 is actuated along the X-axis in the indicated direction of carriage motion (arrow 53). The printhead cap actuator 50 will come into contact with the printhead cap carrier 52 and both the printhead cap actuator 50 and the printhead cap carrier 52 will move in the direction of carriage motion 53. In this illustrative embodiment, the printhead cap 26 is located upon the printhead cap carrier 52. Thus, movement of the printhead cap carrier 52 in the direction of carriage motion 53 causes the printhead cap 26 to move along the Z-axis. FIG. 5C includes a cut-away graphical representation of the carriage 14 and the service station 16. FIG. 5C illustrates the point of contact between the printhead cap actuator 50 and the printhead cap carrier 52 as the carriage 14 moves in the direction of carriage motion 53. In this embodiment, at this point, there is a spatial gap between the printhead 20 and the printhead cap 26 and therefore the printhead cap 26 has not sealed the printhead 20.

FIG. 5D is a graphical representation of the carriage 14 and the service station 16 at a point forward in time from that of FIG. 5C, such that the printhead cap 26 has capped the printhead face 54 of the printhead 20. Typically, the printhead face 54 includes the bottom face of the printhead 20 including and surrounding the point where the binder material is expelled from the printhead 20. In this illustrative embodiment, the carriage motion 53 has caused the printhead cap actuator 50 to engage and move the printhead cap carrier 52 in the direction of carriage motion 53. In this embodiment, the printhead face 54 has a protective seal formed around it by the printhead cap 26. Generally, the cap or seal is sufficient to protect the printhead face 54 from damage or contamination. In some embodiments, the seal formed by the printhead cap may be airtight.

Figure 6A:
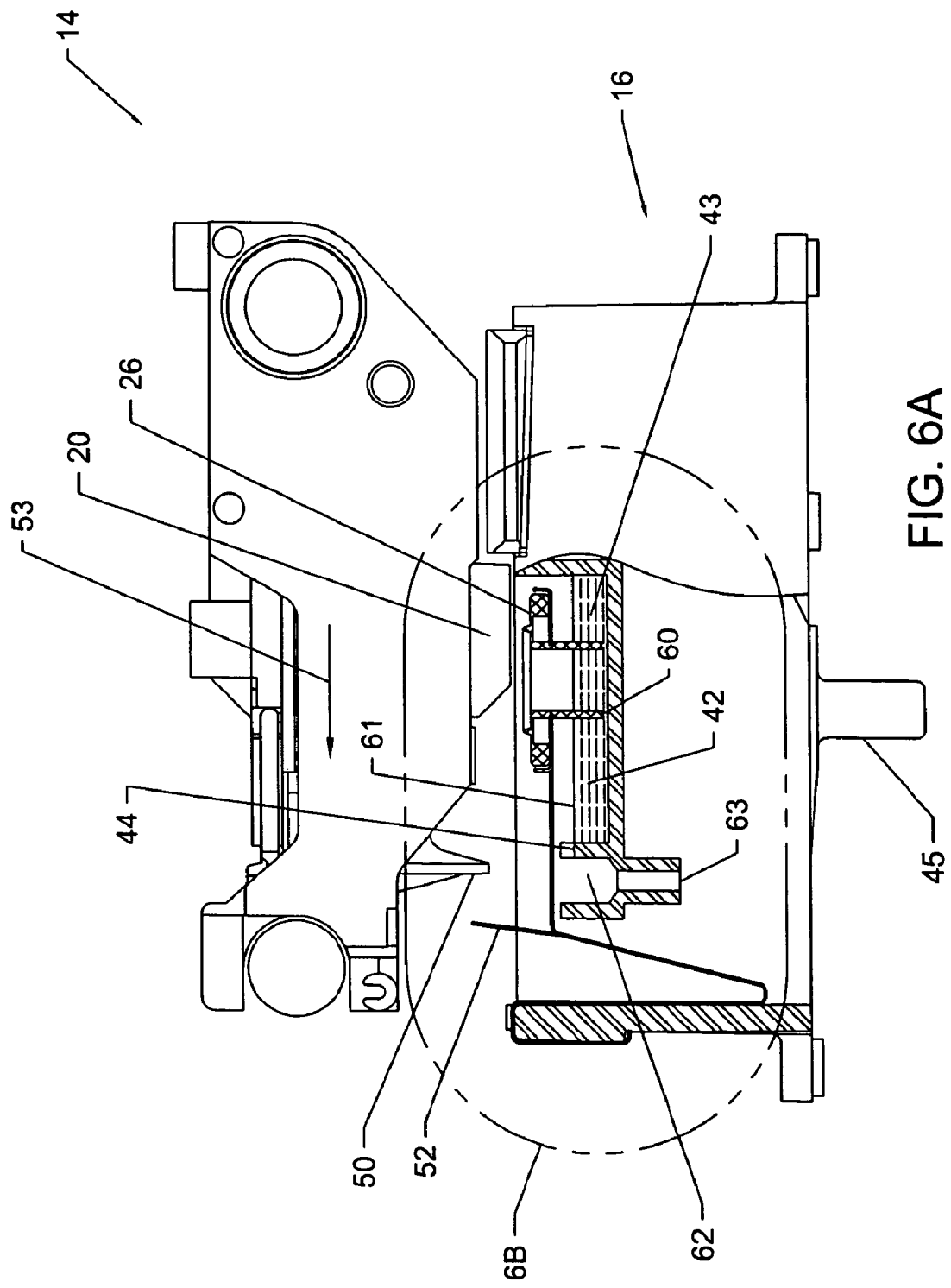
FIGS. 6A-6D are schematic representations of a printhead discharge and capping operation in accordance with an alternative embodiment of the invention.

FIG. 6A is a partial cross sectional side view of an alternative embodiment of a service station 16 including a combined discharge and capping station. In this illustrative embodiment, the carriage 14 is actuated in the direction of carriage motion 53, (along the X-axis) and positions itself over the service station 16. In some embodiments, this actuation of the carriage 14 may be in preparation for discharge from the printhead 20. In this illustrative embodiment, the waste liquid catch tray 43 includes waste liquid 42. Generally, this waste liquid 42 was produced by previous discharges from past passes of the printhead 20 over the service station 16. In some embodiments, the lower edge of the printhead cap 60 may extend into the area defined by the waste liquid catch tray 43, but generally the lower edge of printhead cap 60 does not contact the bottom surface of the waste liquid catch tray 43 and, thus, waste liquid 42 flows freely and collects in waste liquid catch tray 43 until the waste liquid surface 61 rises to the top of spillway 44. At this point, the waste liquid 42 then enters the waste liquid overflow tube 63 via overflow slot 62. Generally, waste liquid overflow tube 63 carries the waste liquid 42 out of the service station 16.

Figure 6C:
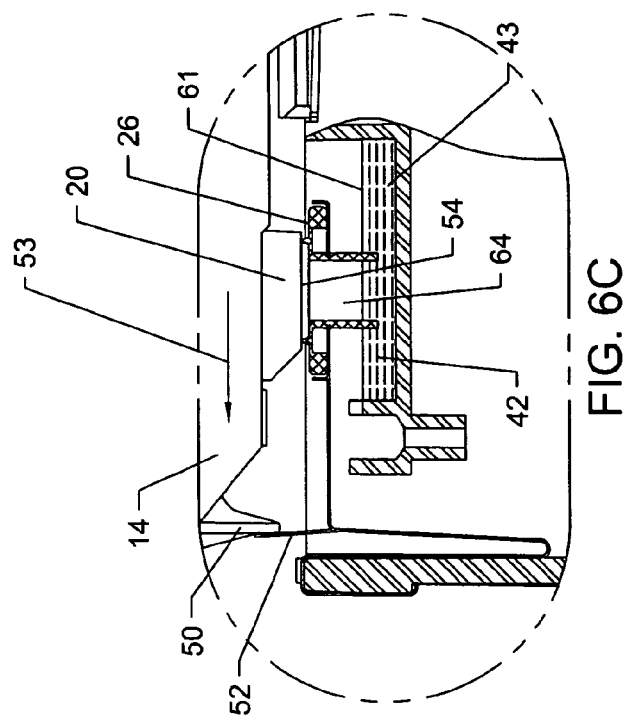
Figure 6B:
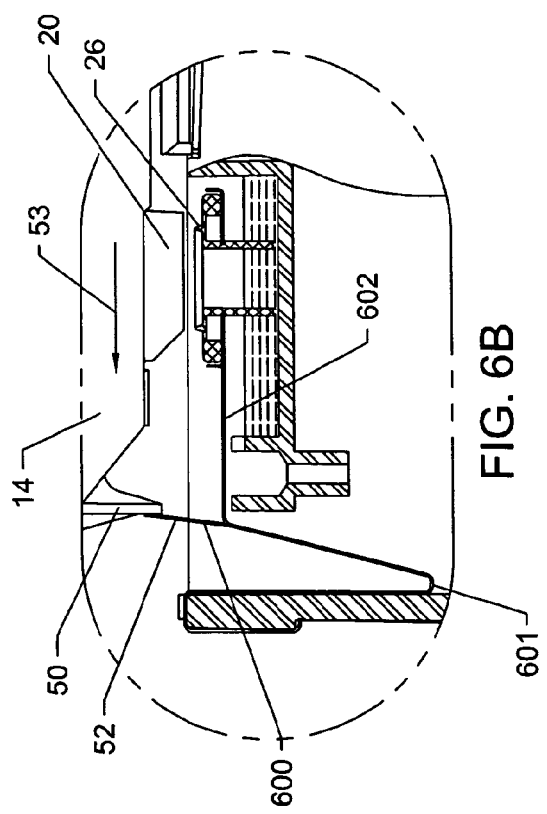
Figure 6D:
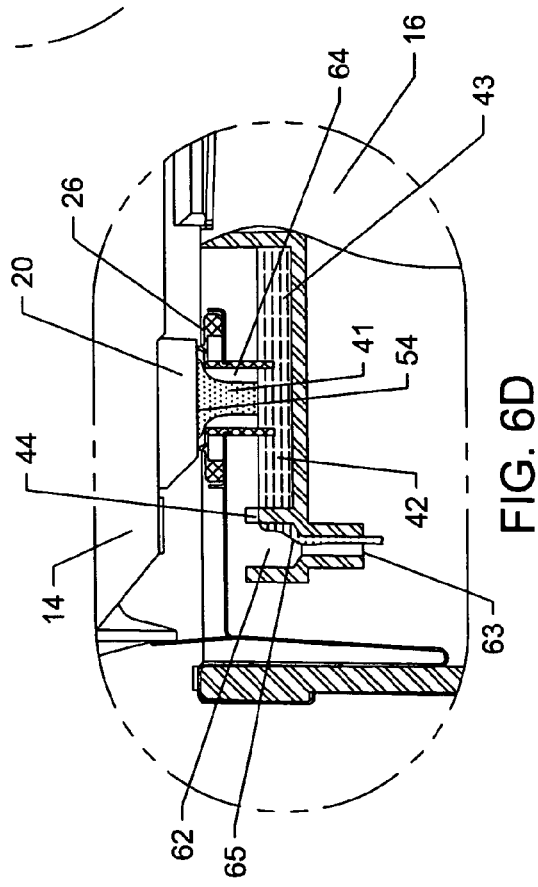

FIGS. 6B through 6D depict the capping and the discharge functions in greater detail. The carriage 14 is moving in the direction of carriage motion 53, and is being positioned over the service station 16. FIG. 6B illustrates an embodiment where contact has been made between the printhead cap actuator 50 and the printhead cap carrier 52, but where the printhead cap carrier has not yet moved far enough in the direction of carriage motion 53 to lift the printhead cap 26 to a position where it caps the printhead 20. FIG. 6C illustrates an embodiment of a point further in time from that of FIG. 6B. As shown in FIG. 6C, the printhead cap carrier 52 has moved the necessary distance in the direction of the carriage motion 53 to lift the printhead cap 26 to a point where it has formed a seal around the printhead 20. The capping function is substantially similar to that described with respect to FIGS. 5A-5D. In some embodiments, the printhead cap 26 includes a discharge column 67 that defines a cavity 64. The printhead 20 discharges to the waste liquid catch tray 43 through the discharge column. As shown in FIG. 6C, the printhead 20 expels debris 41 into the waste liquid catch tray 43, where it mixes with any existing waste liquid 42. In some embodiments, the collection of the waste liquid 42 will cross the spillway 44 and proceed to travel through the overflow slot 62 and down waste liquid overflow tube 63 as overflowing waste liquid 65, where it is eventually expelled from service station 16. Generally, this discharge procedure ensures a clean and clog free printhead 20 and printhead face 54 to maintain the highest possible quality three dimensional printing. In some embodiments, multiple printheads 20 may discharge material at substantially the same time.

Referring again to FIG. 6C, in some embodiments, a seal may be formed in the area defined by the discharge cavity 64. Generally, the cavity 64 is bounded on the top by the printhead 20 and the printhead cap 26, on the bottom by the waste liquid surface 61, and on the sides by the discharge column 67. In one embodiment, the level of the surface of the waste liquid 61 in the waste liquid catch tray 43 is sufficiently high to submerge a bottom portion of the discharge column 67. The bottom portion of the discharge column 67 has a lowest point below the lowest point of the spillway 44, which prevents the waste liquid 42 from dropping below the lowest portion of the discharge column. In such a case, and where the printhead cap 26 is sealed against the printhead face 54 of the printhead 20, the cavity 64 is airtight, thereby preventing the printhead face 54 from drying out. In this embodiment, the discharge 41 is prevented from escaping the cavity 64 in any direction other than through the waste liquid overflow tube 63, where it harmlessly exits the service station 16. This exemplary embodiment minimizes the risk of contamination by the discharge 41 to any components of the printer 10.

FIGS. 7A-7D depict one embodiment of a printhead cleaning station 500 in accordance with the invention. The printhead cleaning station 500 may also be mounted in the service station 16. The printhead cleaning station 500 includes a reservoir 542 that holds a washing solution 543 and a pump 545 that delivers the washing solution 543 under pressure to at least one nozzle 540 and preferably an array of nozzles 540. The nozzles 540 are capable of producing a high velocity stream of washing solution 543. In operation, the nozzles 540 are directed to the printhead face 577 of the printhead 520. When directed onto the printhead face 577, the washing solution 543 loosens and removes contaminants, such as build material and binding material, from the printhead face 577. The orientation of the nozzles 540 may be angled with respect to the printhead face 577, such that a fluid flow is induced across a plane of the printhead face 577. For example, the washing solution can contact the printhead 520 at the side nearest the nozzles 540 and drain from the side of the printhead 520 furthest from the nozzles 540. This approach improves the efficacy of the stream of washing solution 543 by reducing the accumulation of washing solution on the printhead face 577, as well as the amount of washing solution 543 and debris that would otherwise drain near and interfere with the nozzles 540. A splash guard may also be included in the printhead cleaning station 500 to contain splashing resulting from the streams of liquid washing solution 543.

It is desirable to remove a large portion of the washing solution 543 that remains on the printhead face 577 after the operation of the nozzles 540 is complete. This is conventionally accomplished by drawing a wiping element across the printhead face 577. A disadvantage of this approach is that contact between the wiping element and the printhead face 577 may degrade the performance of the printhead 520 by, for example, damaging the edges of the inkjet nozzle orifices. Accordingly, it is an object of this invention to provide a means of removing accumulated washing solution from the printhead face 577, without contacting the delicate region around the inkjet nozzles. In one embodiment, a wicking member 544 may be disposed such that the printhead face 577 may pass one or more times over its upper surface 546 in close proximity, without contact, allowing capillary forces to draw accumulated washing solution 543 away from the printhead face 577. The wicking member 544 may be made from rigid, semi-rigid, or compliant materials, and can be of an absorbent or impermeable nature, or any combination thereof.

For the wicking member 544 to effectively remove accumulated washing solution 543 from the printhead face 577, the gap between the upper surface 546 of the wicking member 544 and the printhead face 577 must be small, a desirable range being between about 0 inches to about 0.03 inches. A further object of this invention is to provide a means for maintaining the gap in this range without resort to precise, rigid, and costly components.

In another embodiment, the wicking member 544 may consist of a compliant rubber sheet oriented approximately orthogonal to the direction of relative motion 547 between the wicking member 544 and the printhead 520 and with a portion of its upper surface 546 disposed so that it lightly contacts or interferes with the printhead face 577 only in non-critical areas away from the printhead nozzle orifices. The upper surface 546 of the wicking member 544 may include one or more notches 548 at locations where the wicking member 544 might otherwise contact delicate components of the printhead face 577. System dimensions are selected so that the wicking member 544 always contacts the printhead face 577, and is deflected as the printhead 520 passes over it, independent of expected variations in the relative positions of the printhead 520 and the printhead cleaning station 500. The upper surface 546 accordingly follows the position of the printhead face 577, maintaining by extension a substantially constant space between the printhead face 577 and the relieved surface notch 548. To further prolong the life of the printhead 520, a bending zone of the wicking member 544 can be of reduced cross-section to provide reliable bending behavior with little deformation of the upper surface 546 of the wicking member 544.

FIGS. 7B-7D illustrate a reconditioning cycle in accordance with the invention. FIG. 7B shows the printhead 520 approaching the printhead cleaning station 500 along a path designated by arrow 547. When the printheads 520 lightly contact the wicking member 544, as shown in FIG. 7C, motion stops along the path 547 and the washing solution 543 is directed at the printhead face 577 by the nozzle array 540. When the spraying operation is complete, the printhead 520 continues to travel along the path 547, as shown in FIG. 7D. The wicking member 544 is further deflected to allow passage of the printhead 520, and the accumulated washing solution 543 is wicked away from the printhead face 577. After being sprayed and wiped, in some embodiments the printhead 520 may print a plurality of droplets to eject any washing solution that may have been ingested during the reconditioning process.

Additional cleaning methods are contemplated, such as wiping the printhead face 577 with a cylindrical "paint roller" that cleans and moistens itself by rolling in a reservoir of wash fluid. In another embodiment, a cleaning system could include a continuous filament that carries wash fluid up to printhead face 577 and carries debris away to a sump. The system may include a small scraper that can be run over the filament to remove built up debris.

Figure 8A:
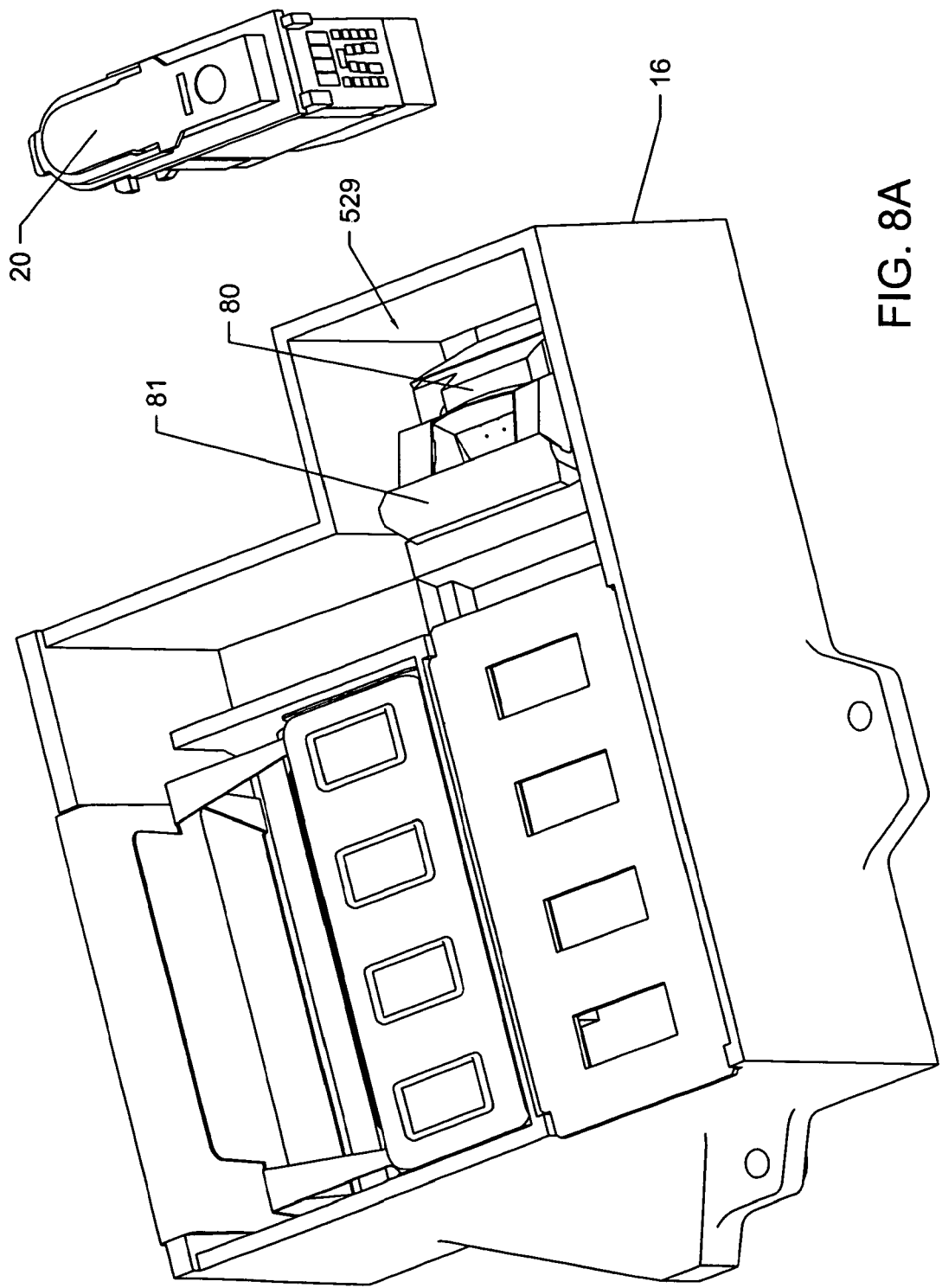

FIG. 8A depicts an alternative embodiment of cleaning a station 529 in accordance with the invention. Generally, the printer 10 is capable of determining when to clean the printheads 20 via the service station 16, as will be described in greater detail hereinbelow. In some embodiments, only a single printhead 20 is cleaned by the service station 16. In other embodiments, multiple printheads 20 are cleaned. In some embodiments, the service station 16 includes a nozzle manifold 80. Generally, the nozzle manifold 80 includes at least one nozzle 540 and preferably and array of nozzles 540. In some embodiments, the service station 16 includes a splash guard 81. Generally, the splash guard 81 is included in the printhead cleaning station 529 to contain splashing resulting from the streams of the washing solution 543. Typically, the splash guard 81 prevents contamination of powder or binding material by containing the washing solution 543. Generally, the cleaning station 529 operates the same as the cleaning station 500 described with respect to FIGS. 7A-7D, except for the addition of the manifold 80 and the splash guard 81.

Figure 8B:
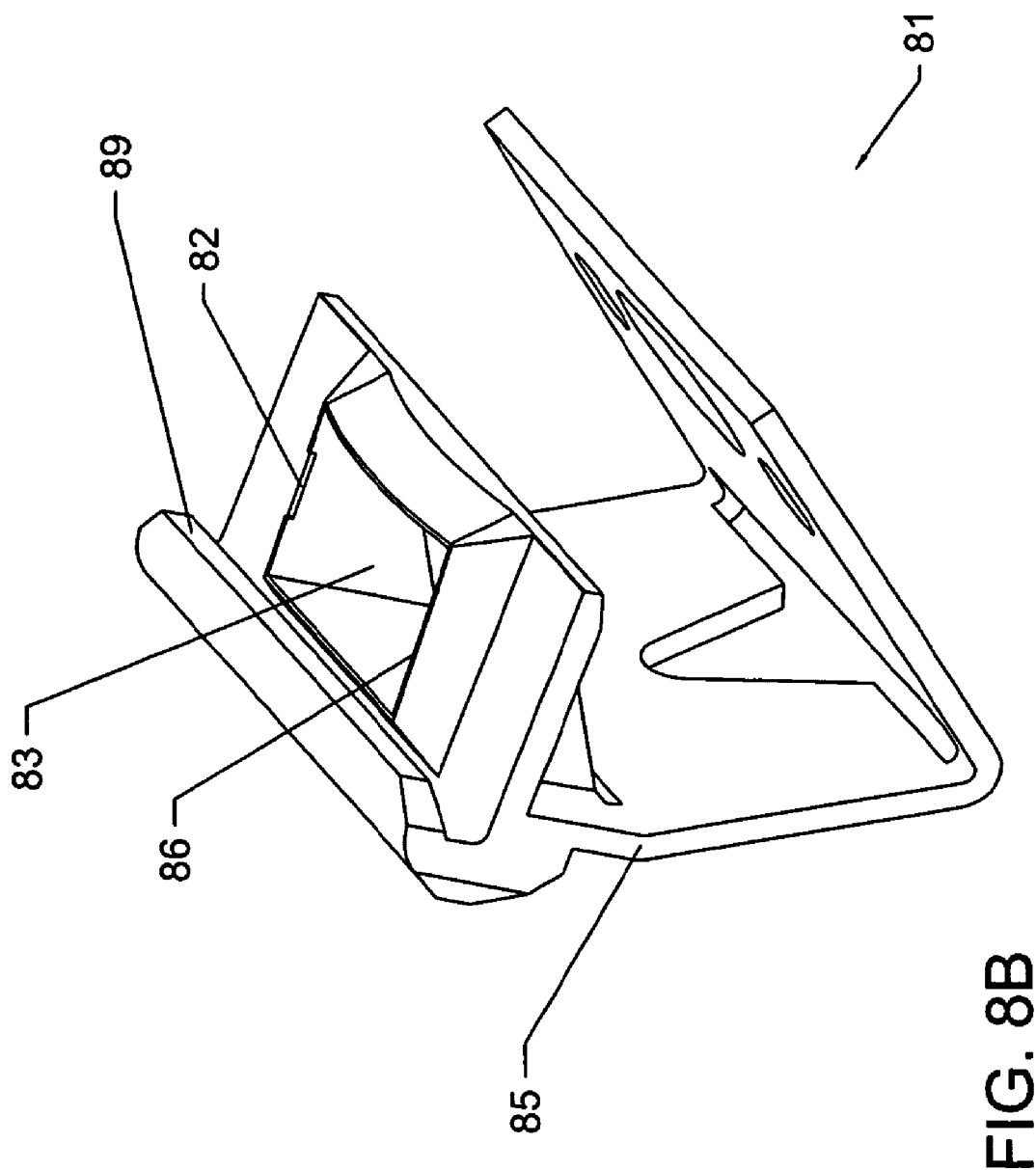

FIG. 8B is a graphical representation of the splash guard 81 that is located in the printhead cleaning station 529. The splash guard 81 generally includes a notch 82, a drain aperture 83, an actuation face 89, a flexure point 85, and a sealing lip 86. FIGS. 8C-8H depict the operation of the cleaning station 529. Typically, the printhead 20 is actuated such that the printhead face 54 passes immediately over the notch 82 without contacting the surface of the notch 82. Typically, avoiding contact between the printhead face 54 and notch 82 prevents damaging or altering the trajectory of jet nozzles on the printhead face 54. In one embodiment, the sealing lip 86 may act as a wiper, contacting the printhead 20 adjacent to the printhead face 54 without contacting the printhead face 54 itself. Once the printheads 20 have cleared the notch 82, they enter the space immediately above the drain aperture 83. Generally, the drain aperture 83 is for passing the washing solution 543. Once the printhead 20 is positioned roughly over the drain aperture 83, the printhead 20 engages the actuation face 89. Typically, the printhead 20 engages the actuation face 89 in such a way as to cause the splash guard 81 to flex along the flexure point 85. In some embodiments, the flexure point 85 includes a pivot point allowing at least the portion of the splash guard 81 including the notch 82, the drain aperture 83, the actuation face 89, and the sealing lip 86 to pivot in the direction of actuation of the printhead 20. Generally, this pivot at the flexure point 85 raises the drain aperture 83 to the printhead 20 such that the sealing lip 86 contacts the printhead 20. Generally, the sealing lip 86 is actuated into a position where it forms a seal around the printhead face 54. Typically, the seal formed by the sealing lip 86 is watertight, thus preventing the washing solution 543 from contaminating the printer 10. Generally, the only available outlet for used washing solution 543 is through the drain aperture 83.

Figure 8C:
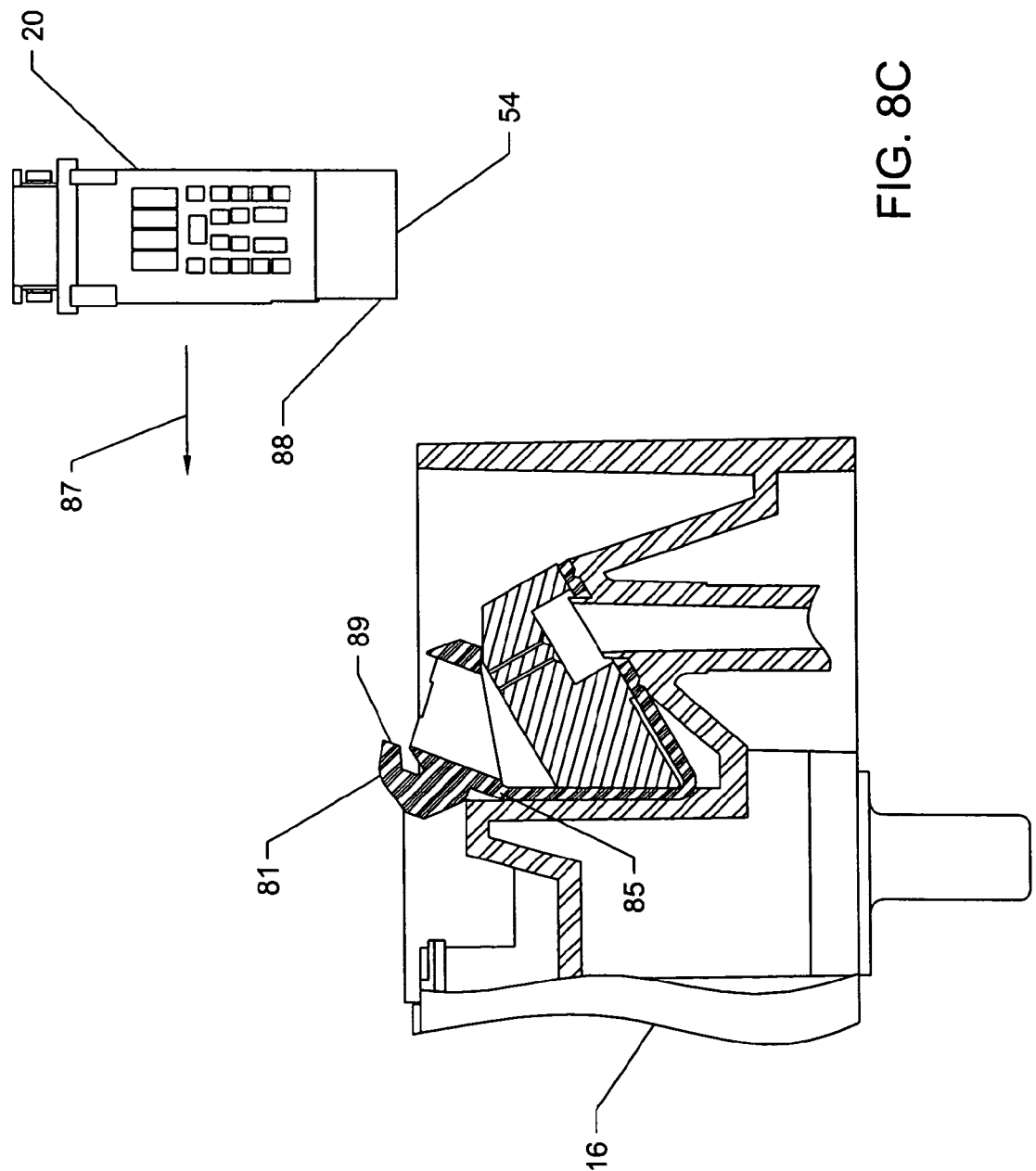

FIG. 8C includes another perspective of the printhead 20 as it approaches the service station 16. FIG. 8C generally represents the starting position of the cleaning operation performed by the service station 16. In this illustrative embodiment, the printhead 20 is actuated in the direction of the printhead motion 87 such that the printhead face 54 is brought above the service station 16. As the printhead 20 is being actuated, the printhead side 88 will engage the actuation face 89 of the splashguard 81. After this engagement, the printhead 20 moves the actuation face 89 such that the sealing lip 86 forms a seal around the printhead face 54 (see FIG. 8D). In some embodiments, the actuation face 89 pivots at the flexure point 85. In some embodiments, the flexure joint 85 may include a spring element. Generally, this procedure results in the forming of a watertight seal by the splash guard 81 around the underside of the printhead 20 adjacent to the printhead face 54.

Figure 8D:
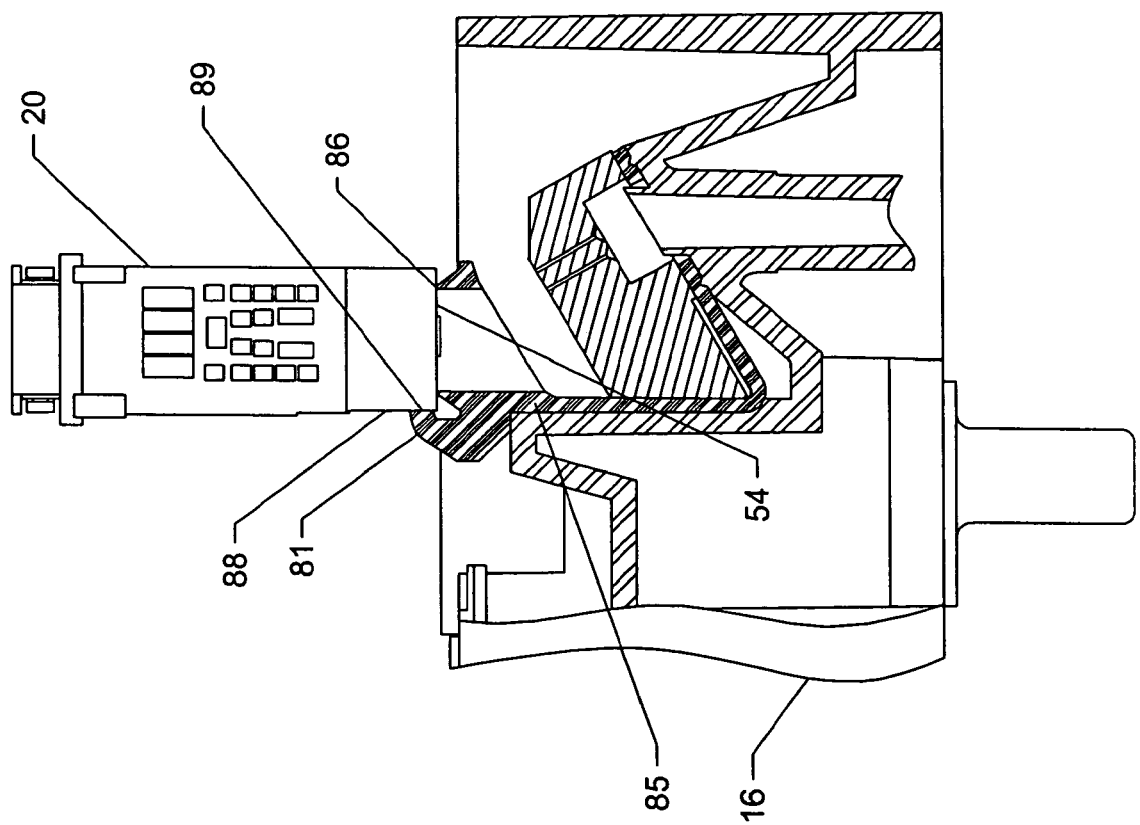

FIG. 8D depicts the printhead 20 moved into its desired position over the service station 16. Generally, this is the point at which the service station 16 will clean the printhead 20. As illustrated in FIG. 8D, the actuation face 89 seals the printhead 20 around part of the printhead face 54. The seal is completed around the printhead face 54 by the splash guard lip 86. Generally, the splash guard lip 86 is part of the splash guard 81. In one embodiment, as the printhead 20 is actuating the splash guard 81 via its contact with the actuation face 89, the resulting movement of the splash guard 81 also moves the sealing lips 86 into a position against the bottom of the printhead 20 and along the printhead face 54. In some embodiments, the sealing lips 86 come to rest against the underside of the printhead 20 against the printhead face 54. Generally, forming a seal around the printhead 54 on the underside of the printhead 20, as opposed to along the printhead side 88, is desired as it prevents contamination of the printhead side 88, or any other side of the printhead 20. For example, washing solution left on the printhead 20 can drip off during printing, thereby effecting print quality.

Figure 8E:
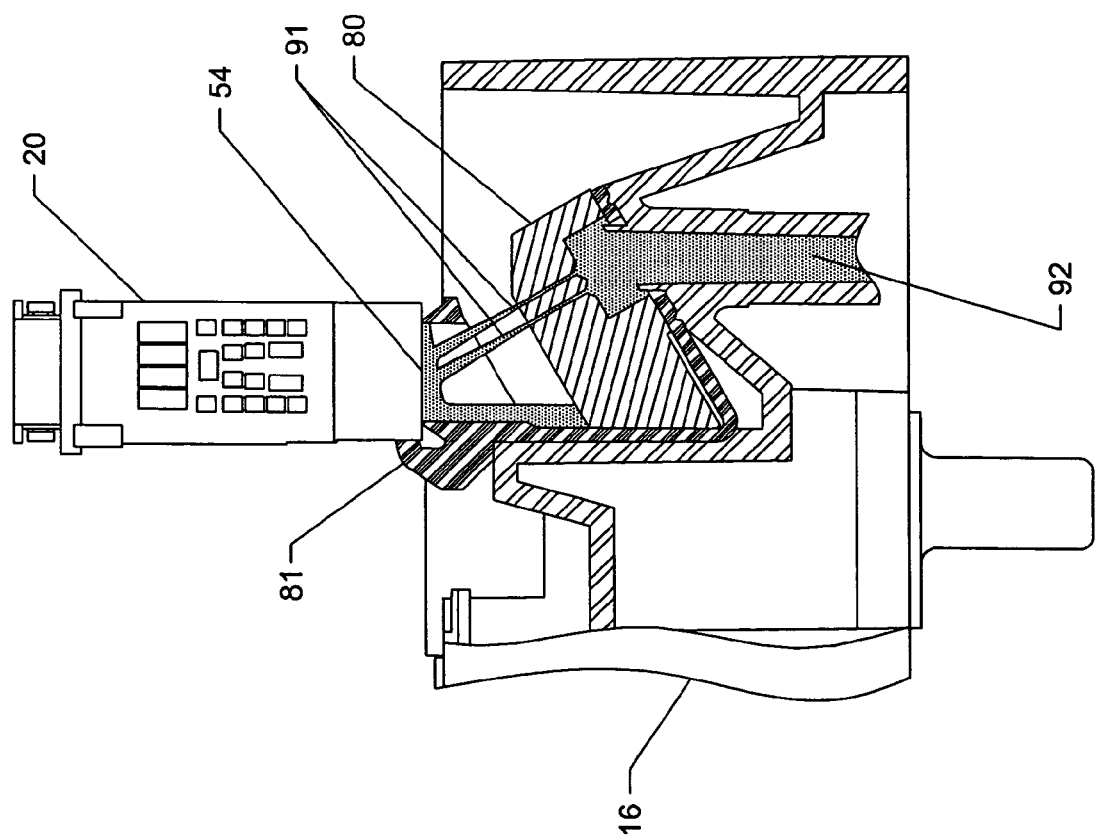

FIG. 8E is a partially sectioned side view of the service station 16 during cleaning of the printhead 20 by the service station 16 in accordance with one embodiment of the invention. Subsequent to the forming of a seal around the printhead face 54, the nozzle manifold 80 sprays the washing solution streams 91. Generally, the nozzle manifold 80 includes the pressurized washing solution 92. In one embodiment, the pressurized washing solution 92 is sprayed onto the printhead face 54 in a single stream 91. In other embodiments, there are multiple streams 91 of the pressurized washing solution 92. In operation, the washing solution streams 91 are directed at the printhead face 54 of the printhead 20. When directed onto the printhead face 54, the washing solution streams 91 loosen and remove contaminants, such as binder material, from the printhead face 54. The orientation of the washing solution streams 91 may be angled with respect to the printhead face 54, such that a fluid flow is induced across a plane of the printhead face 54. For example, in one embodiment, the washing solution stream 91 may contact the printhead 20 at the side nearest the nozzle manifold 80 and drain from the side of the printhead 20 furthest from the nozzle manifold 80. This approach improves the effectiveness of the washing solution streams 91 by reducing the accumulation of the washing solution 92 on the printhead face 54, as well as the amount of the pressurized washing solution 92 and debris that would otherwise drain near and interfere with the nozzle manifold 80. FIG. 8F is another partially sectioned view of the invention illustrated in FIG. 8E. The printhead face 54 is in proper position for cleaning. The sealing lips 86 have formed a seal around the printhead face 54 thus protecting the remainder of the printhead 20 from contamination.

Figure 8G:
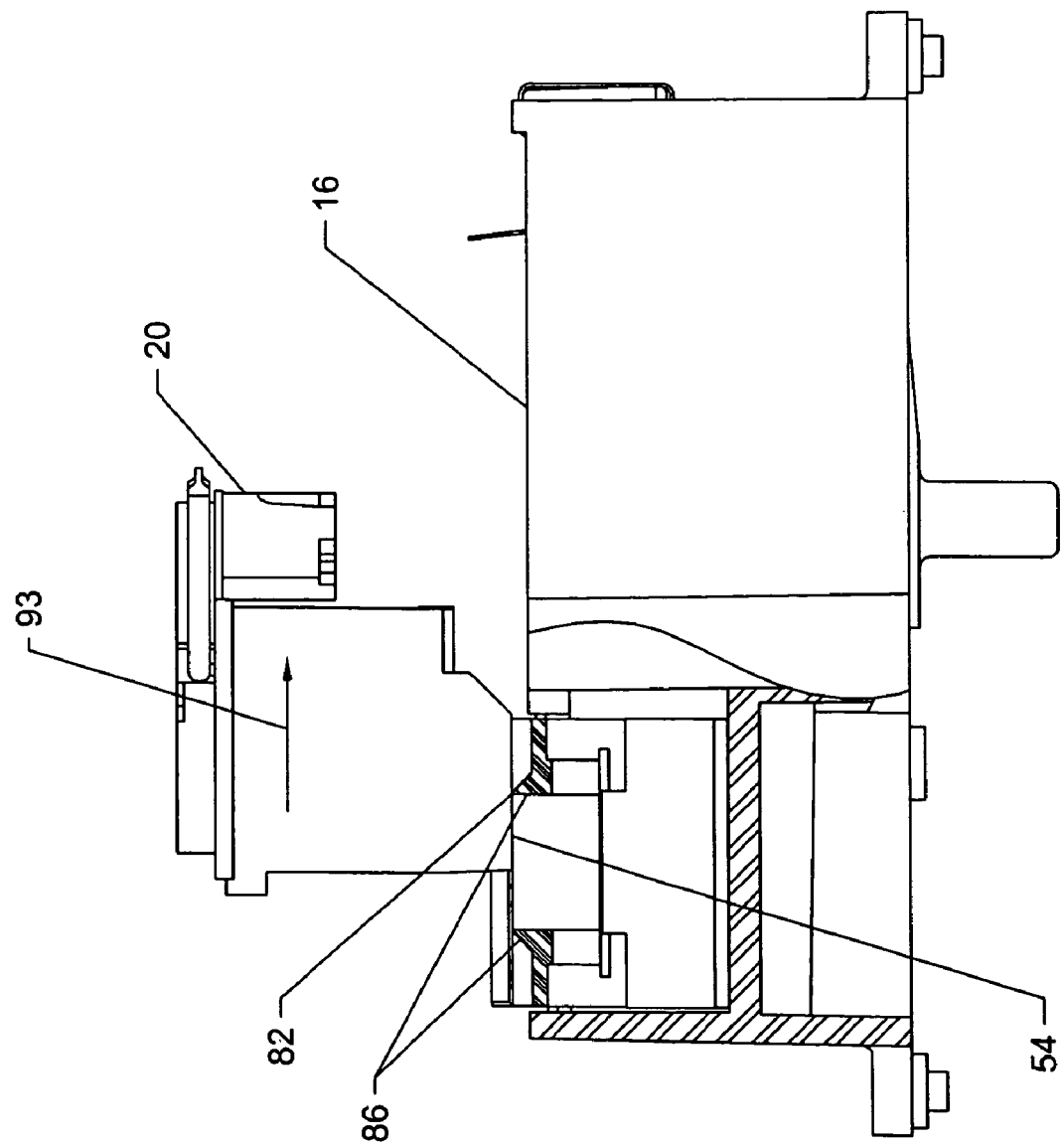
Figure 8H:
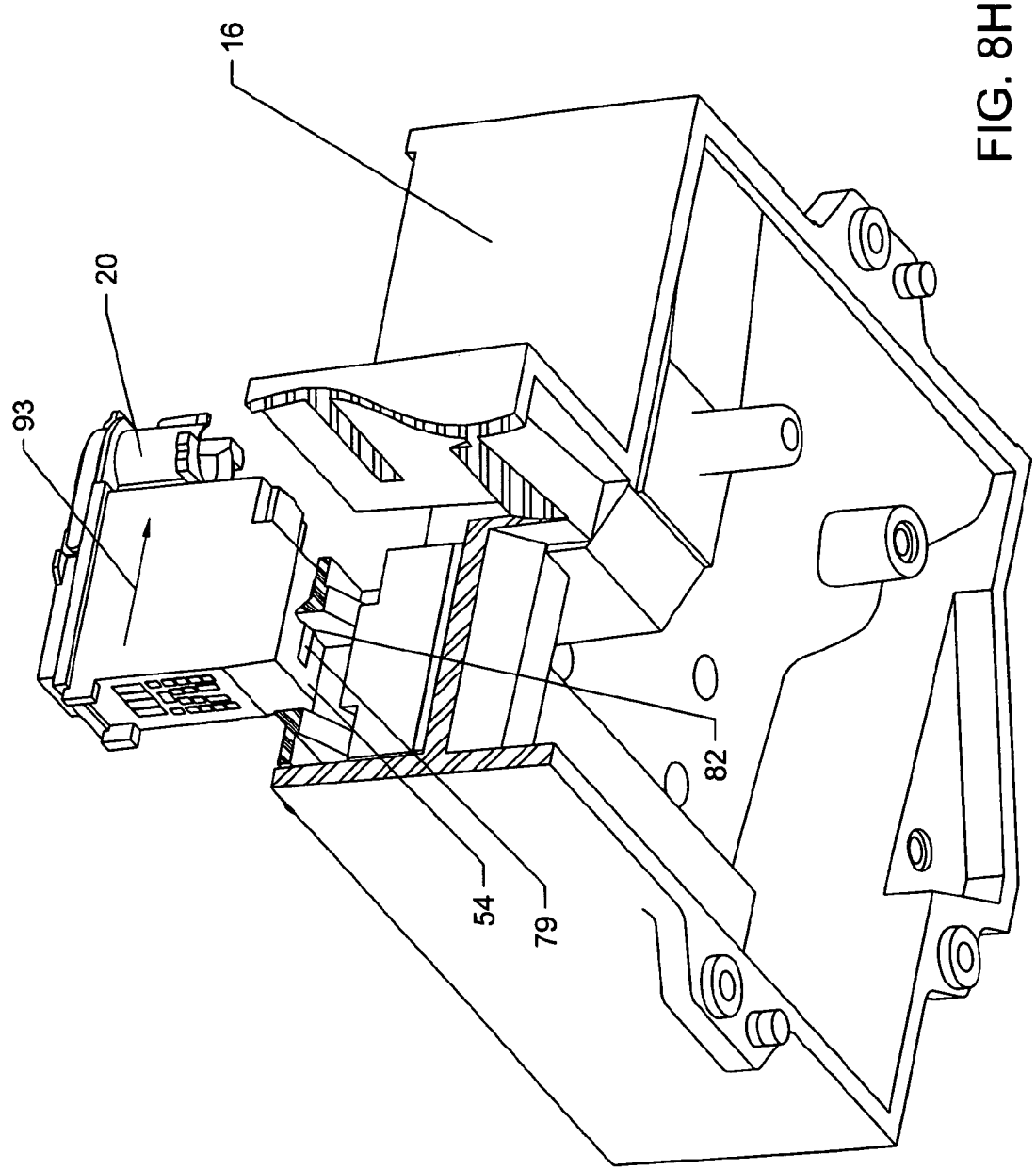

FIG. 8G illustrates the movement of the printhead 20 out of the service station 16 after a cleaning operation has been performed. The printhead 20 now moves in the direction of printhead motion 93 away from the service station 16. This is generally the same as the direction of carriage motion 53 that was used to enter the service station 16. As the printhead 20 is actuating out of the service station 16, the printhead face 54 is carried over the sealing lip 86 and the notch 82. In some embodiments, the sealing lip 86 may act as a wiper and remove debris and washing solution 92 from the area on the bottom of the printhead 20 adjacent to the printhead face 54; however, the notch 82 prevents contact between the sealing lip 86 and printhead face 54 in an area corresponding to the location of the jet nozzles. Contact between the sealing lip 86 and the printhead face 54 may degrade the performance of the printhead 20 by, for example, damaging the edges of the inkjet nozzle orifices on the printhead face 54. However, it is still desirable to remove a large portion of the washing solution 92 that remains on the printhead face 54 after the operation of the nozzle manifold 80 is complete. Accordingly, it is an object of this invention to provide a means of removing accumulated washing solution from the printhead face 54, without contacting the delicate region around the jet nozzles on the printhead face 54. Because the notch 82 prevents direct contact between the sealing lip 86 and the printhead face 54, in one embodiment, a wicking member 544 (as described above) may be disposed such that the printhead face 54 may pass one or more times over the wicking member 544 in close proximity, without contact, allowing capillary forces to draw the accumulated pressurized washing solution 92 away from the printhead face 54. FIG. 8H illustrates a partially sectioned bottom perspective view of the service station 16 of FIG. 8A. Here it can be seen that the sensitive portion of the printhead face 54 passes over the notch 82 as the printhead 20 is actuated away from the service station 16 after a cleaning. Generally, the sensitive portion of the printhead face 54 includes the printhead jet nozzle array.

Figure 9B:
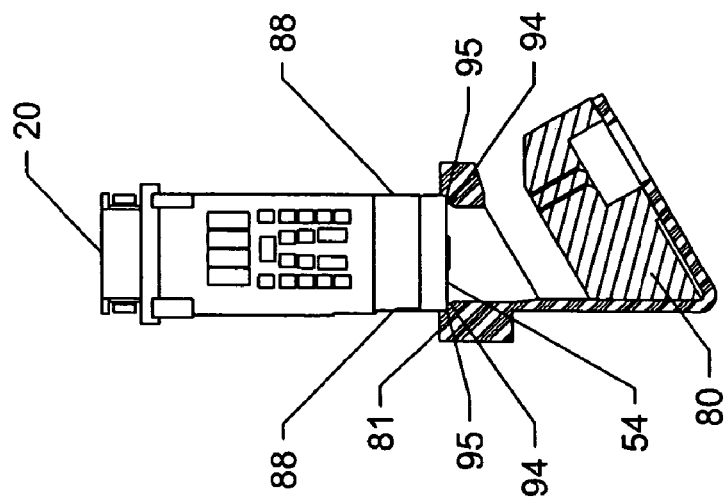
FIGS. 9A and 9B are schematic representations of another alternative embodiment of a printhead cleaning station in accordance with the invention.
Figure 9A:
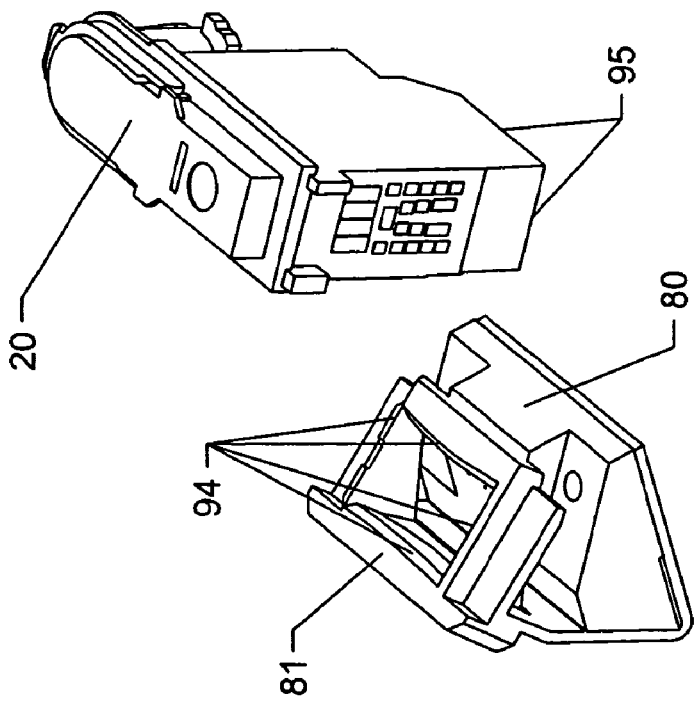

FIGS. 9A and 9B illustrate an alternative embodiment of the splash guard 81 of FIG. 8B. In this embodiment, the splash guard 81 includes tapered sealing surfaces 94. Generally, the tapered sealing surfaces 94 are shaped so that they will form a seal around the corners formed by the printhead edges 95. Thus, the seal in this embodiment is formed by the tapered sealing surfaces 94 contacting both the printhead face 54, and the printhead side 88 of the printhead 20. Thus, the seal formed by this embodiment wraps around the edges of the printhead 20 to contain the washing solution 92 during the cleaning operation. The operation of the alternative splash guard 81 of FIGS. 9A and 9B and the associated cleaning components is substantially similar that described hereinabove.

FIGS. 10A-10D illustrate another alternative embodiment of the splash guard 81 of FIG. 8B. In this embodiment, the splash guard 81 again forms a seal with the splash guard sealing lips 86; however, in this embodiment, the splash guard 81 is actuated into its sealed position around the printhead face 54 by a splashguard support spring 102. This procedure is analogous to the procedure used to cap the printhead 20 in the capping operation. Generally, the printhead 20 is carried over the service station 16 in the direction of a first printhead motion (arrow 100). Once roughly positioned over the drain aperture 83, the direction of the printhead motion changes direction to a substantially perpendicular printhead motion (arrow 101). In some embodiments, the direction of the printhead motion 101 is orthogonal to the previous direction of printhead motion 100. The printhead 20 now proceeds in the second direction of the printhead motion 101 until the printhead side 88 engages the splash guard support spring 102. (See FIG. 10B) As FIG. 10C illustrates, the splash guard support spring 102 moves in the direction of the second printhead motion 101. This movement engages the splash guard 81 with the printhead face 54.

Once the cleaning operation is performed as described above, the printhead 20 moves in a third direction of printhead motion (arrow 103) away from the service station 16. Generally, the third direction of printhead motion 103 is opposite the first direction of printhead motion 100, as the printhead 20 disengages from the service station 16. This disengagement breaks the seal formed by the splash guard sealing lip 86, and the printhead face 54 is carried over the sealing lip 86 where a wiper operation may be performed to remove debris or the washing solution 92 from the printhead face 54. As described above, a wicking operation may also be performed.

FIGS. 11A-11J illustrate an alternative system 146 for cleaning the printhead 20. The system 146 is located in the service station 16 (FIG. 1). In one embodiment, the system 146 includes a cleaning station 148 made up generally of a latch pawl 152, a spring 154, a wiper 156, a printhead cap 158, a cap carrier 192, a second spring 162, and a cam track 164. Only a single cleaning station 148 is shown for descriptive purposes; however, multiple stations 148 may be disposed in the service station 16. Alternatively, a single cleaning station 148 may service multiple printheads 20 by, for example, successively positioning the printheads 20 relative to the cleaning station 148.

FIG. 11A represents a starting position of the cleaning system 146. As shown in FIG. 11B, the printhead 20 approaches the cleaning station 148 and engages the latch pawl 152. The latch pawl 152 is actuated as the printhead 20 passes over the latch pawl 152. The printhead 20 continues to move past the latch pawl 152 and engages the wiper 156 (FIG. 11C). The printhead 20 passes over a wiper 156. As shown in FIG. 11D, the printhead 20 contacts the cap carrier 192, which is driven along the cam track 164 and compresses the spring 162. The printhead cap 26 is positioned against a printhead face 54 (FIGS. 11E and 11F). As shown in FIG. 11F, the printhead cap 26 seals against the printhead face 54 while the face 54 is rinsed with washing solution 92 (see FIG. 11F).

After the printhead face 54 is cleaned, the printhead 20 begins to move out of the service station 16 (FIG. 11G). The latch pawl 152 engages the cap carrier 192, halting its movement. As shown in FIG. 11H, the printhead 20 engages the wiper 156, which wipes the printhead face 54. In an alternative embodiment, the wiper 156 vibrates to further clean the printhead face 54. In an alternative embodiment, the wiper 156 may be notched in an area corresponding to the location of the jet nozzles, thereby preventing contact between the wiper 156 and the printhead face 54. The printhead 20 continues its forward movement, actuating the latch pawl 152 (FIG. 11I), which, in turn, releases the cap carrier 192 (FIG. 11J). The cap carrier 192 snaps back to the start position. After the printhead face 54 is cleaned, the printhead 20 begins to move out of service station 16 (FIG. 11G). The system 146 is now ready to clean another printhead 20.

Figure 12:
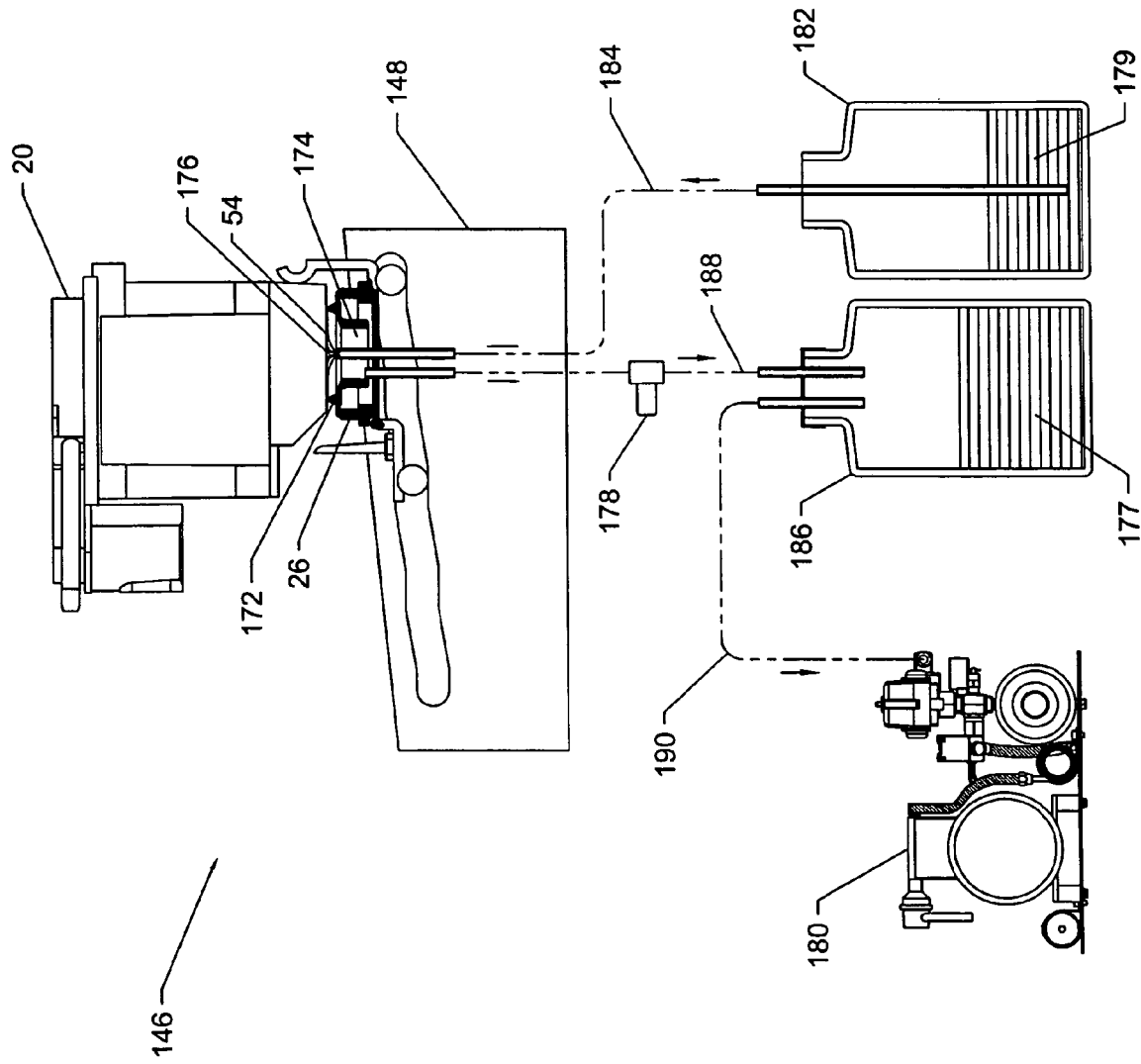
FIG. 12 is a schematic representation of a step of the method of cleaning a printhead in accordance with the embodiment of the invention depicted in FIGS. 11A-11J.

FIG. 12 depicts the system 146 for cleaning a printhead 20. (FIG. 12 also depicts FIG. 11F in greater detail) The printhead 20 is positioned with the printhead face 54 against the printhead cap 26, which in this embodiment is made of rubber. The cap includes a seal lip 172 for sealing about the printhead face 54. The service station 16 is coupled to a wash fluid supply container 182 via a supply duct 184 and a wash fluid return container 186 via a return duct 188. The wash fluid return container 186 is in communication with a vacuum source 180, in this case a vacuum pump, via a vacuum duct 190. Additionally, a valve 178 is located in the return duct 188. The valve 178 may be manually or automatically actuated.

In operation, the vacuum source 180 creates a vacuum within a cavity 174 in the printhead cap 54. The vacuum pulls wash fluid from the supply container 182 through the supply duct 184. The wash fluid enters the cavity 174 as a spray 176 against the printhead face 54. The spray 176 washes debris, such as excess build material and dried binder, off the printhead face 54. The used wash fluid and debris are drawn out of the cavity 174 by the vacuum source 180 and into the return container 186 via the return duct 188. Additionally, the negative pressure created in the cavity 174 by the vacuum source 180 prevents the wash fluid from entering the jet nozzles and, in fact, may cause a small amount of binder to flow out of the nozzles to flush any powdered build material out of the nozzles. Blockages or obstructions in the jet nozzles can cause the jets to fire in the wrong direction. Once the operation is complete, the system 146 moves onto the step depicted in FIG. 11G. In an alternative embodiment, printhead(s) 20 are disposed above the service station 16. The sealing lip 86 is actuated into alignment with the printheads 20, and the printheads 20 are wiped and lubricated from beneath to remove any accumulated grit and to improve the flow of binding material out of the printheads 20. Specifically, a lubricator applies a lubricant to the printhead face 20 to moisten any debris on the printhead face 54. Then, the printhead 20 is moved to pass the printhead face 54 over sealing lips 86, which act as a wiper and wipes the printhead face 54 clean.

FIG. 13 depicts a typical printing operation with a 3D printer in accordance with the invention. Only one printhead 220 is shown for clarity. The printhead 220 moves over a powder bed 200 that has been spread over a build surface of the 3D printer (se, for example, FIG. 1). As previously described, the printhead 220 can move along an X-axis and a Y-axis. In the operation depicted, the printhead 220 is moving in a single direction (arrow 202). As the printhead 220 travels above the powder bed 200, the printhead 220 performs a printing operation by depositing droplets 212 of liquid binder on to the powder bed 200 in a predetermined manner, thereby resulting in printed sections 204 and unprinted sections 206 in the powder bed 200.

After printing on the powder bed 200, a new layer of powder is spread over the powder bed 200 in preparation for receiving the new printing 218. As the printhead 220 deposits the droplets 212 onto the powder bed 200, particles 210 of the powder are ejected by the impact of the droplets 212 on the powder bed 200 (see FIGS. 14A and 14B). These particles 210 may eventually contact and adhere to the printhead 220. The resulting debris 216 degrades the quality of printing by, for example, interfering with a printhead nozzle 208. The amount of particles 210 ejected will depend, in part, on whether the powder is "wet" or "dry." The powder is wet if the underlying layer was previously printed (see FIG. 14B). The powder is dry if the underlying layer was previously unprinted (see FIG. 14A).

As shown in FIG. 14A, the printhead 220 is depositing droplets 212 on to a dry powder bed 200. As the droplets 212 impact the powder bed 200, a relatively large volume of particles 210 are displaced and a crater 214 is created in the powder bed 200. The particles 210 are ejected upwardly towards the printhead 220, where they may collect as debris 216 on a face of the printhead 220.

As shown in FIG. 14B, the printhead 220 is depositing droplets 212 on to a wet powder bed 200. As the droplets 212 impact the powder bed 200, a relatively small volume of particles 210 are displaced and a relatively small crater 214 is created in the powder bed 200. The binder printed on the previous layer tends to bind the powder in the fresh layer, thereby resulting in fewer particles being ejected, and correspondingly less debris accumulating on the printhead face.

The 3D printer includes logic for monitoring the condition of the printhead 220 based on, at least in part, the number of droplets printed over previously printed and/or unprinted powder, since the last cleaning. Other factors include; for example, time in use, number of droplets dispensed, and number of layers printed. The 3D printer can determine the frequency and duration of any necessary cleaning routine, based on any one of the aforementioned factors or combination of factors reaching a set threshold value. For example, the printhead 220 may be cleaned after every five minutes of continuous use. The threshold values of any particular factor can be varied depending on the types of liquid binder and powder materials used and other operational environmental factors, such as temperature and humidity, that can affect printhead condition.

Additionally or alternatively, the 3D printer can utilize other systems and methods for monitoring and maintaining the cleanliness of the printhead 220. For example, in one embodiment, the 3D printer could include an imaging system for viewing the printhead face. A user could either manually determine that the printhead 220 requires cleaning or the 3D printer could include the imaging system for automatically determining the need for cleaning. In a manual system, an image of the printhead face is displayed to the user, for example on a video monitor, and the user can initiate a cleaning routine if deemed necessary. In one example of an automatic system, the actual image of the face of the printhead in service is sent to a processor for comparison to an image of a clean printhead face, (i.e., a test image). In one embodiment, the printhead face is dark and the powder is relatively light in color. If a significant portion of the printhead face is covered with debris, there will be a difference in contrast between the actual image and the test image. If the difference in contrast reaches a predetermined threshold, the system initiates the cleaning routine.

In some embodiments, the cleanliness of the printhead face can be maintained by the use of an air curtain or an electrostatic charge. The system can supply a low pressure curtain of air across the printhead face that would reduce or prevent debris from collecting on the printhead face. Alternatively, the printhead face could have an electro-static charged placed thereon that is the same charge that is applied to the powder, thereby resulting in the powder particles being repelled from the printhead face.

Figure 15:
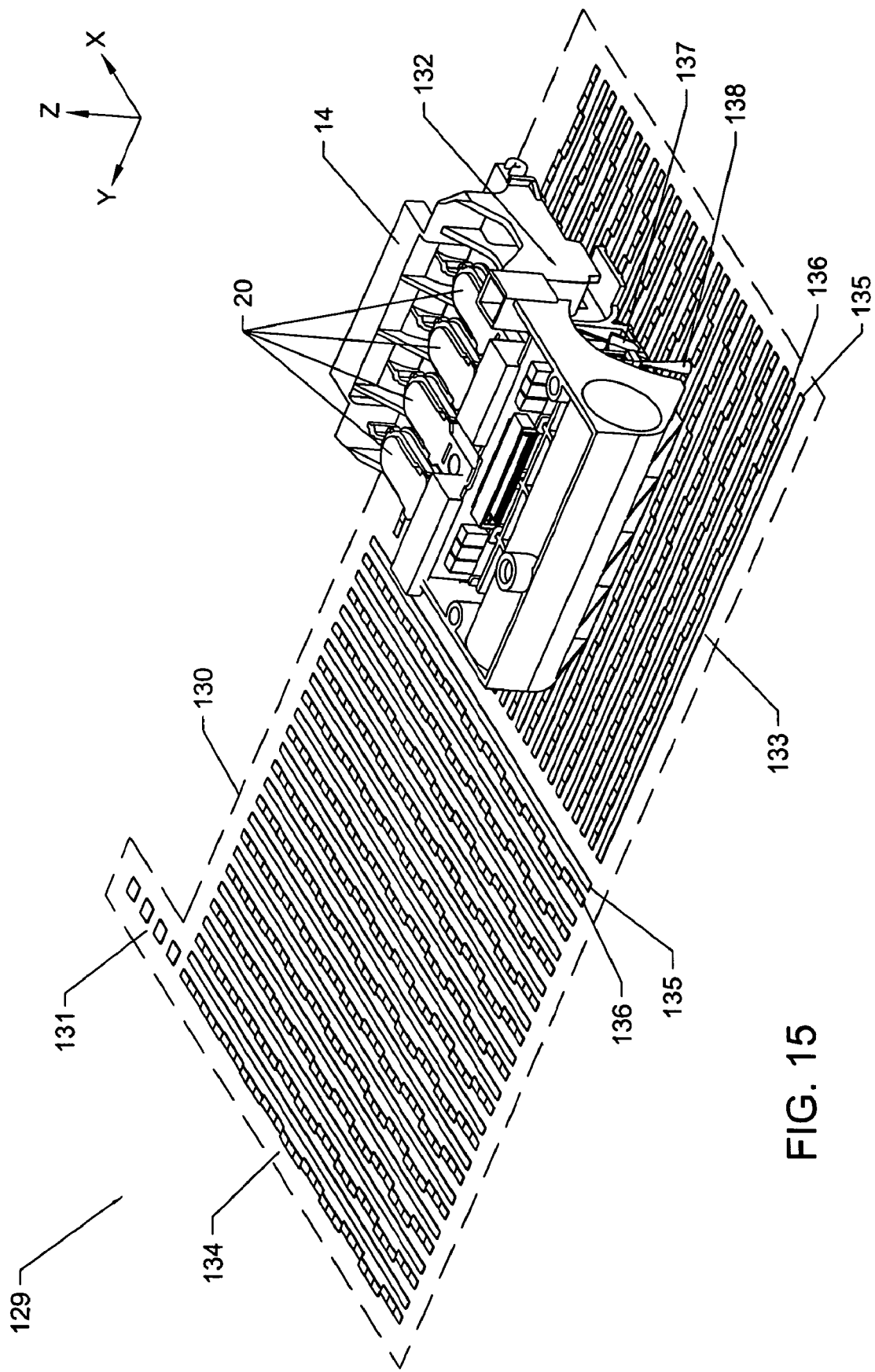
FIG. 15 is a schematic perspective view of a printhead alignment process in accordance with one embodiment of the invention.

FIG. 15 is a schematic representation of a printhead alignment process in accordance with one embodiment of the invention. Specifically, the printhead carriage 14 described hereinabove is depicted in relation to an alignment test pattern 129. The test pattern 129 is printed on the build surface 165 of the three-dimensional printing system 10 (see FIG. 1). The test pattern 129 includes a contrast-enhancing sublayer 130 that defines an area upon which an X-axis alignment pattern 133 and a Y-axis alignment pattern 134 are printed. The X and Y-axis alignment patterns 133, 134 are line pair arrays made up of alternating reference lines 135 and test lines 136. Also included on the sublayer 130 is a contrast optimization pattern 131, which is described in greater detail with respect to FIGS. 16A and 16B. The carriage 14 includes an alignment sensor system 132 that is used to scan the test pattern 129. The system 132 is described in greater detail with respect to FIGS. 17A-17D.

The pattern 129 is created by first spreading a layer of build material on the build surface 165. The printheads 20 are then used to print the contrast-enhancing sublayer 130 on the layer of build material powder. Generally, the contrast-enhancing sublayer 130 provides a background reference to create a contrast between a printed layer and its surroundings. Generally, it is desirable to perform the alignment process (e.g., creating the test pattern 129) using the same binder solutions that will later be used to print the three-dimensional parts. Clear binder can present a particular problem, in that an image printed on powder with clear binder is difficult to distinguish from its unprinted surroundings. This problem can be solved by printing the contrast-enhancing sublayer 130, though it is not required.

The contrast-enhancing sublayer 130 is printed on the build surface 165 of dimensions sufficient to underlie the whole array of alignment pattern objects (e.g., the X-axis alignment pattern 133, the Y-axis alignment pattern 134, and the contrast optimization pattern 131). In some embodiments, a dark color such as magenta or cyan may be used. The area may be printed more than once to increase the darkness of the color. A layer of fresh powder is then spread over this sublayer 130, obscuring the dark color. When an image is then printed on the fresh layer with clear binder, the powder is wetted in the printed areas and becomes somewhat transparent, revealing the dark color of the sublayer 130. In some embodiments, the contrast-enhancing sublayer 130 and the powder spread over it may collectively be referred to as the contrast-enhancing sublayer 130. The printed area then contrasts more clearly with its surroundings to be detected more readily by the alignment sensor system.

Next, the contrast optimization pattern 131 is printed on the contrast-enhancing sublayer 130. In some embodiments, the contrast optimization pattern 131 includes a printed area or target 143-146 (see FIG. 16A) from each of the printheads 20. The alignment sensor system 132 then determines the area of highest contrast between the printed targets 143-146 that collectively form the contrast optimization pattern 131 with contrast-enhancing sublayer 130 to determine which target 143-146 of the contrast optimization pattern 131 (and its corresponding printhead 20) has the greatest contrast relative to an unprinted area 141 (see FIG. 16A) of the contrast-enhancing sublayer 130.

The general procedure is to adopt one of four colors as a reference standard and to characterize the positional errors of the other colors with respect to the reference color. In one embodiment, the four colors include clear (printed area 143), yellow (printed area 144), magenta (printed area 145), and cyan (printed area 146). It may be desirable to adopt as a reference the color that contrasts most with the unprinted background. To this end, a target is printed in each color and then examined with the alignment sensor system 132. The color that produces the least photo sensor output may be selected.

Figure 16A:
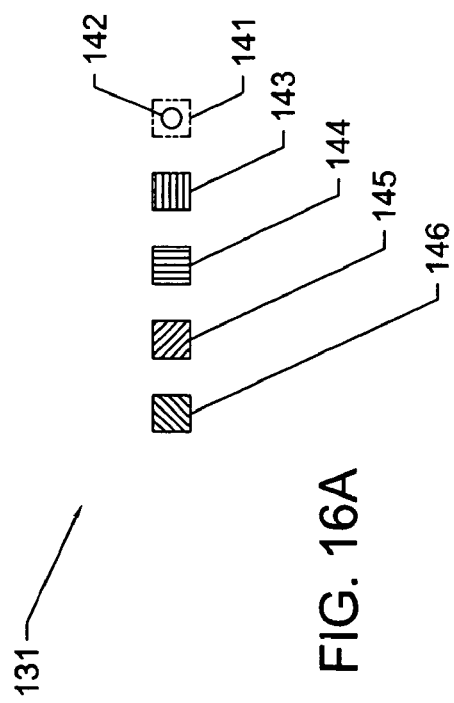
FIGS. 16A and 16B are schematic representations of a contrast test target and test pattern alignment method in accordance with one embodiment of the invention.
Figure 16B:
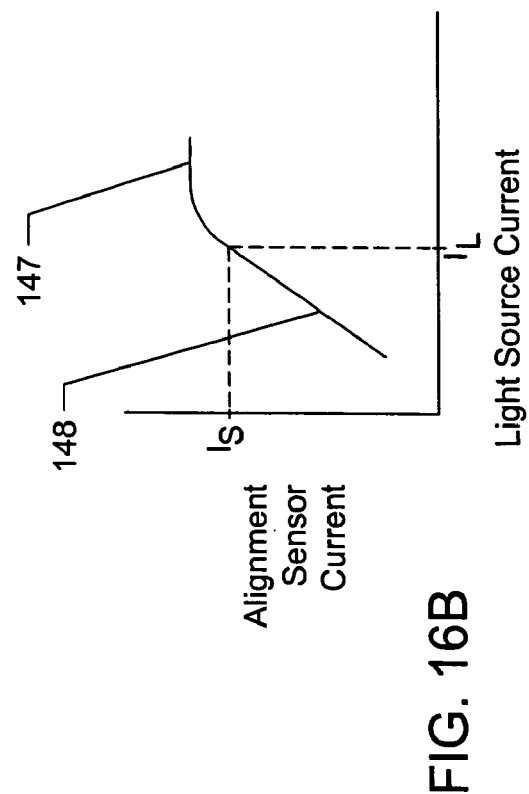

FIGS. 16A and 16B further detail the contrast optimization pattern 131. FIG. 16A is a graphical representation of the contrast optimization pattern 131 including the aforementioned targets 142-146. FIG. 16B shows the relationship between light source current and photo sensor output (e.g., alignment sensor current). As the light impinging on a photo sensor increases, it will eventually reach a level where the sensor output approaches a maximum and becomes insensitive to further increases in light input. This state of insensitivity is commonly called saturation, and is indicated by the saturated region 147 in FIG. 16B. The proportional region of the sensor output is indicated by the proportional region 148 in FIG. 16B. To maximize the information content of the sensor output signal, it is desirable to avoid saturating the sensor under normal operating conditions. The powders used in 3D printing may vary widely in reflectivity, resulting in large variations in maximum sensor illumination. To compensate for this effect, the alignment sensor assembly is positioned over an unprinted area 142 above the build surface and senses unprinted area 142 (see FIG. 16A). The input current through the light source is gradually increased until diminishing sensor output indicates saturation. The light source current is then reduced to provide a safe operating margin within the proportional region 148. Alternatively, the light source current can be gradually increased until a predetermined safe photo sensor output is reached.

Referring back to FIG. 15, two substantially identical arrays of line pairs disposed substantially at right angles to each other make up the X-axis alignment test pattern 133 and the Y-axis alignment test pattern 134. In one embodiment, one of the test patterns represents a slow axis printing and the other test pattern represents a fast axis printing of the three-dimensional printer 10. Generally, the X-axis alignment test pattern 133 and Y-axis alignment test pattern 134 are processed in sequence, and the processes are identical. Generally, both the X-axis alignment pattern 133 and the Y-axis alignment pattern 134 include the reference line 135 and the test line 136. In one embodiment, the reference line 135 is created by the printhead 20 that was determined to have the greatest contrast relative to the contrast-enhancing sublayer 130. The line pairs are discussed in greater detail hereinbelow with respect to FIGS. 18, 19A, 19B, and 21A.

In some embodiments, to determine the highest contrast between the contrast optimization pattern 131 and the contrast-enhancing sublayer 130, the carriage 14 may include a light source 137, for example a light emitting diode (LED), which produces a cone of light 138. Alternatively, the light sources could be a laser or a lamp, and multiple light sources could be utilized. The LED light source 137 illuminates the general area under examination. In some embodiments, the LED light source 137 is a blue-green color to produce a high level of contrast between printed and unprinted areas. An optical filter passes light only in a narrow wavelength window that includes the LED output. Ambient room light contains relatively little light of the wavelength passed by the filter, so that the great majority of the light that reaches the photo sensor originates from the light source. As a result, the system is relatively insensitive to ambient room light variations.

In another embodiment, ambient light insensitivity is achieved by modulating the light source 137 output at a frequency much higher than the signal-of-interest. The photo sensor output is filtered electronically to pass only the frequency of the modulated light. This increases the sensitivity of the system to low light levels. An optional lens can increase the sensitivity of the system to low light levels.

FIGS. 17A-17D depict the alignment sensor system 132 in greater detail. The system 132 is typically part of the printhead carriage 14. In a particular embodiment, the system 132 is mounted on a printed circuit board 160 that includes, for example, the logic for directing the carriage 14, firing the printheads 20, and operating the alignment sensor system 132. The system 132 generally includes the light source 137, an optical filter 161, a light entrance 162, a photo sensor 163, and an optional lens 164. The light source 137 is used to illuminate a spot on the test pattern 129 that is about the same diameter as the width of the colored lines being scanned. The light source 137 and the photo sensor 163 could each be focused or unfocused. FIGS. 17C-17D depict different operational states of the alignment sensor system 132. FIG. 17C illustrates the illumination of an illuminated area 166 on the build surface by the light cone 138. In one embodiment, the light source floods the area of interest with light. In FIG. 17D, a sensed area 142 on the illuminated build surface 165 reflects light back to the photo sensor 163. Typically, the sensed area 142 corresponds to a print target 142-146 or a portion of the reference line 135 or test line 136 and is smaller in area than the illuminated area 166. The tubular light entrance channel 162 restricts the field of view of the photo sensor to a spot small relative to the illuminated area. In some embodiments, the photo sensor 163 may include the capability of detecting a surface photovoltage from the illuminated area 166 of the printing surface. In other embodiments, the system 132 may include an optional lens 164 to focus the reflected light on the sensor 163.

Figure 18:
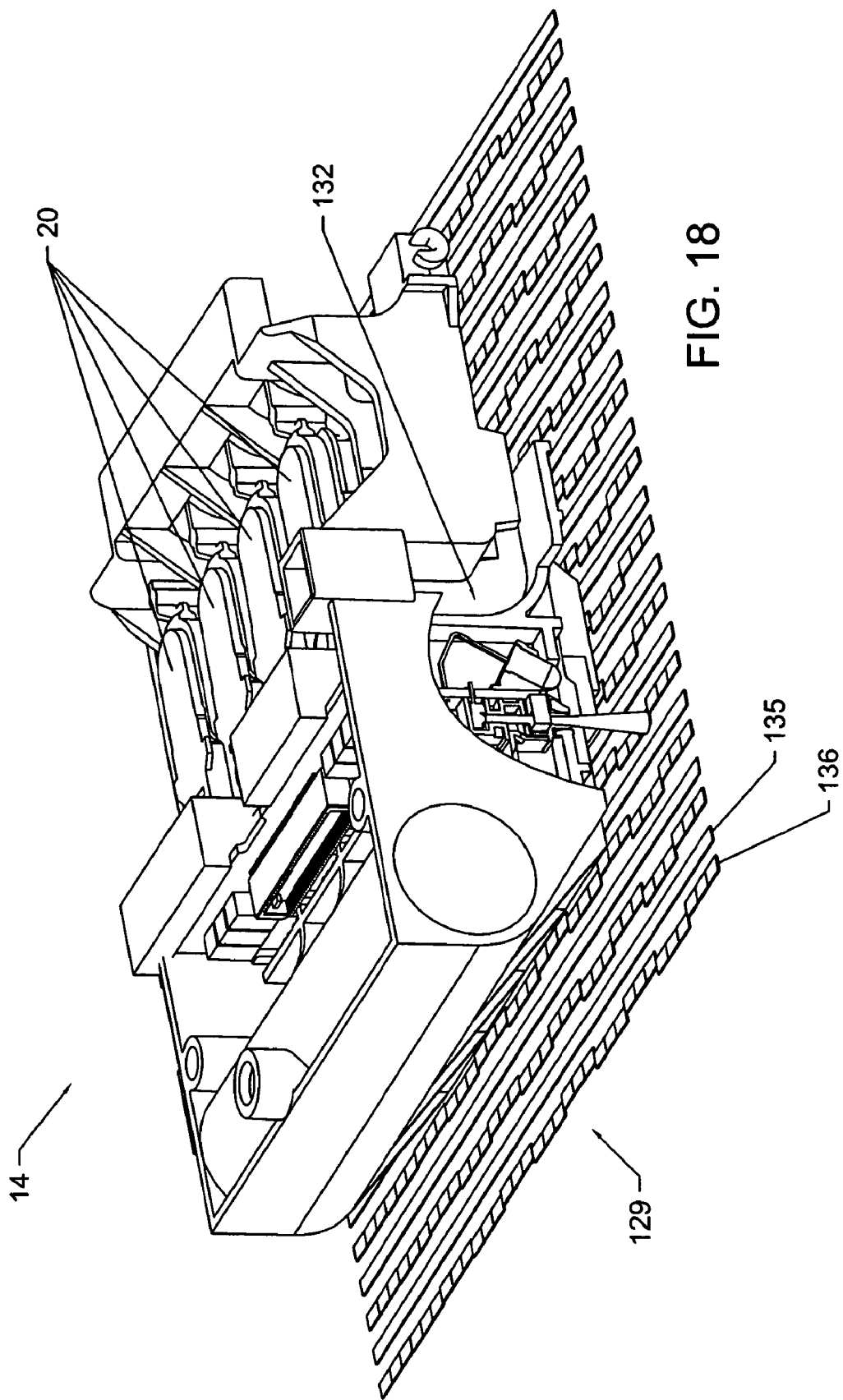
FIG. 18 is a schematic representation of one step in a method of aligning color printheads in accordance with one embodiment of the invention.

FIG. 18 depicts the X-axis alignment pattern 133 of FIG. 15. The X-axis alignment pattern 133 and the Y-axis alignment pattern 134 are substantially identical, with the exception that the line pairs are oriented substantially perpendicularly, although alternative configurations are contemplated and considered within the scope of the invention. As previously described, the X-axis alignment pattern 133 includes a series of reference lines 135 and test lines 136. Generally, each reference line 135 is printed by the printhead 20 with the highest contrast relative to the contrast-enhancing sublayer 130, and each test line 136 is printed in an alternating pattern by at least one of the three remaining printheads 20 with lesser relative contrasts. As the number of printheads may vary in different embodiments, the number of corresponding color bars in each test line 136 also may vary. In one exemplary embodiment, the reference line 135 may be made of clear deposited material, and test line 136 may be sequentially repeating yellow, magenta, and cyan color deposits. Typically, the test pattern 129 is printed by the printheads 20 in order to determine if the printheads 20 are properly aligned. The test pattern 129 is printed assuming the printheads 20 are perfectly positioned. Once the test pattern 129 has been printed, the carriage 14 is actuated over the surface of the test pattern 129 and the alignment sensor system 132 scans at least a portion of test pattern 129 to determine the deviation of the test line 136 from the perfect position. The scanned results are then used to correct any identified errors.

Figure 19B:
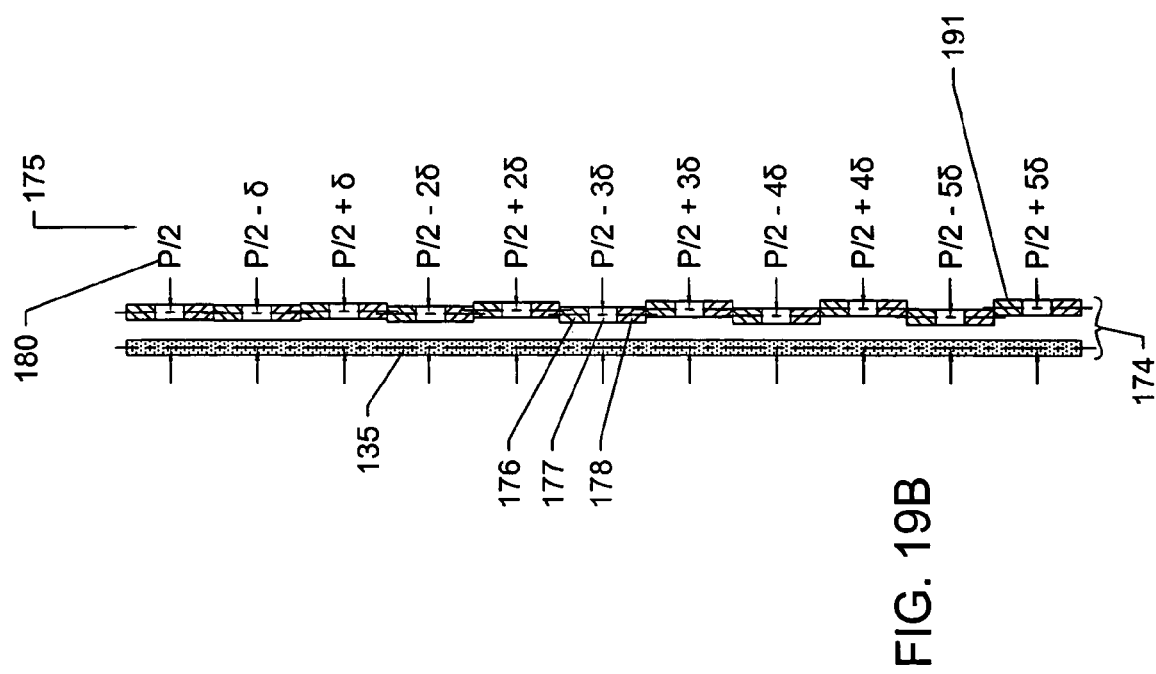

FIGS. 19A-19B illustrate the scan spot travel paths 171 across a test pattern. FIG. 19A illustrates a nominal X-axis alignment pattern 170. As the sensed area 142 passes over the printed lines in the direction of line pair replication direction 173, the photo sensor 163 receives reflected light that originated from the light source 137. The reflectances of the color bars differ from the unprinted background (in one example, the unprinted background is white), and the reflectances of the colors vary amongst themselves. As illustrated by FIG. 19B, the basic unit of the target is a line pair, such as line pair 174, which comprises a solid reference line 135 and a test line 136 including an array 181 of systematically varying short bars 191 including a first color bar 176, a second color bar 177, and a third color bar 178. Alternative embodiments may have more or fewer color bars. Collectively, the color bars 176, 177, 178, are components of the test line 136. This line pair 174 is periodically repeated in the direction shown with a constant pitch ("P") 197 between successive reference lines, for example, reference lines 135. In the illustrative embodiment of FIG. 19B, the line pair 174 is repeated 11 times; however, the number of line pairs will vary to suit a particular application and/or desired level of accuracy.

In one embodiment, the scan spot traverses the array of line pairs 174 along travel paths perpendicular to the reference line 135. In the embodiment illustrated by FIG. 19B, complete examination of the target requires 33 scan spot passes. Three typical scan path travel paths 171 are indicated (see FIG. 19A). In one embodiment, the width of the color bars 176, 177, 178, the minimum anticipated space between the bars, and the size of the scan spot should be substantially equal. The color bars 176, 177, 178 shown in FIG. 19B vary systematically around a spacing equal to about one half of the reference line pitch P 197. An exemplary short bar is identified as short bar 191. In one embodiment, the increment of variation, ("δ"), may typically be 2 pixels at 300 dpi or 0.007 inches. The position of the uppermost group of three short bars of the color bars 176, 177, 178 is nominally printed equidistant between two of the reference lines 135. Progressing down the array, the groups of three color bars 176, 177, 178 diverge from the central position by increasing amounts, for example +/−nδ, where "n" is an integer (e.g., 1δ, 2δ, 3δ, etc.). The width and pitch of the reference lines 135 and test lines 136 are selected to optimize the signal contrast. The dimensions given herein are for illustrative purposes only and are in no way to be considered limiting.

Figure 20A:
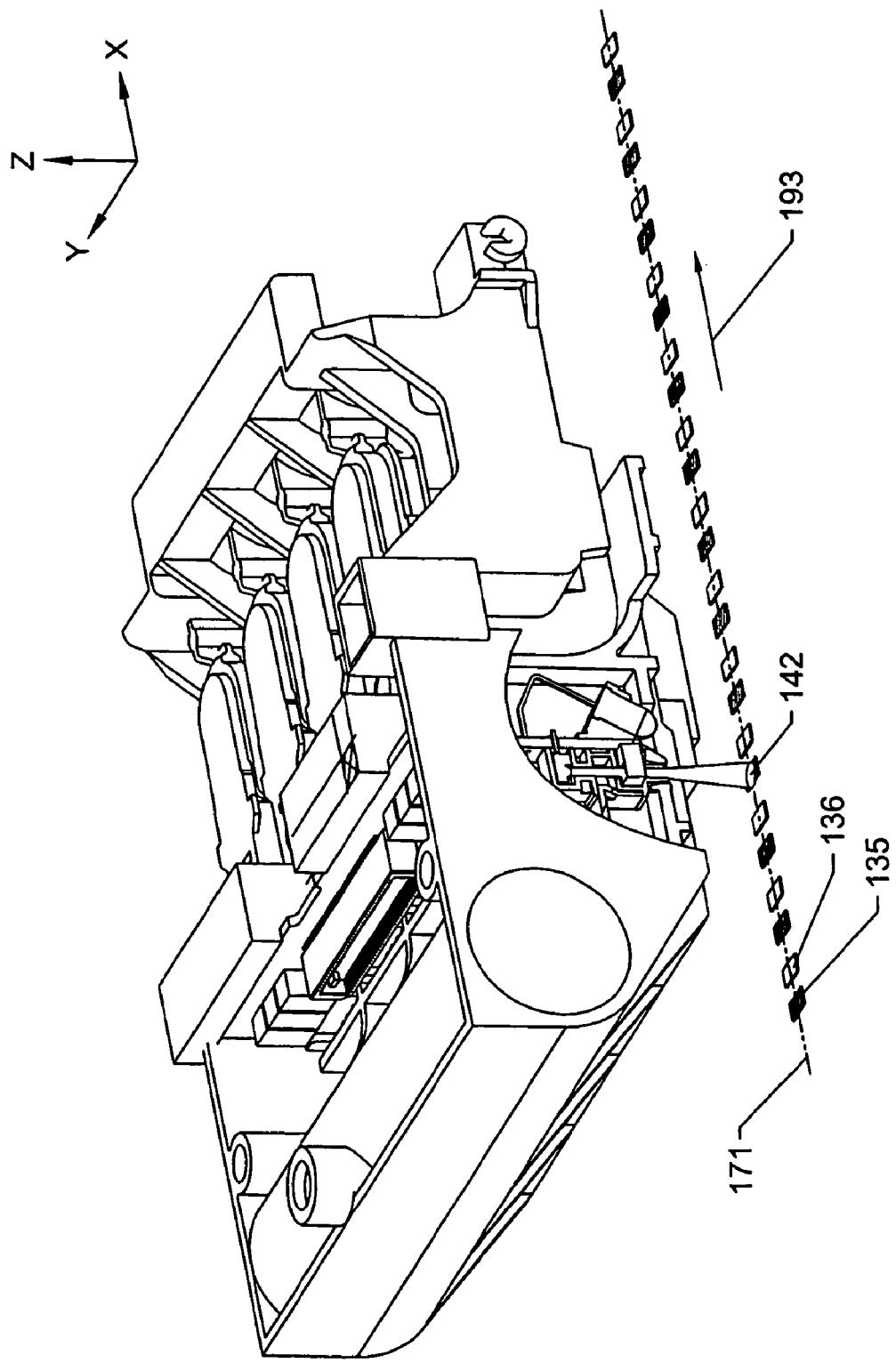
FIGS. 20A-20D are detailed schematic representations of the horizontal alignment process in accordance with one embodiment of the invention.
Figure 20B:
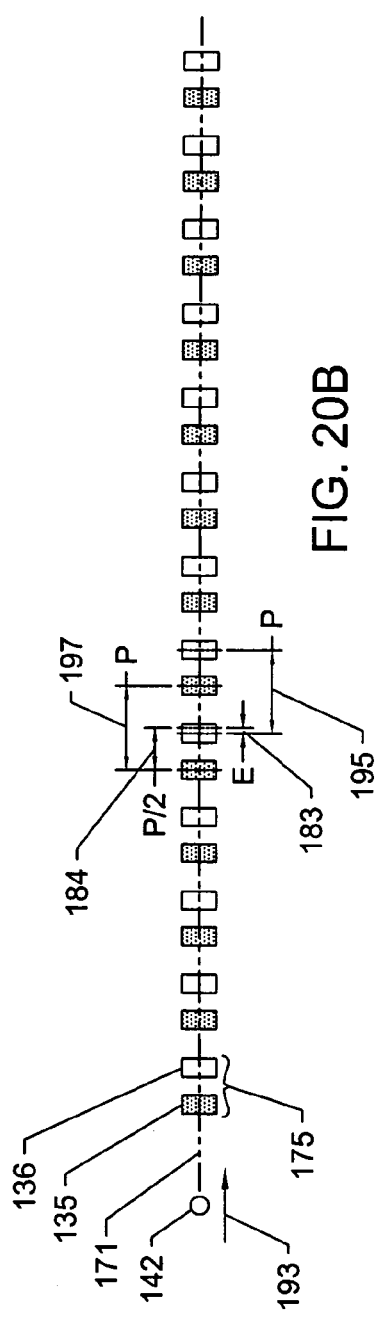
Figure 20C:
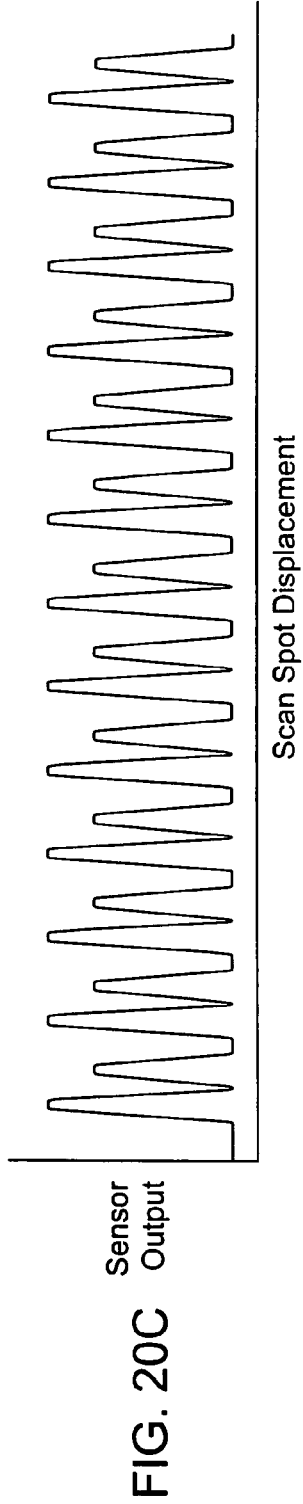

FIGS. 20A-20D illustrate one embodiment of the alignment process with respect to a single scan spot travel path 171. FIGS. 20A and 20B illustrate the single scan spot pass travel path 171 in the direction of carriage motion 193 across reference lines 135 and test lines 136. As the scan spot passes over the printed color bars, the photo sensor receives reflected light that originated from the light source 137. The reflectances of the color bars differ from the unprinted background, and the reflectances of the colors vary amongst themselves. FIG. 20C illustrates the sensor output signal, which represents strong periodicity related to the color bar spacing and peak amplitude variations due to different color reflectances.

Figure 20D:
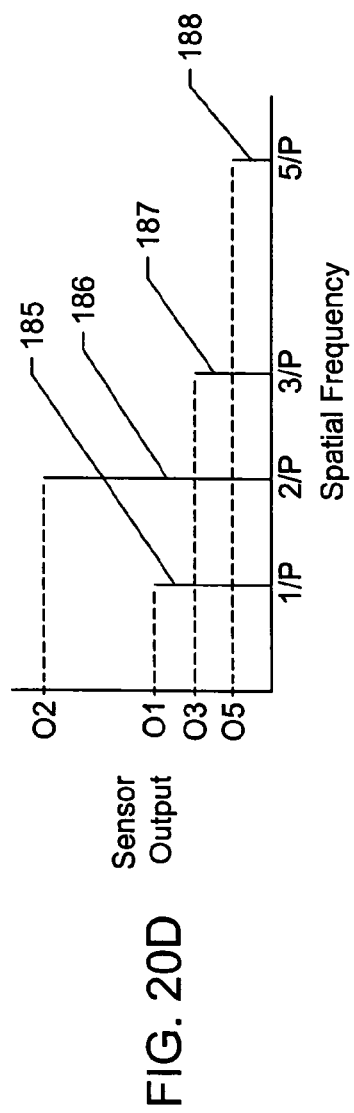

As shown in FIG. 20D, any signal can be represented as the sum of an arbitrarily large number of sinusoids, each having a constant discrete frequency, a constant amplitude, and a constant phase relationship to a fixed standard. The process of extracting the sinusoidal constituents of a signal is called Fourier analysis. A common practical approach is to digitize the signal and to then employ a computational algorithm, such as a Fast Fourier Transform ("FFT"). FIG. 20D shows the principle harmonic constituents of the signal shown in FIG. 20C. The frequency of these constituents is fixed by the geometric constraints placed on the test pattern 129. The magnitude of the each constituent is affected by differences in color reflectivity and by the displacement ("E") 183 (see FIG. 20B) of the adjustable color bar relative to its central position. The magnitude of the harmonic component whose frequency is three times the reference bar frequency increases with color test bar displacement from perfect alignment, and can be used to determine the magnitude of the displacement. FIG. 20D is a graphical representation of the sensor output indicating spatial frequency and a first harmonic peak 185, a second harmonic peak 186, a third harmonic peak 187, and a fifth harmonic peak 188. The first harmonic peak 185 may also be used as an indicator of misalignment.

Figure 21A:
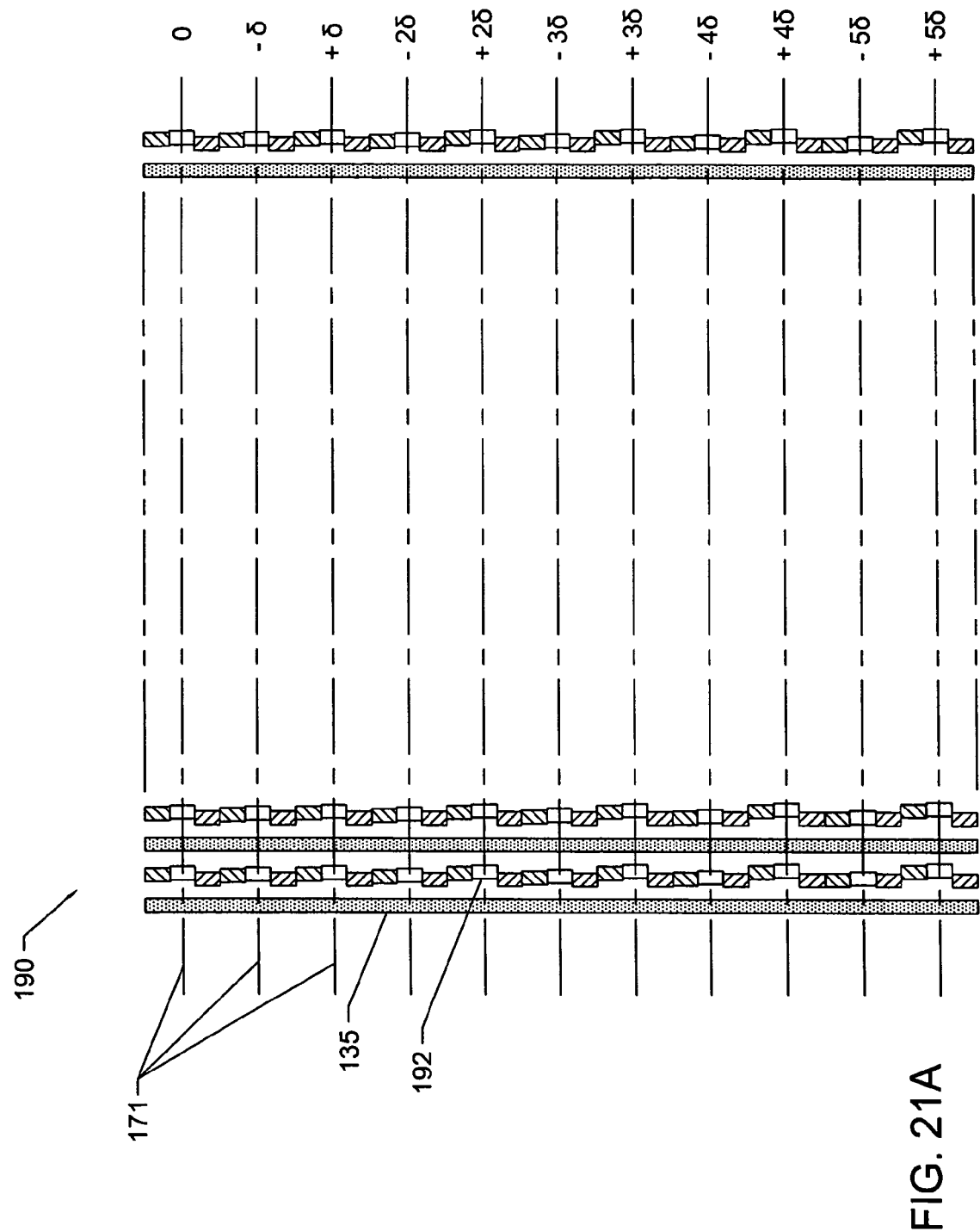
FIGS. 21A and 21B are detailed schematic representations of the vertical alignment process in accordance with one embodiment of the invention.
Figure 21B:
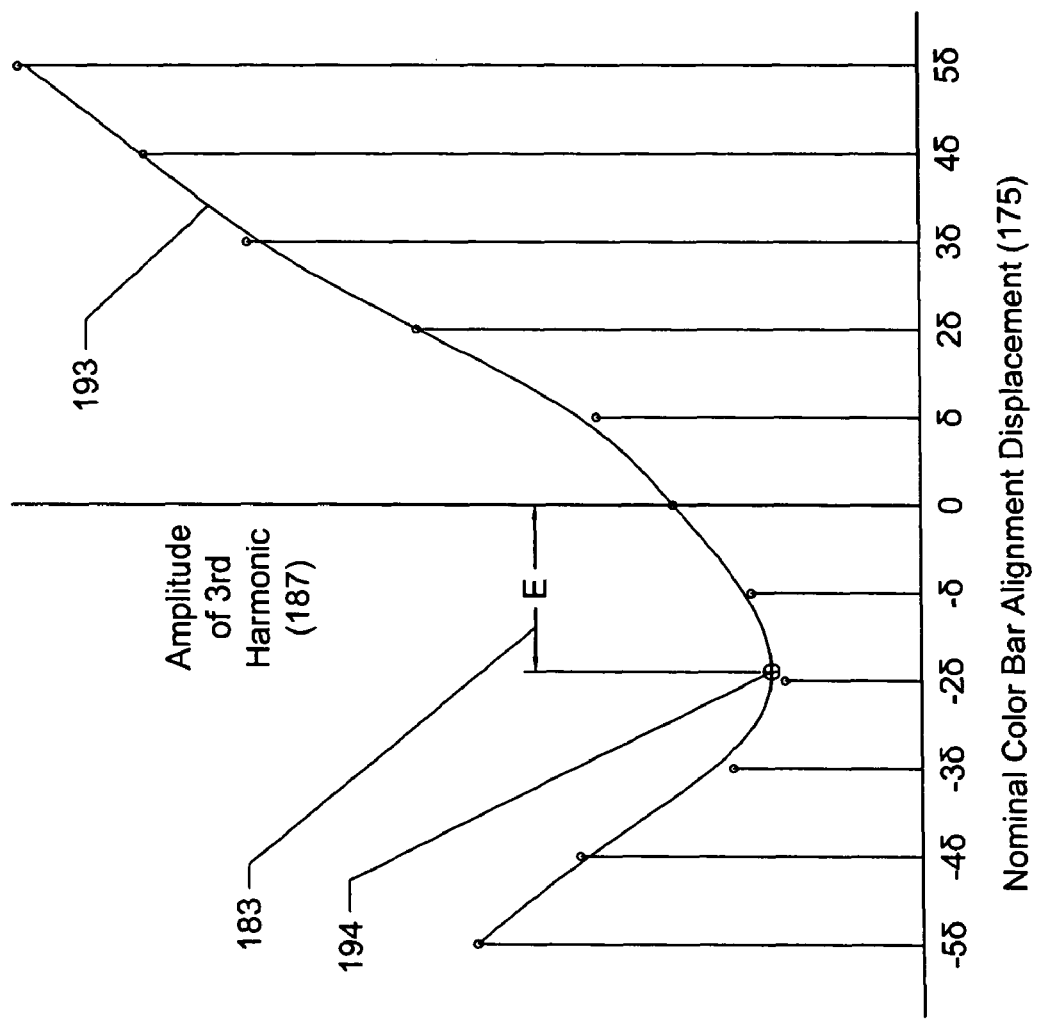

FIGS. 21A and 21B illustrate an alignment pattern showing misalignment in one embodiment of a test pattern in accordance with the invention. As discussed above, the alignment pattern in FIG. 19A was shown as it would be printed by printheads 20 in perfect alignment. FIG. 21A shows an alignment pattern printed by misaligned printheads 20. Each adjustable color bar, including second color bar 192, is actually printed in a position displaced from its nominal true position. To determine the positional error 183 of each color using this alignment pattern, a total of eleven scans across this pattern are needed, as shown. Each scan will produce a signal of the sort shown in FIG. 20C. For each of these signals, the magnitude of the third harmonic can be extracted by digital FFT or analog filtering. Although the magnitude of the third harmonic increases reliably with misalignment, the misalignment is only one component of the magnitude of the harmonic. A portion of the peak is constant and depends on the line width/space ratio. A portion of the peak is variable and depends on how well the color bars are centered between the reference lines 135.

Determining at which nominal color bar displacement the magnitude of the third harmonic is minimized can factor these other components out. The maximum value of the harmonic of interest, for example the third harmonic, for each scan is collected. By fitting a curve of these data points and determining the minimum point of this fitted curve (see FIG. 21B), it is possible to determine the misalignment to within a fraction of the alignment pattern step resolution. If, for example, the printhead under examination were perfectly aligned, the minimum point of the fitted curve would coincide with a nominal color bar displacement 175 of zero.

The location of the minimum yields an accurate correction factor. In one embodiment, the correction factor is used to alter the timing of a firing signal to a printhead, thereby altering the location of the printhead output. Specifically, this actual measured misalignment can be used as a corrective, geometric offset, causing the printhead 20 to "fire" either early or late, so that the mechanical misalignment can be automatically compensated for during printing. As a result, a very high level of printing accuracy can be achieved, resulting in the production of dimensionally accurate three-dimensional articles, even when employing multiple printheads. In one embodiment, the alignment process is carried out prior to printing any three-dimensional parts and/or after a printhead is replaced.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A method of creating a test pattern with a plurality of printheads of a three-dimensional printer, the method comprising:
   defining an area on a build surface for receiving the test pattern, by printing a contrast-enhancing sublayer on the build surface by (i) spreading a layer of build material on the area of the build surface, (ii) printing the area on the build material layer in a solid, high contrast color using at least one printhead and (iii) overlaying the printed area with at least one unprinted layer of build material;
   selecting a reference printhead capable of printing with a high contrast;
   printing a plurality of reference lines with the reference printhead on the unprinted layer of build material;
   printing a plurality of test lines proximate to the reference lines with at least one of the remaining printheads; and
   scanning the test and reference lines to determine a deviation of at least one of the test lines from a desired position by determining a harmonic content of the test and reference lines of at least one frequency.

2. The method of claim 1, wherein the step of selecting a printhead comprises the steps of:
   printing a target above the contrast-enhancing sublayer with each of the printheads;
   comparing the targets to identify which target has a highest contrast relative to an unprinted area; and
   selecting a printhead associated with the highest contrast target.

3. The method of claim 1, wherein each of the printheads prints with a liquid binder having a color selected from the group consisting of magenta, yellow, cyan, clear, and black.

4. The method of claim 1, wherein the steps of printing a reference line and printing a test line include printing a plurality of reference lines and printing a corresponding plurality of test lines.

5. The method of claim 1, wherein the steps of printing a reference line and printing a test line comprise:
   printing a plurality of nominally identical line pairs parallel to a fast-axis travel of the printheads, each line pair comprising one reference line and one test line; and
   printing a plurality of nominally identical line pairs perpendicular to the fast-axis travel of the printheads, each line pair comprising one reference line and one test line.

6. The method of claim 5, wherein each plurality of line pairs is arranged as an equally spaced linear array.

7. The method of claim 6, wherein each test line comprises a series of test bars, where each of the remaining printheads prints a central test bar that is nominally located at a distance from a corresponding reference line equal to ½ of a nominal array spacing of the reference lines.

8. The method of claim 7, wherein each remaining printhead prints a plurality of additional test bars that are incrementally displaced about the central test bar.

\* \* \* \* \*